US009202512B2

(12) United States Patent
Bi et al.

(10) Patent No.: US 9,202,512 B2
(45) Date of Patent: Dec. 1, 2015

(54) DATA STORAGE DEVICE

(75) Inventors: Chao Bi, Singapore (SG); Kui Cai, Singapore (SG); Kheong Sann Chan, Singapore (SG); Zhi Yong Ching, Singapore (SG); Moulay Rachid Elidrissi, Singapore (SG); Guchang Han, Singapore (SG); Zhimin He, Singapore (SG); Phyu Hla Nu, Sinagpore (SG); Jiang Feng Hu, Singapore (SG); Wei Hua, Singapore (SG); Quan Jiang, Singapore (SG); Siang Huei Leong, Singapore (SG); Wuzhong Lin, Singapore (SG); Bo Liu, Singapore (SG); Yansheng Ma, Singapore (SG); Chun Lian Ong, Singapore (SG); Jianzhong Shi, Singapore (SG); Cheng Su Soh, Singapore (SG); Sufui Sophia Tan, Singapore (SG); Li Wang, Singapore (SG); Chiew Leong Wong, Singapore (SG); Weiya Xi, Singapore (SG); Khai Leong Yong, Singapore (SG); Shengkai Yu, Singapore (SG); Yin Quan Yu, Singapore (SG); Zhimin Yuan, Singapore (SG); Jing Liang Zhang, Singapore (SG); Tiejun Zhou, Singapore (SG); Pantelis Alexopoulos, Singapore (SG); Budi Santoso, Singapore (SG); Qide Zhang, Singapore (SG); Kannan Sundaravadivelu, Singapore (SG); Ningyu Liu, Singapore (SG); Jianqiang Mou, Singapore (SG); Chong Wee Lee, Singapore (SG); Ke Gan, Singapore (SG); Boon Long Ibrahim See, Singapore (SG); Leonard Gonzaga, Singapore (SG); Wee Kiat Lim, Singapore (SG); Mengjun Liu, Singapore (SG); Venkataramanan Venkatakrishnan, Singapore (SG); Cheng Peng Tan, Singapore (SG)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/342,111

(22) PCT Filed: Aug. 31, 2012

(86) PCT No.: PCT/SG2012/000309
§ 371 (c)(1),
(2), (4) Date: May 28, 2014

(87) PCT Pub. No.: WO2013/032405
PCT Pub. Date: Mar. 7, 2013

(65) Prior Publication Data
US 2015/0146322 A1 May 28, 2015

Related U.S. Application Data

(60) Provisional application No. 61/530,175, filed on Sep. 1, 2011.

(51) Int. Cl.
*G11B 19/20* (2006.01)
*H02K 3/26* (2006.01)
*G11B 27/32* (2006.01)

(52) U.S. Cl.
CPC .......... *G11B 19/2009* (2013.01); *G11B 27/324* (2013.01); *H02K 3/26* (2013.01); *G11B 19/20* (2013.01); *G11B 2220/235* (2013.01); *G11B 2220/2516* (2013.01)

(58) Field of Classification Search
CPC . G11B 19/20; G11B 19/2009; G11B 19/2036
USPC ...................... 360/99.08, 99.21, 99.15, 99.19
See application file for complete search history.

(56) References Cited

U.S. PATENT DOCUMENTS

2004/0051994 A1 3/2004 Akiyama et al.
2008/0219109 A1 9/2008 Maeda et al.

FOREIGN PATENT DOCUMENTS

| | | |
|---|---|---|
| JP | 03-141014 A | 6/1991 |
| JP | 2006340425 A * | 12/2006 |

OTHER PUBLICATIONS

International Preliminary Report on Patentability for International Application No. PCT/SG2012/000309 dated Mar. 4, 2014, pp. 1-9.
Written Opinion of the International Searching Authority for International Application No. PCT/SG2012/000309, pp. 1-7.

* cited by examiner

*Primary Examiner* — Allen T Cao

(57) ABSTRACT

According to an embodiment of the present invention, a data storage device comprising a motor having a stator is disclosed. The stator may include a substrate having a first surface and a second surface opposite to the first surface; and a n-phase winding arrangement having n phase windings; wherein each phase winding comprises m flat fractional-pitch coils arranged on the first surface of the substrate such that the coils are spaced apart uniformly along a closed loop and connected in series; wherein each coil together with an angular section of the substrate between the coil and an adjacent coil of the same phase winding defines a stator pole-pair; and wherein m is an integer larger than 1.

19 Claims, 63 Drawing Sheets

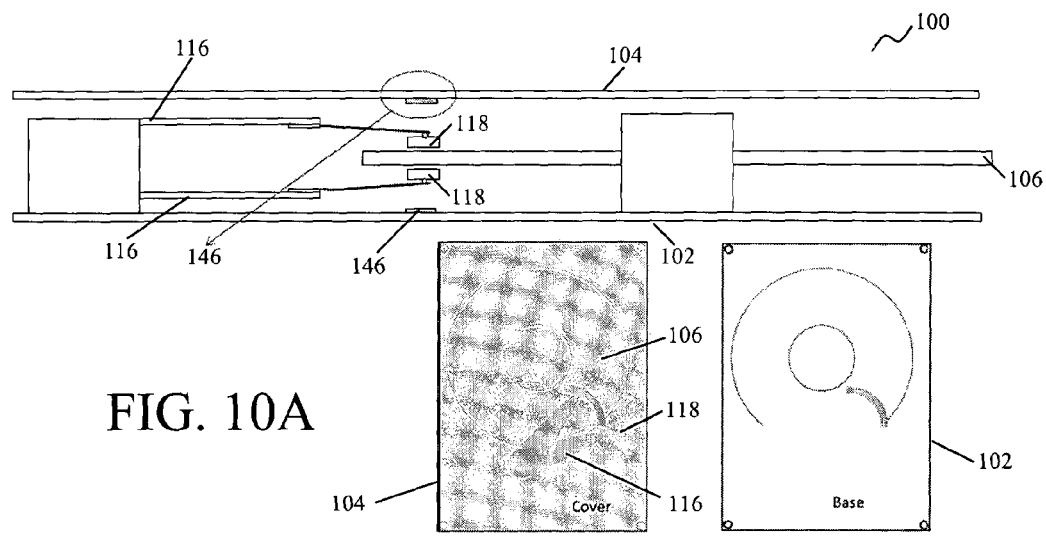
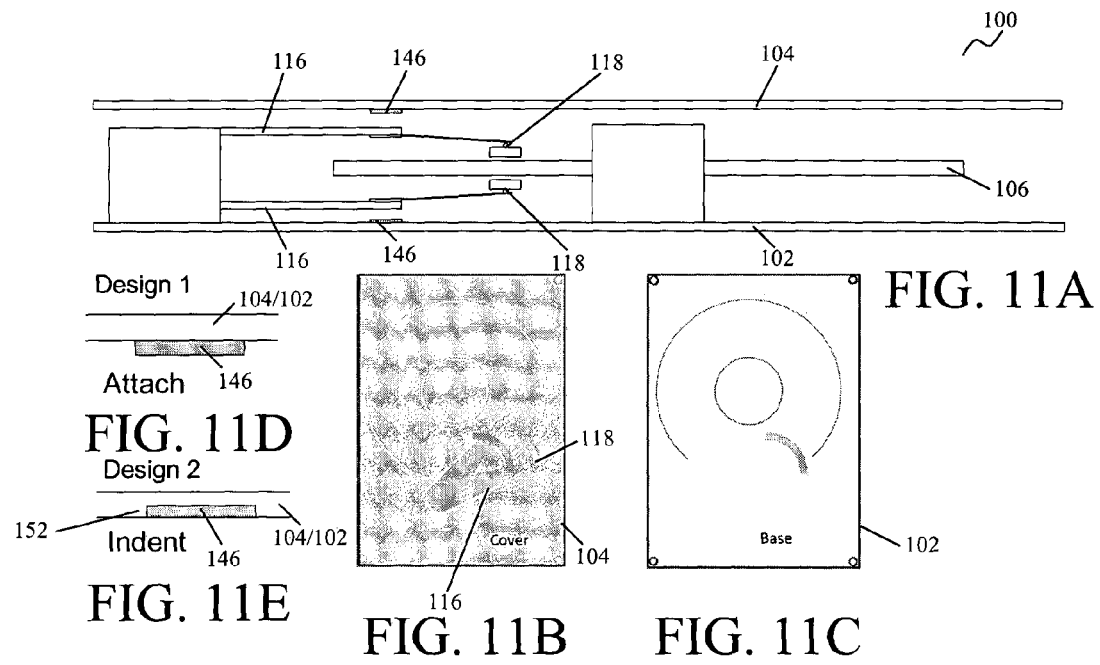

Coil line on the top layer          Coil line on the bottom layer

DATA STORAGE DEVICE

CROSS-REFERENCE TO RELATED APPLICATION

This application claims the benefit of a 371 of international application No. PCT/SG2012/000309, filed 31 Aug. 2012 which claims the benefit of priority of U.S. provisional application No. 61/530,175, filed 1 Sep. 2011, the content of the application above are hereby incorporated by reference in their entirety for all purposes.

TECHNICAL FIELD

The present invention generally relates to data storage, and more particularly relates to data storage products, including methods and apparatus for storing information therein.

BACKGROUND

Mobile computing and/or communication devices are becoming smaller thereby driving the weight and size of data storage devices down, while requiring large storage capacity in the terabyte range and low power consumption. For example, many mobile computing devices are assuming a thin profile and small form factor for ease of transport and universal operationability. Traditional data storage devices for storing large amounts of data, such as disk drives, have a thickness which is incompatible for such applications.

Thus, what is needed is a light-weight, ultra thin data storage device with a small form factor and yet be capable of large storage capacities at low power consumption levels. Furthermore, other desirable features and characteristics will become apparent from the subsequent detailed description, taken in conjunction with the accompanying drawings and this background of the disclosure.

SUMMARY

According to an embodiment, a data storage device comprising a motor having a stator is disclosed. The stator may include a substrate having a first surface and a second surface opposite to the first surface; and a n-phase winding arrangement having n phase windings; wherein each phase winding comprises m flat fractional-pitch coils arranged on the first surface of the substrate such that the coils are spaced apart uniformly along a closed loop and connected in series; wherein each coil together with an angular section of the substrate between the coil and an adjacent coil of the same phase winding defines a stator pole-pair; and wherein m is an integer larger than 1.

According to an embodiment, a data storage device is disclosed. The data storage device may include a media, the media may include a servo layer configured to provide servo information; and a data recording layer configured to record data; wherein the servo information is provided on the servo layer distinct from the data recording layer so as to allow continuously available servo readback to be used for controlling at least one component of the data storage device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 10A to 10C show respective side view, top view and bottom view of a data storage device comprising a plurality of shock absorbers respectively attached to a cover and a base plate corresponding to the distal ends of a head-gimbal-suspension assembly (HGSA) in accordance with an embodiment of the invention;

FIGS. 11A to 11C show respective side view, top view and bottom view of a data storage device comprising a plurality of shock absorbers respectively attached to a cover and a base plate corresponding to the distal ends of the actuator arms in accordance with an embodiment of the invention;

FIG. 11D shows a side view of a shock absorber disposed on a substantially flat region of a cover and/or base plate in accordance with an embodiment of the invention;

FIG. 11E shows a side view of a shock absorber disposed in a recess of a cover and/or base plate in accordance with an embodiment of the invention;

FIGS. 12A, 12B, 12C show respective side view, top view and bottom view of a data storage device comprising a plurality of shock absorbers formed as dimples respectively attached to a cover and a base plate in accordance with an embodiment of the invention;

DETAILED DESCRIPTION

Figure 1:
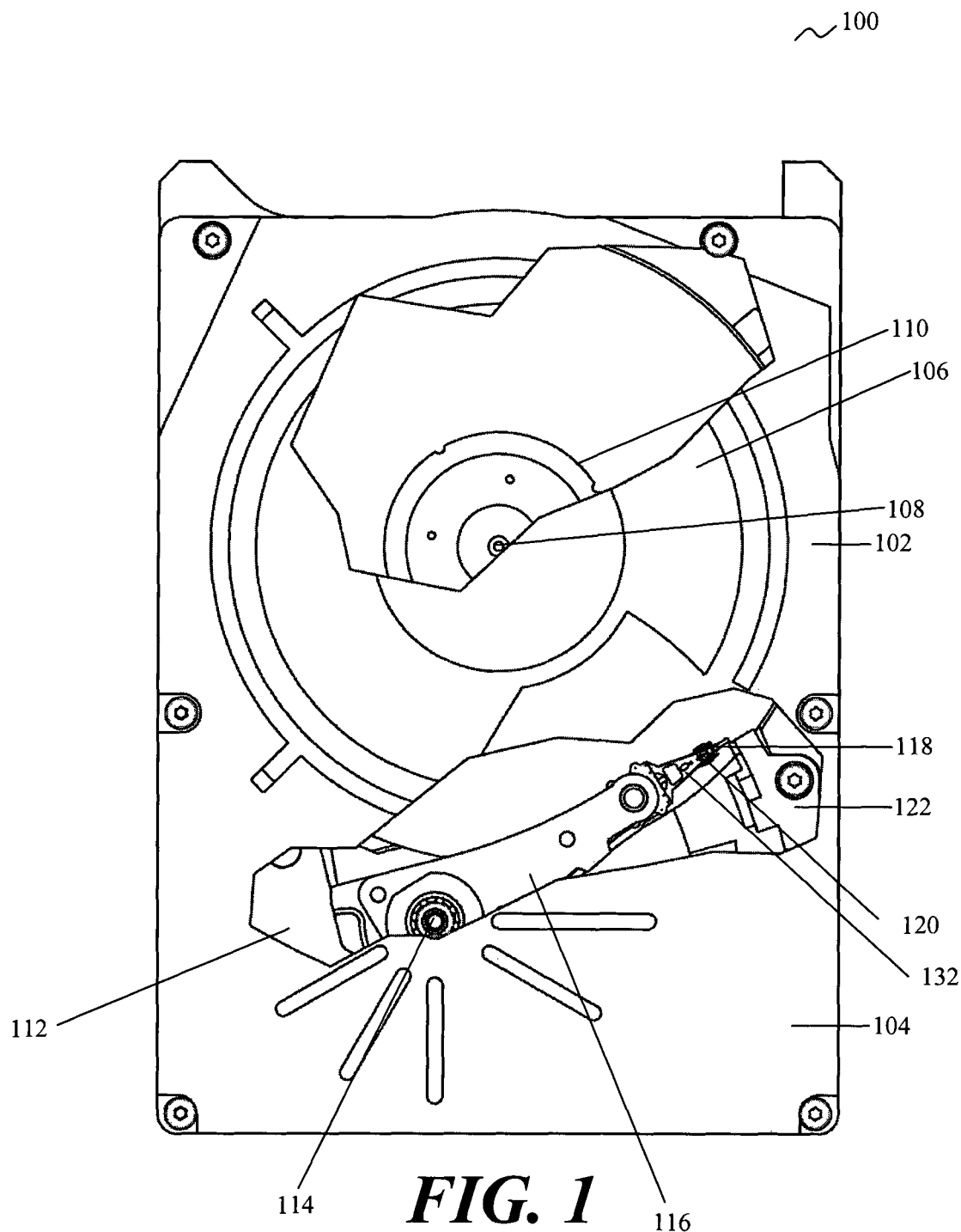
FIG. 1 shows a top view of a data storage device having a base plate with a complementary cover in accordance with an embodiment of the invention.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the devices may be analogously valid for the other device.

In various embodiments, the n-phase winding arrangement is configured such that one coil from one phase winding is arranged adjacent to a coil from another phase winding within each stator pole-pair in a repeated arrangement along the closed loop.

In various embodiments, each phase winding further includes a further m flat fractional-pitch coils arranged on the second surface of the substrate such that the m flat fractional-pitch coils of each phase winding are at least substantially in alignment with the further m flat fractional-pitch coils of the same phase winding.

In various embodiments, each coil on the first surface is connected to a corresponding coil of the same phase winding on the second surface of the substrate via one of m through holes formed in the substrate.

In various embodiments, each coil is wound in a concentric arrangement.

In various embodiments, the stator pole-pair comprises 360 electrical degrees in one cycle of flux distribution.

In various embodiments, each coil in each phase winding comprises a coil pitch of about (360/n) electrical degrees.

In various embodiments, each coil in each phase winding of a 3 phase winding comprises a coil pitch of about 120 electrical degrees.

In various embodiments, each coil on the at least one surface of the substrate comprises an axis of rotation substantially perpendicular to the first surface of the substrate.

In various embodiments, the substrate is a printed circuit board and the coils comprise a conductive material printed on the printed circuit board.

In various embodiments, n is an integer.

In various embodiments, the data storage device may further include a base plate, wherein the base plate comprises a substantially circular recess bounded by a wall.

In various embodiments, the data storage device may further include a cover disposed over the base plate.

In various embodiments, the cover may include at least one selectively indented region configured to increase the stiffness of the cover.

In various embodiments, the at least one selectively indented region may include a plurality of radial regions and/or a plurality of radial arc-shaped regions.

In various embodiments, the cover may further include a planar surface with a plurality of stiffening ribs.

In various embodiments, the data storage device may further include an indented pad disposed on a surface of the cover facing away from a disk.

In various embodiments, the data storage device may further include a shock absorption system configured to prevent the cover from touching a surface of a disk when the cover is subjected to external forces.

In various embodiments, the shock absorption system may include a plurality of shock absorbers.

In various embodiments, the shock absorption system may include a combination of at least one stopper and an load/unload ramp.

In various embodiments, the shock absorption system may include at least one disk limiter positioned at selected positions at a peripheral of the disk or positioned on a surface of the cover and/or the base plate.

In various embodiments, the at least one disk limiter may include dimples.

In various embodiments, the data storage device may further include an actuator.

In various embodiments, the actuator may include two actuator arms.

In various embodiments, each of the two actuator arm may include a distal end bearing a head-gimbal-suspension assembly (HGSA).

In various embodiments, each of the plurality of shock absorbers are positioned on an interior surface of the cover and an interior surface of the base plate corresponding to the head-gimbal-suspension assembly or corresponding to the distal end of each of the two actuator arms.

In various embodiments, the actuator may include an actuator body and a pivot cartridge for rotational movement about a pivot cartridge axis.

In various embodiments, the pivot cartridge may include a set of ball bearings between an inner race and an outer race.

In various embodiments, the inner race may be formed as a shaft.

In various embodiments, the outer race may be formed by a bearing sleeve and a locker adhesively attached to the bearing sleeve.

In various embodiments, the data storage device may further include a pre-amplifier chip positioned between the two actuator arms.

In various embodiments, the data storage device may further include a flexible circuit positioned between and attached to the two actuator arms.

In various embodiments, the pre-amplifier chip is positioned on the flexible circuit.

In various embodiments, the actuator may include a second stage micro-actuator.

In various embodiments, the data storage device may further include a slider attached to an end of the actuator.

In various embodiments, the slider may be configured with an air bearing surface comprising a plurality of grooves.

In various embodiments, the air bearing surface may include a small pad on a trailing pad.

In various embodiments, the data storage device may further include a read head arrangement disposed on one end of the slider.

In various embodiments, the read head arrangement may include a sensor, the sensor including a first spin valve; a second spin valve; and a separator structure positioned between the first spin valve and the second spin valve.

In various embodiments, the read head arrangement further includes a first side magnetic shield; and a second side magnetic shield; wherein the first side magnetic shield and the second side magnetic shield are arranged on opposing sides of the sensor in a cross track direction.

In various embodiments, the read head arrangement further including a top magnetic shield; and a bottom magnetic shield; wherein the top magnetic shield is arranged on a top side of the sensor and the bottom magnetic shield is arranged on a bottom side of the sensor in a downtrack direction.

In various embodiments, the data storage device further includes a sealed housing.

In various embodiments, the data storage device further includes a battery arranged in the sealed housing; an inductive coupling means arranged in the sealed housing and configured for coupling the battery to an external power source arranged outside of the sealed housing; and an internal transceiver means arranged in the sealed housing and configured for communicating wireless with an external transceiver means arranged outside of the sealed housing.

In various embodiments, the media further includes a first intermediate layer disposed between the servo layer and the data recording layer.

In various embodiments, the servo layer is configured to provide a position error signal for location detection.

In various embodiments, the position error signal is configured as a feedback clock signal for synchronization of data read and write operations.

In various embodiments, the servo layer includes a nucleation field ($H_n$) larger than a saturation field required for saturing data writing in the data recording layer.

In various embodiments, the servo layer includes a coercive squareness value close to one.

In various embodiments, the data storage device further includes an external thermal source configured to provide thermal energy to assist writing of a servo signal onto the servo layer.

In various embodiments, the servo layer may include a continuous track structure with a plurality of servo layer tracks.

In various embodiments, each of the plurality of servo layer tracks is being assigned a frequency signal.

In various embodiments, the data storage device further includes a head, the head including a reader.

In various embodiments, the reader is configured to detect a servo layer signal and a recording layer signal when reading signals from the media.

In various embodiments, the recording layer signal including a maximum run-length constraint in order to reduce an interference between the recording layer signal and the servo layer signal.

In various embodiments, the head further including a writer.

In various embodiments, the data storage device further includes a first pre-amplifier and a second pre-amplifier.

In various embodiments, the first pre-amplifier may be coupled to the reader and configured to receive a signal read by the reader during write operations.

In various embodiments, the second pre-amplifier may be coupled to the writer and configured to amplify a data signal before providing an amplified data signal to the writer for writing data into the data recording layer.

In various embodiments, the media may include a plurality of servo patterns and a plurality of data sectors in one sector.

In various embodiments, the plurality of data sectors may be being written on the data recording layer.

In various embodiments, the plurality of servo patterns may include a first servo pattern including an automatic gain control; a sector address mark; and a GrayCode; and a second servo pattern including a plurality of server bursts.

In various embodiments, the first servo pattern and the second servo pattern are being written on the servo layer.

In various embodiments, the first servo pattern is being written on the servo layer and the second servo pattern is being written on the data recording layer.

FIG. 1 is a top view of a data storage device 100 having a base plate 102 with a complementary cover 104 for coupling thereto to define a volume in which various components of the data storage device 100 resides. The cover 104 is shown broken away to reveal a disk 106 secured to a spindle motor 108 by a disk clamp 110 for rotational movement about first axis, as well as an actuator 112. The actuator 112 includes a pivot 114 for rotational movement about a second axis and at least one actuator arm 116, each actuator arm 116 having a distal end bearing a head-gimbal-suspension assembly (HGSA) 118 such that rotation of the actuator 112 about the second axis brings the read/write devices 118 into a desired proximity with the desired track on the disk 106. The actuator 112 could include a second stage micro-actuator such that the slider 120 can have either an independent, additional translational or rotational movement to enhance the accuracy for bringing the read/write devices 118 into a desired proximity with the desired track on the disk 106. In one embodiment, the actuator 112 has two actuator arms 116, each supporting a HGSA 118 for writing to/reading from the two opposing faces of the disk 106. In non-contact-start-stop embodiments of the data storage device 100, a load/unload ramp 122 is provided adjacent the disk 106 for holding the HGSA 118 when the data storage device 100 is not in operation. Each HGSA or head 118 is found on a slider 120 shaped to generate a desired balance of positive and negative pressures, which in conjunction with the air flow dynamics generated around the slider 120 when the disk 106 is spinning, and the effect of the gimbal and suspension, enables the head 118 to "fly" at a desired fly height relative to the surface of the disk 106. It can thus be appreciated that the minimum spacing required for these components to come together and achieve the desired flight dynamics may create difficulties for one seeking to reduce the overall thickness of the data storage device 100. This is one of various reasons why simply scaling down the size of the various components will not produce a data storage device 100 with the necessary performance and reliability to satisfy consumer needs.

In addition to the minimal space taken up by the various components on the base plate 102 (in terms of real estate and footprint), it will be appreciated that, owing to the complex dynamics between the various components in a data storage device 100, the volume defined by the base plate 102 and the cover 104 cannot be simply scaled down without risking adverse impact to the performance and reliability of the data storage device 100. This is evident from the comparison in Table 1 of resonance frequencies of the base plate of a conventional 7 millimeters (mm) thick, 2.5 inch form-factor data storage device against simulated figures of the base plate of a hypothetical 2.5 inch form-factor data storage device with all components simply scaled down to fit an overall thickness of 5 mm.

TABLE 1

| Resonance frequencies (Hertz) | |
| --- | --- |
| Conventional 7 mm data storage device | Simulated 5 mm data storage device |
| 1712 | 1280 |
| 3169 | 2325 |
| 3204 | 2379 |
| 3934 | 2892 |
| 4793 | 3534 |
| 5375 | 3998 |
| 6149 | 4576 |
| 6831 | 5077 |
| 6980 | 5252 |
| 8592 | 6371 |

The simulation results show that the hypothetically scaled down data storage device exhibits lower resonance frequencies which in turn will significantly adversely affect the dynamic behaviors of data storage device operations and thereby lower overall disk drive performance, especially in terms of speed and storage capacity, for the same form-factor. The term "form-factor" as used herein refers to the conventional overall width and length dimensions of a data storage device for a given diameter of the media. Hence, simply scaling down a conventional data storage device is not feasible if consumer expectations and reliance on product performance and reliability are to be met.

Base Plate and Cover

Figure 2:
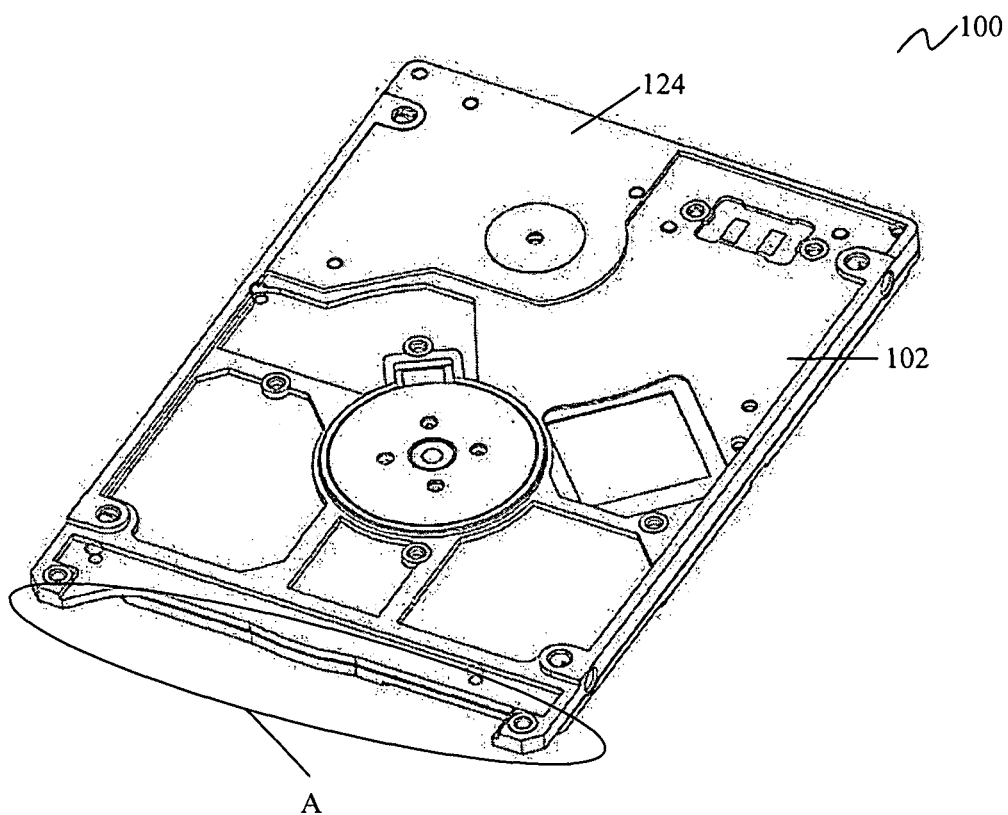
FIG. 2 shows an underside view of a data storage device having a base plate including an external face that is recessed relative to selective portions in accordance with an embodiment of the invention.

FIG. 2 shows an "underside" of the data storage device 100. According to one embodiment of the proposed data storage device 100, there is a base plate 102 and a cover (not shown) which when coupled together define an overall thickness of no more than 5 mm. The base plate 102 may have an external face that is recessed relative to selective portions, such as frame elements and bosses, as shown in FIG. 2. A printed circuit board assembly 124 with various electronic components is attached (by screws or such fasteners) to the external face of the base plate 102, preferably with the thickness of the printed circuit board assembly 124 substantially sitting in the recessed area so that the thickness of the printed circuit board assembly 124 does not contribute to the overall thickness of the data storage device 100. In another embodiment, such as one illustrated in FIG. 3, the external face of the base plate 102 may be substantially flat or in a same plane without raised or recessed regions. The printed circuit board 124 may be selected to be about the same size as the base plate 102 or significantly smaller.

Figure 4:
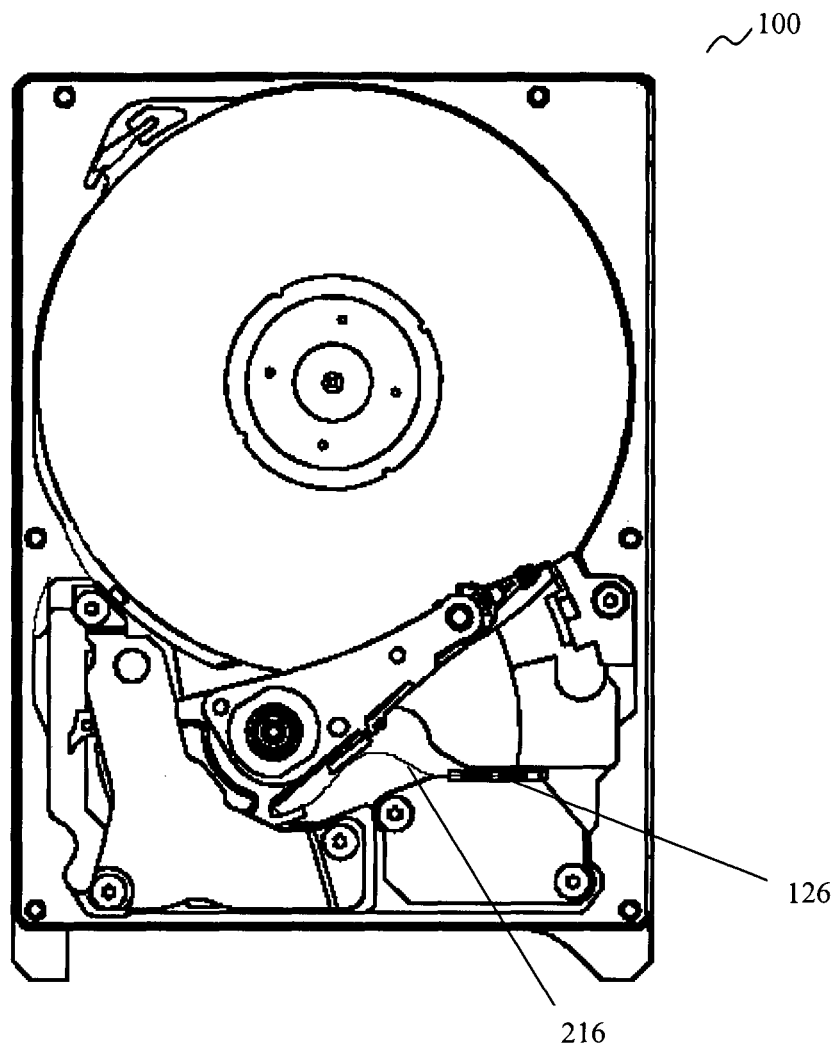
FIG. 4 shows a perspective view of a data storage device having a connector in accordance with an embodiment of the invention.

In one embodiment, communications with an external or host device is via a connector (not shown). As shown in FIG. 2 and denoted by circled portion A, the base plate is shaped at one end for receiving a connector mateable with a complimentary connector on the external or host device. The connector is mounted to the printed circuit board assembly 124, and is disposed at the disk-end of the data storage device 100. In another embodiment, the connector is mounted to the printed circuit board 124, and is disposed at the actuator-end of the data storage device 100, as shown in FIG. 4.

Figure 3:
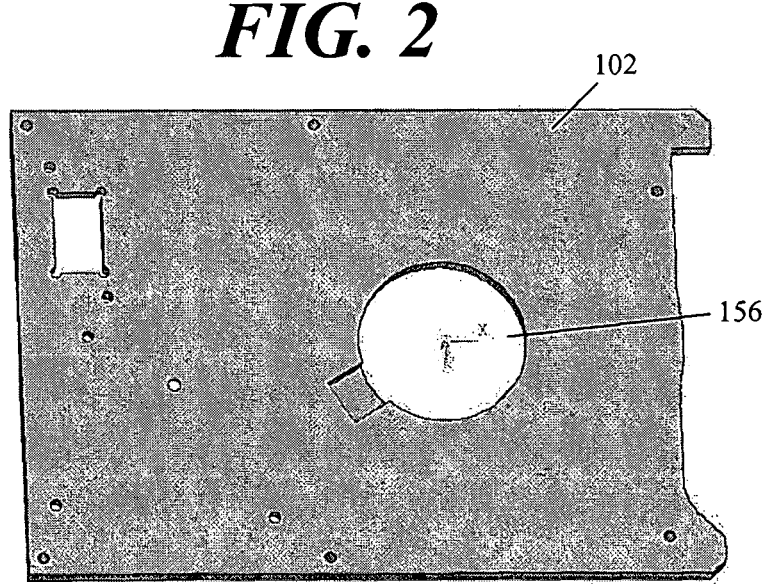
FIG. 3 shows a top view of a data storage device having a base plate including an opening for mounting a spindle motor in accordance with an embodiment of the invention.
Figure 5:
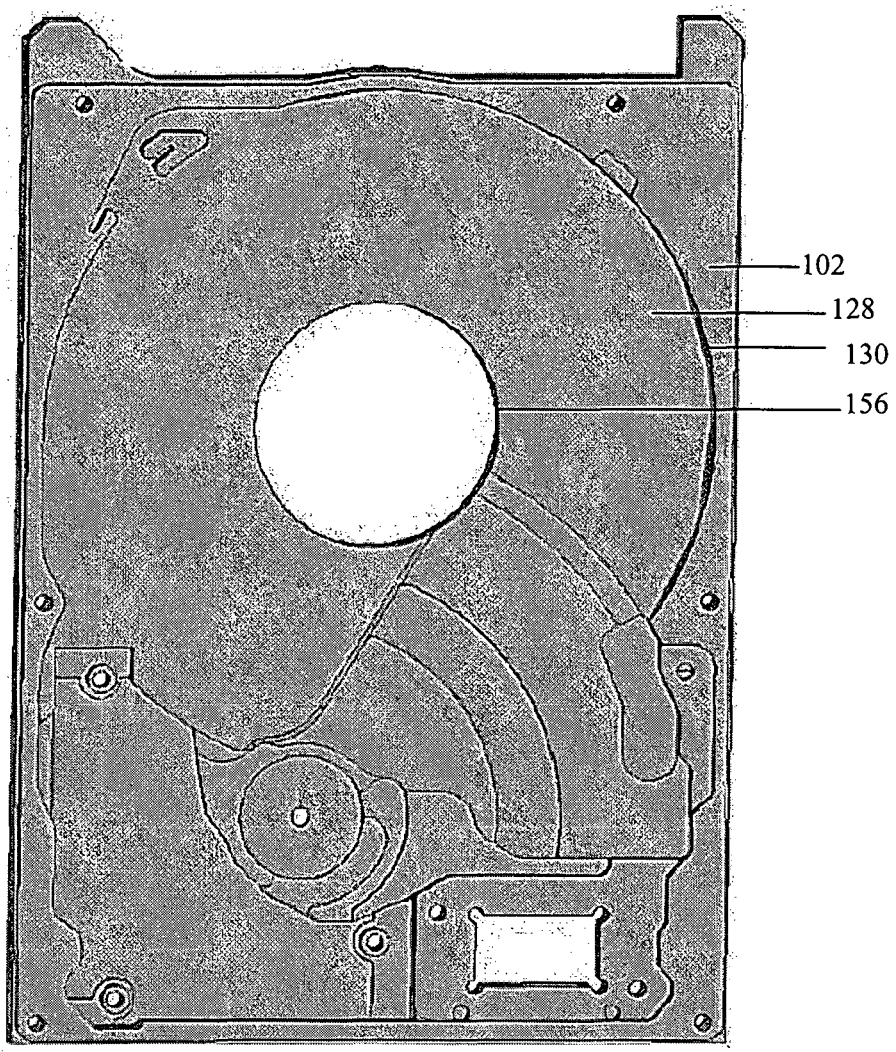
FIGS. 5 and 6 show respective top views of a data storage device having a base plate, an interior face of the base plate including a substantially circular recess bounded by a wall in accordance with an embodiment of the invention.

The base plate 102 includes an opening 156 for mounting a spindle motor, as illustrated by FIG. 3 and FIG. 5. Advantageously, the region of the base plate 102 where the disk stack assembly (comprising the spindle motor 108 with at least one disk 106 mounted thereon) is substantially flat.

Figure 6:
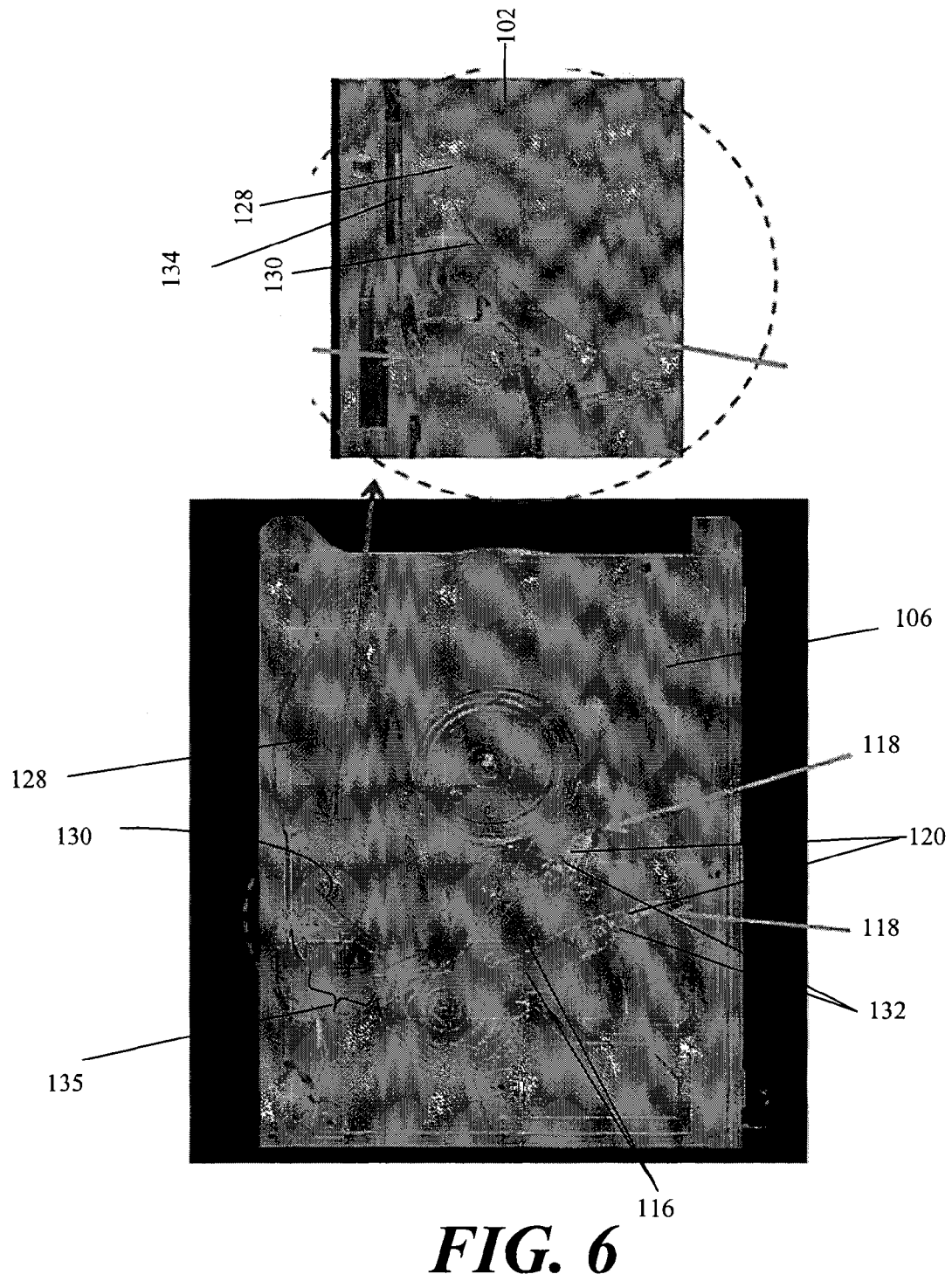

Referring to FIG. 5 and FIG. 6, the interior face of the base plate 102 may include a substantially circular recess 128 bounded by a wall 130 as shown by the base plate 102 to facilitate formation of desired boundary conditions at the edge of the disk 106. Further, a special airflow divert path (as denoted by the arrows in FIG. 6) may be provided to guide the airflow and reduce the airflow impinging on the actuator arm 116, the suspension 132 and the slider 120, therefore, results in a reduced flow-induced-vibration on these components. The suspension 132 is a thin stainless steel piece that extends from the actuator arm 116. Further, at the distal end of the suspension 132 and mounted on the face of the suspension 132 facing the disk 106 is a slider 120. The read/write devices 118 are carried on the slider 120. As shown, the wall 130 may be discontinued, interrupted by a gap 134, reduced in height, or broken to form an entry into a side channel 135 in which a filter may be placed for filtering contaminants and particulates from the interior of the data storage device 100.

Figure 7A:
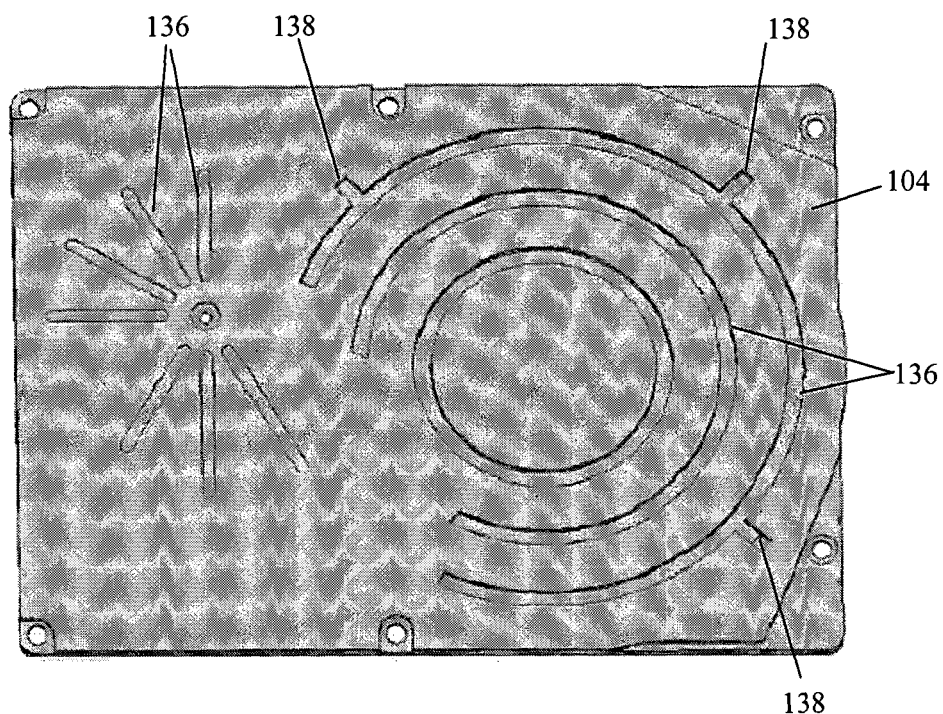
FIG. 7A shows a top view of a cover including selectively indented regions in accordance with an embodiment of the invention.
Figure 7B:
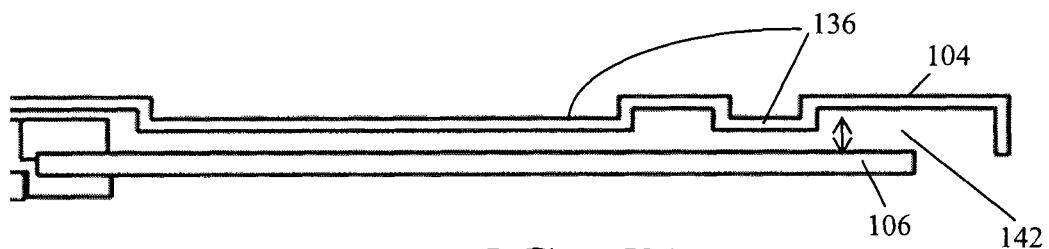
FIG. 7B shows a cross-sectional side view of a cover including selectively indented regions in accordance with an embodiment of the invention.
Figure 7C:
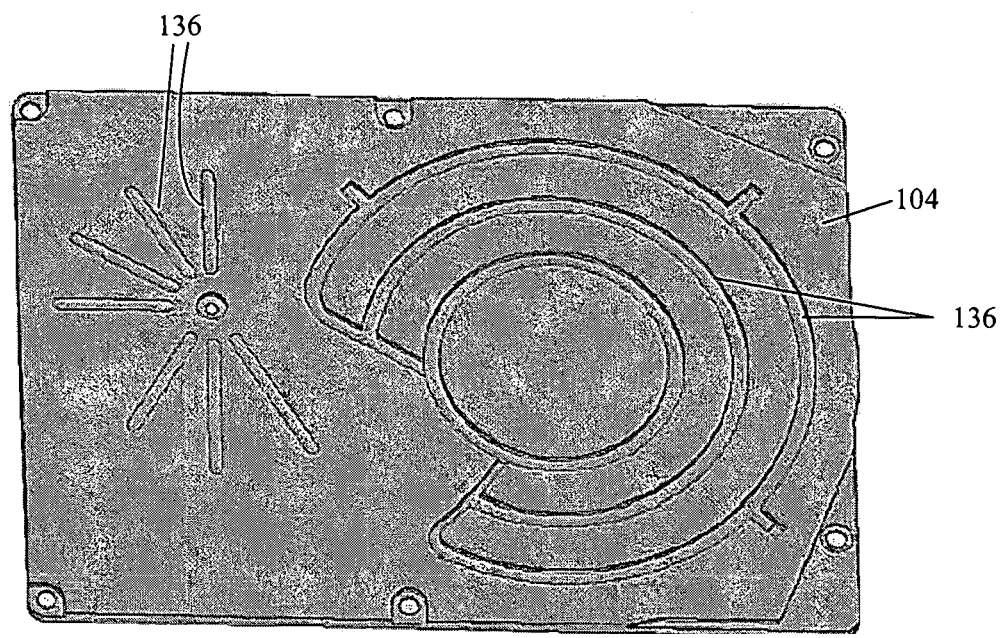
FIG. 7C shows a top view of a cover including stiffening ribs in accordance with an embodiment of the invention.

As shown in FIG. 7A and FIG. 7C, the cover 104 may include at least one selectively indented or embossed region 136 to increase the stiffness of the cover 104 without significantly disturbing the air flow dynamics. The word "air" is used in the present application to refer generally to the inert gas or gaseous mixture found in the data storage device 100. For example, the selectively embossed region 136 may be features arranged in a radial fashion, extending away from a point defined by the second axis. In another example, the at least one selectively embossed region 136 may be arc-shaped, circumscribing part of the disk 106 when in assembly while not interfering with the movement of the actuator (not shown) as it moves the HGSA (not shown) over the disk 106. The arc-shaped selectively embossed region 136 may include two or more radial supports 138 that extend to contact the base plate (not shown) when in assembly. This advantageously renders greater stiffness to the cover 104 and improves the protective function of the cover 104, a functionality which is particularly important in mobile applications of the data storage device 100.

It is proposed in one embodiment to provide a cover 104 with a planar surface with stiffening ribs or embossed regions 136 that is substantially parallel to the disk 106 when in assembly such as shown in FIG. 7A, FIG. 7B and FIG. 7C. The indented area 136 of the top cover 104 results in a reduced air gap 142 between the top cover 104 and the disk surface 106, which effectively suppresses the airflow turbulent intensity inside the data storage device 100. Therefore, the force oscillation on the surfaces of voice coil motor (not shown), actuator arm (not shown), suspension (not shown) and slider (not shown) is reduced, which results in a reduced flow-induced-vibration.

Figure 8A:
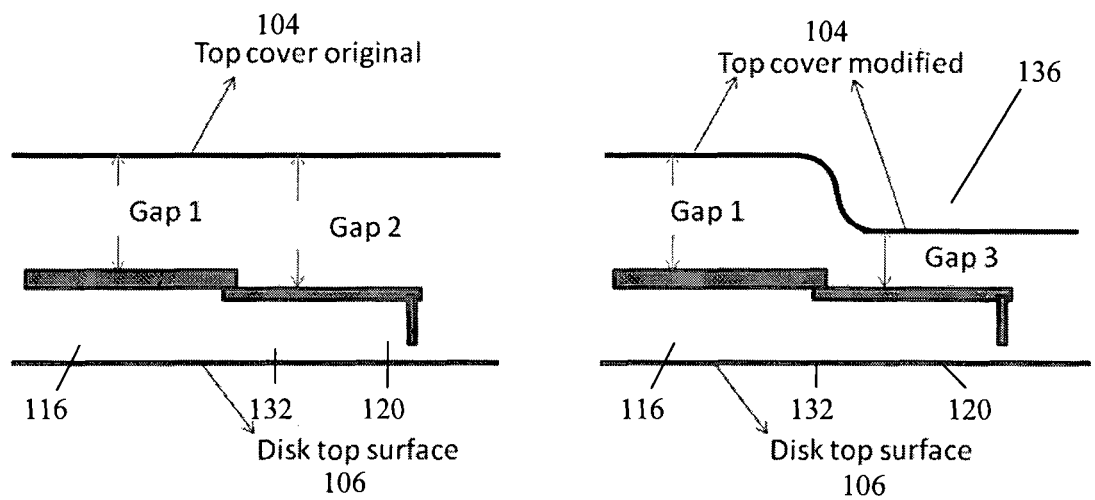
FIGS. 8A and 8B show respective comparisons between cross-sectional views of an original cover and a cover including selectively indented regions and the relation to a disk surface in accordance with an embodiment of the invention.
Figure 8B:
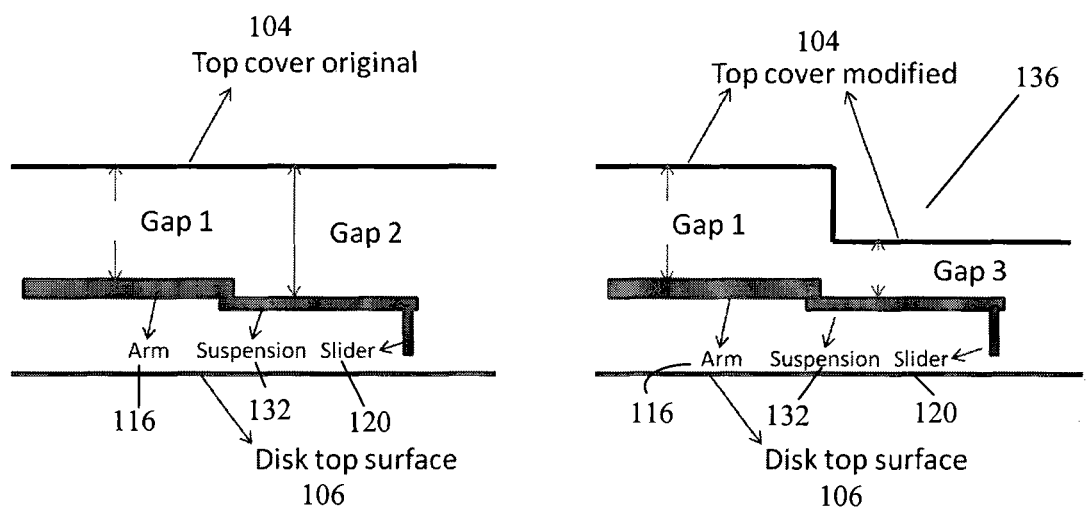

Furthermore, as shown in FIG. 8A and FIG. 8B, an indented area 136 may be provided right above the suspension 132 and slider area 120, which further stabilizes the airflow in this critical area and substantially reduces the vibration of the slider 120. Therefore, the track density of magnetic recording is increased.

As mentioned, the air flow dynamics within the volume defined by the cover 104 and the base plate 102 can affect the performance of the data storage device 100, especially because of the delicate balance of forces acting on the slider 120 when the data storage device 100 is in operation. As the disk 106 spins, a volume of air will be dragged along by the disk surfaces 106. The interior faces of the cover 104 and the base plate (not shown) are selectively contoured for the desired air flow dynamics when the data storage device 100 is in operation. This may involve a planar surface with stiffening ribs (not shown) that is substantially parallel to the disk 106 when in assembly of the top cover 104 and a substantially circular recess (not shown) bounded by a wall (not shown) as shown by the base plate to facilitate formation of desired boundary conditions at the edge of the disk 106.

Figure 9A:
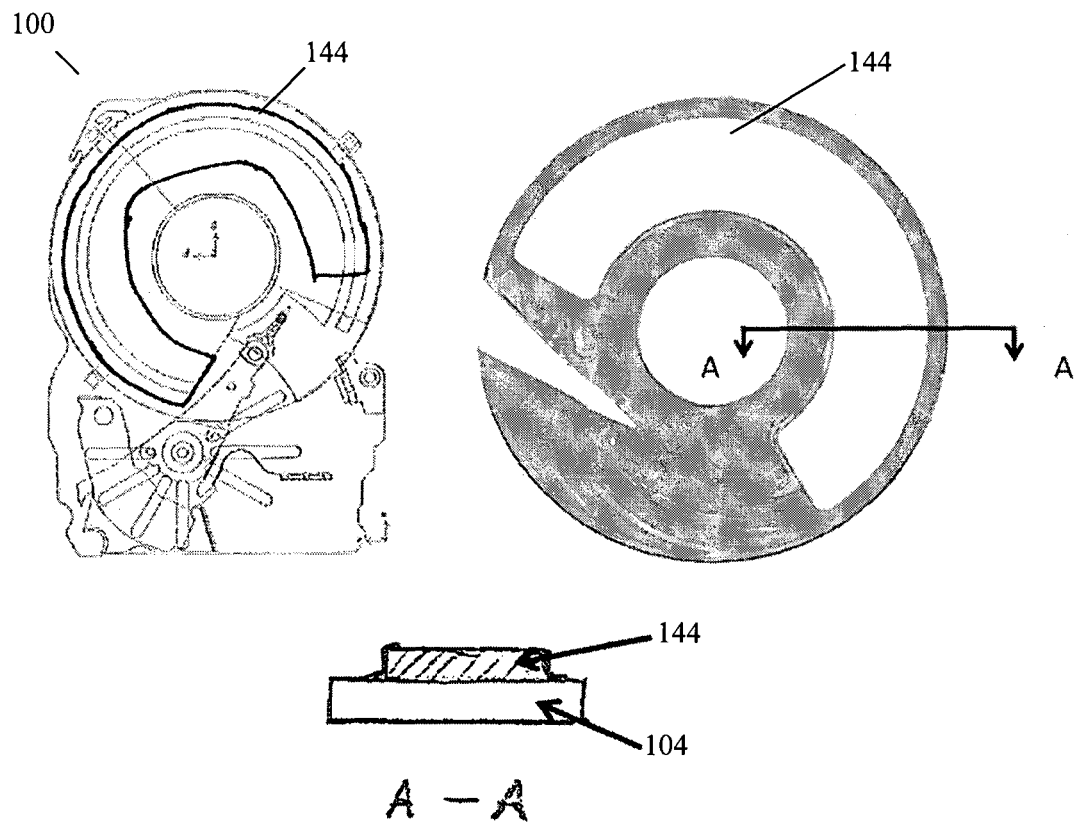
FIG. 9A shows respective top view, top exploded view and cross-sectional side view of an indented pad added to a top cover positioned above a disk in accordance with an embodiment of the invention.
Figure 9B:
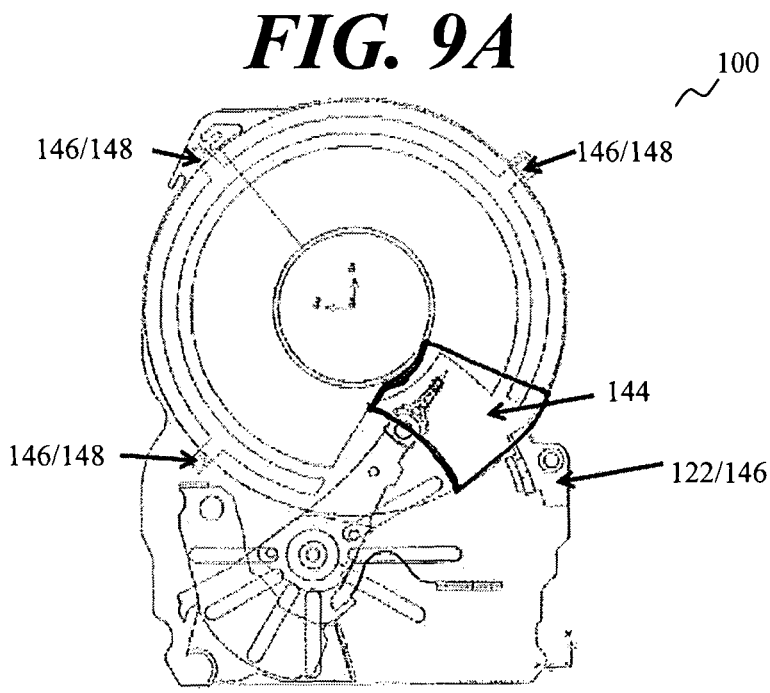
FIG. 9B shows a top exploded view of a data storage device comprising a shock absorption system including a plurality of stoppers and a load/unload ramp in accordance with an embodiment of the invention.

Alternatively, as shown in FIG. 9A and FIG. 9B, an indented area or a pad 144 can be added to the top cover 104 above the disk (not shown), so as to serve as an air shroud for the suppression of airflow turbulence and reduction of flow-induced vibrations.

Figure 9C:
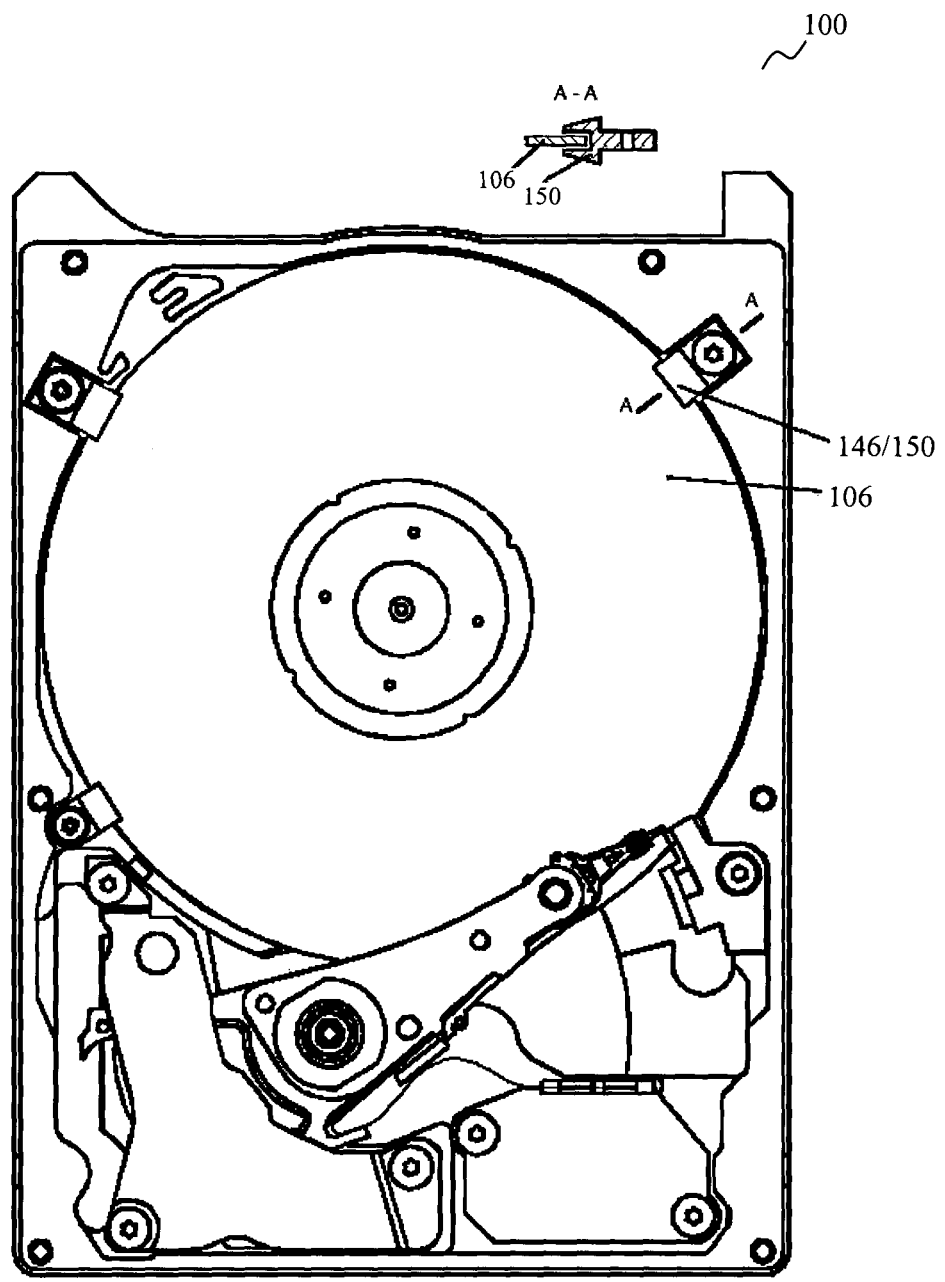
FIG. 9C shows a top view of a data storage device comprising a shock absorption system including a plurality of disk limiters in accordance with an embodiment of the invention.

To improve the robustness and mobile performance of the data storage device 100, a shock absorption system 146 may be integrated therein. Stoppers 148 as shown in FIG. 9B and FIG. 9C, together with the load/unload ramp 122 may be provided to prevent the cover (not shown) from touching the disk surface when the cover is subjected to external forces. In another aspect, the shock absorber system 146 may include at least one disk limiter 150 disposed at selected points at the peripheral of the at least one disk 106 in the data storage device 100, as illustrated in FIGS. 9A and 9B. In an embodiment in which the data storage device 100 includes one disk 106, the disk limiter 150 may conceivably be monolithically formed. One example, as shown by the cross-section A-A in FIG. 9C, proposes a side profile complementary to the shape of the edge of the disk 106. In other embodiments, the disk limiter 150 may be configured for ease of manufacturability by top-down assembly.

Shock absorbers 146 may be attached to at least one region of the interior face of the cover 104 and the base plate 102 to dampen and reduce any shock in the event an actuator arm 116 or head-gimbal-suspension assembly (HGSA) 118 impacts the cover 104 or the base plate 102, as shown in FIG. 10A. Proposed locations for the shock absorbers 146 include regions of the interior face of the cover 104 and interior face of the base plate 102 where the distal ends of the HGSAs 118 (as in the example provided in FIGS. 10A, 10B and 10C) or the actuator arms 116 (as in the example shown in FIGS. 11A, 11B and 11C) may experience larger displacements and therefore likely to impact with the cover 104 or the base plate 102 during the shock events. As illustrated, the at least one shock absorber 146 may be disposed on a part of the housing (which refers to the cover 104 and/or the base plate 102) in a curve, a straight line, a geometrical shape, or an irregular shape. One embodiment of the shock absorber 146 includes one being disposed on a substantially flat region of the interior face of the cover 104 and/or base plate 102, such as in FIG. 11D. Another embodiment of the shock absorber 146 include one being disposed in a recess, indentation, or embossed region 152 (generally referred to as recess) on the interior face of the cover 104 and/or base plate 102, as shown in FIG. 11E. Yet alternatively, one embodiment of the shock absorber 146 may be disposed on a recess 152 on the interior face of the cover 104 and/or base plate 102 such that the shock absorber 146 protrudes from the recess 152 so as to provide the desired damping. The thickness of the shock absorber 146 may vary from tens of micrometers to hundreds of micrometers. The shock absorber 146 may be selected from elastomeric materials, plastic films, ultra-violet curable polymer, which may be self-adhesive to the selected region of the cover 104 and/or base plate 102 or attachable by other means to the selected region of the cover 104 and/or base plate 102 without the use of adhesives that may contribute to outgassing issues.

Figure 12A:
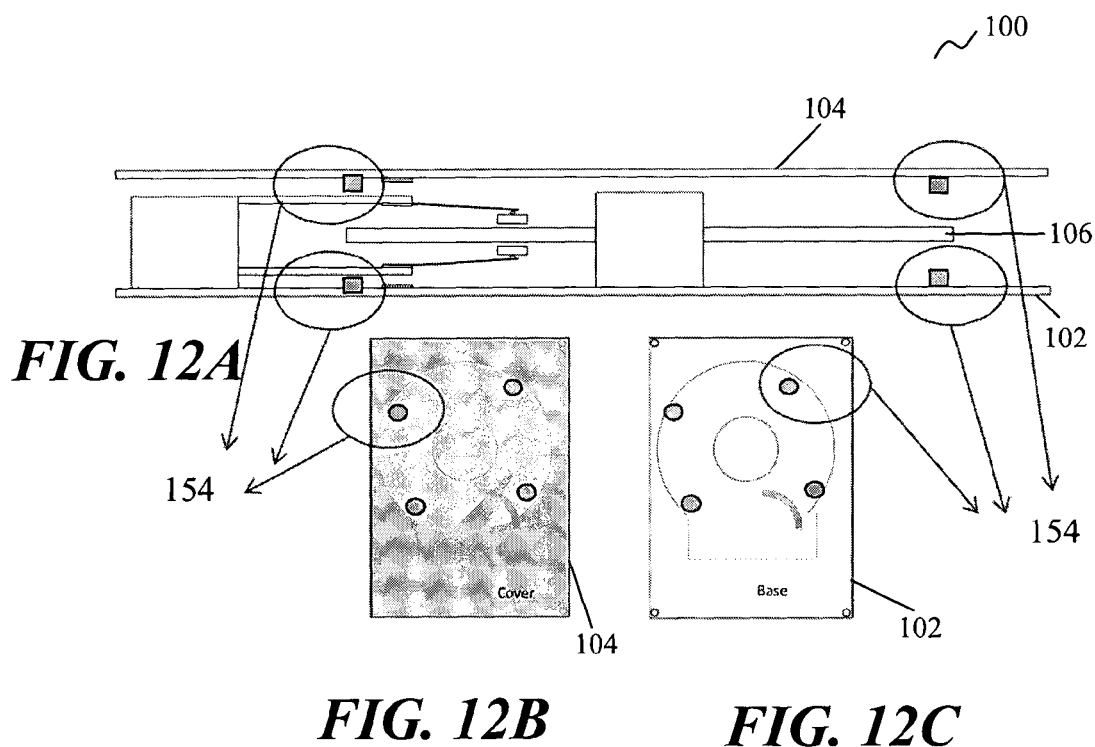

In another embodiment as illustrated in FIGS. 12A, 12B and 12C, dimples 154 can be formed on the selected points on the cover 104 and the base plate 102 corresponding to the circumference of the disk 106 when in assembly. The dimples 154 can be directly machined on the cover 104 and/or the base plate 102, or can be formed in place by selected polymers such that the dimples 154 serve as a form of disk limiters.

Spindle Motor

Figure 13A:
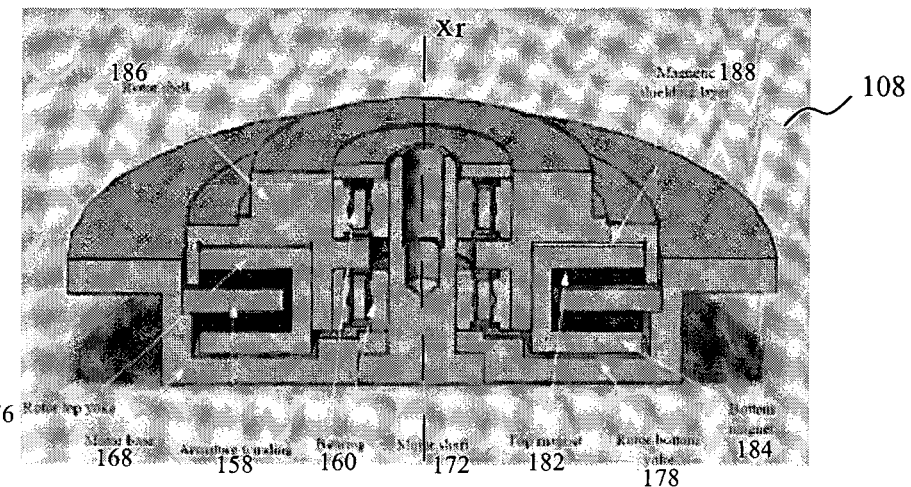
FIGS. 13A and 13B show respective cross-sectional view and exploded view of a data storage device formed as a permanent magnet synchronous motor configured with an axial electromagnetic field in a coreless structure (AEMC-PMSM) in accordance with an embodiment of the invention.
Figure 13B:
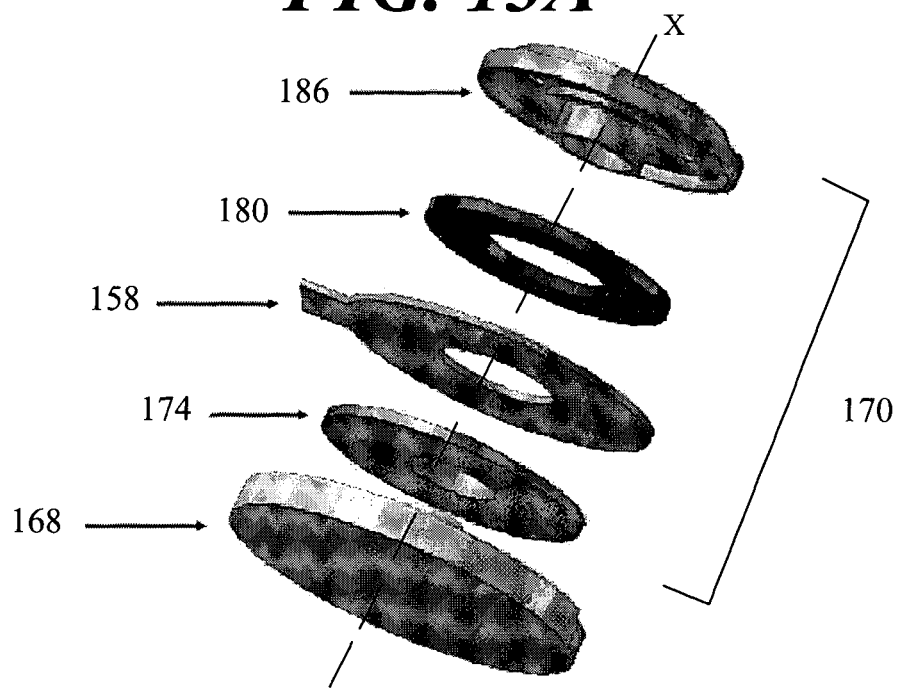

FIGS. 13A and 13B show respective cross-sectional and exploded views of a data storage device formed as a permanent magnet synchronous motor 108 configured with an axial electromagnetic field in a coreless structure (AEMC-PMSM) in accordance with an embodiment of the invention.

The motor 108 includes a motor base 168, a motor shaft 172 extending from the motor base 168, and a rotor 170 (a combination of a 3D rotor yoke 174, a 2D magnet disk 180 and a rotor shell 186 as shown in FIG. 13B) which is pivotally mounted about a geometric axis of rotation Xr, in relation to the motor base 168. The rotor 170 further includes a 3D rotor yoke 174 including a rotor top yoke 176 and a rotor bottom yoke 178. The rotor 170 further includes a 2D magnet disk 180, the 2D magnet disk 180 including a top magnet 182 and a bottom magnet 184. The top magnet 182 is positioned in contact with the rotor top yoke 176 and the bottom magnet 184 is positioned in contact with the rotor bottom yoke 178. The rotor 170 further includes a 2D winding or an armature winding 158 positioned between the top magnet 182 and the bottom magnet 184. The rotor 170 also includes a rotor shell 186 disposed over the 2D magnet disc 180 so as to enclose all the components therewithin. Further, the rotor 170 includes a magnetic shielding layer 188 positioned between the rotor top yoke 176 and the rotor shell 186 so as to shield the magnetic field generated by the 2D magnetic disc 180. The motor 108 is configured to rotate about the first axis or geometric axis Xr either on hydrodynamic bearings or ball bearings 160.

Selected for use in the proposed ultra-thin, small form-factor data storage device 100 is the permanent magnet synchronous motor 108 configured with an axial electromagnetic field in a coreless structure (AEMC-PMSM) such as one shown in cross-section in FIG. 13A and in exploded perspective view in FIG. 13B. As illustrated, there are windings 158 about axes substantially parallel to the first axis about which the spindle motor 108 is configured to rotate.

Figure 14:
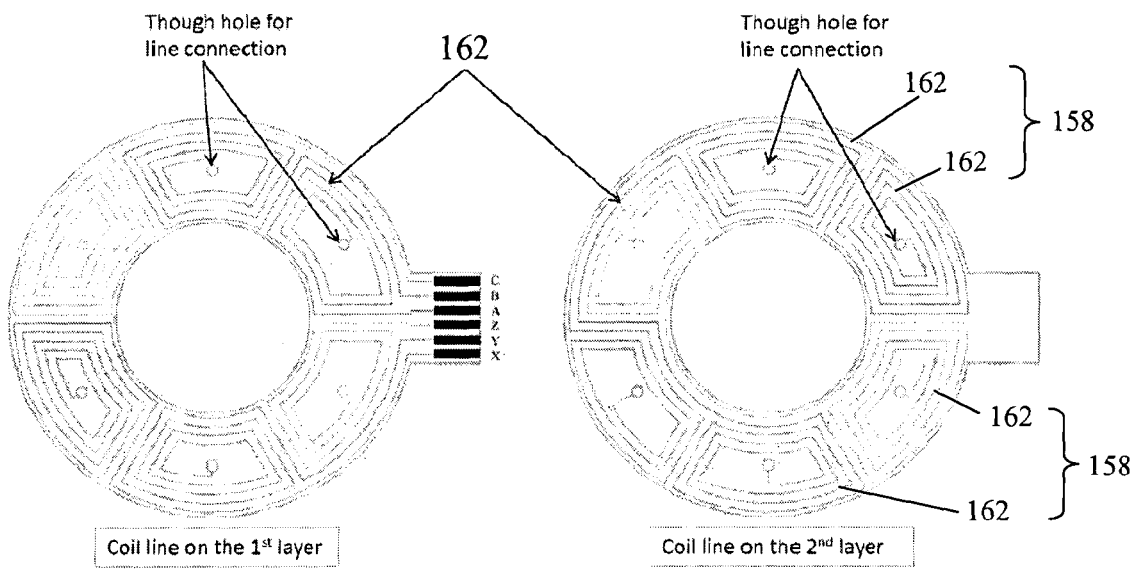
FIG. 14 shows a top schematic view of a 120 degree concentrated windings which utilize fundamental or second order electromagnetic field harmonics in spindle motor operations in accordance with an embodiment of the invention.
Figure 18:
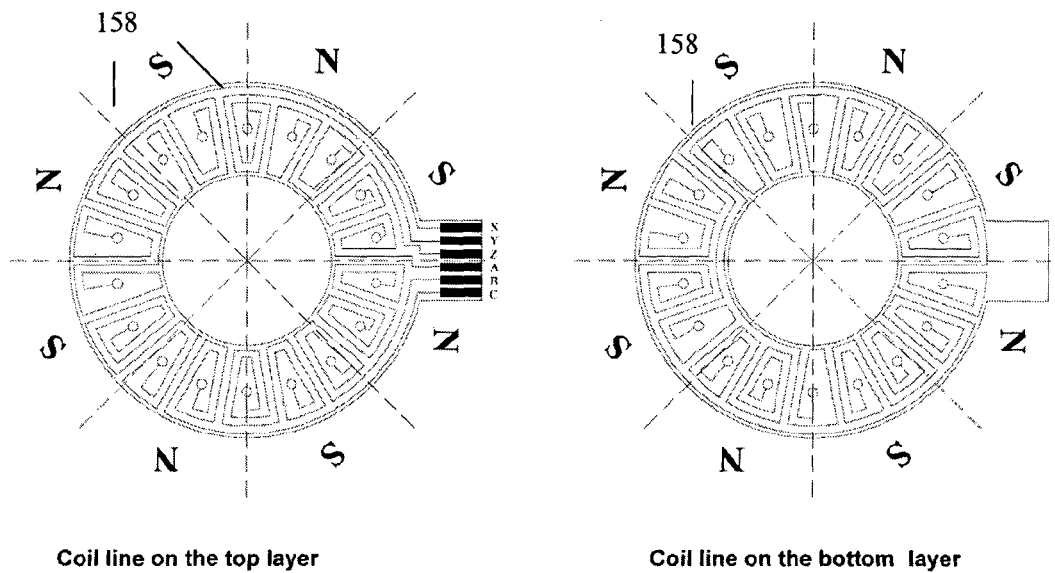
FIG. 18 shows a top schematic view of a 120 degree concentrated windings which utilize fourth order electromagnetic field harmonics in spindle motor operations in accordance with an embodiment of the invention.
Figure 22:
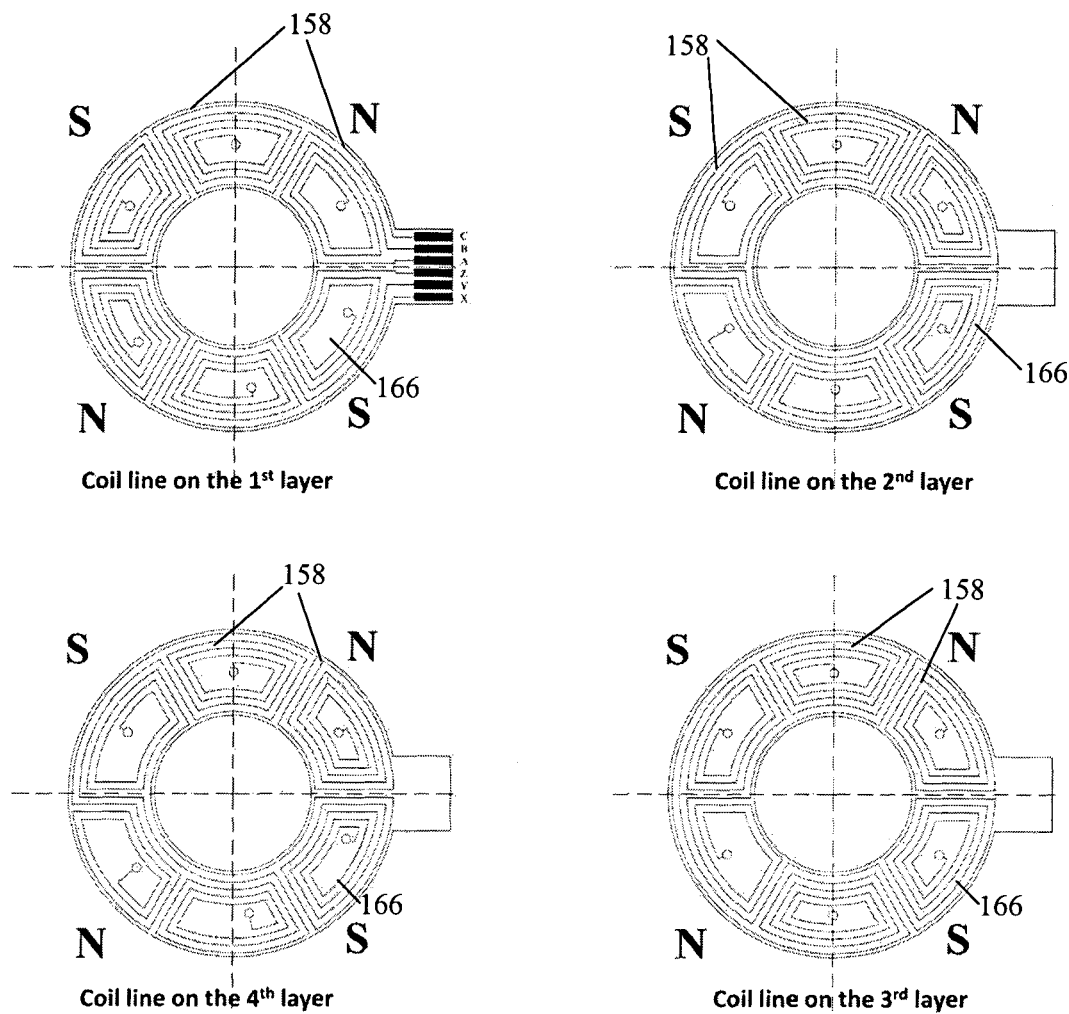
FIG. 22 shows a schematic winding of a 3-phase spindle motor realized with a winding layer in the form of a four-layer printed circuit board with two magnetic pole-pairs in accordance with an embodiment of the invention.

As illustrated in FIG. 14, one winding 158 may be formed by several coils 162, for example, for one phase winding, it may be formed by six coils 162. The windings 158 may be in the form of "120 degrees" concentrated windings 158 as illustrated in FIG. 14, FIG. 18 and FIG. 22.

In one embodiment where the windings 158 may be described as "120 degrees" concentrated windings, such as illustrated in FIG. 14, this winding 158 utilises fundamental, or the second order, electromagnetic field harmonics in spindle motor operations.

Figure 15:
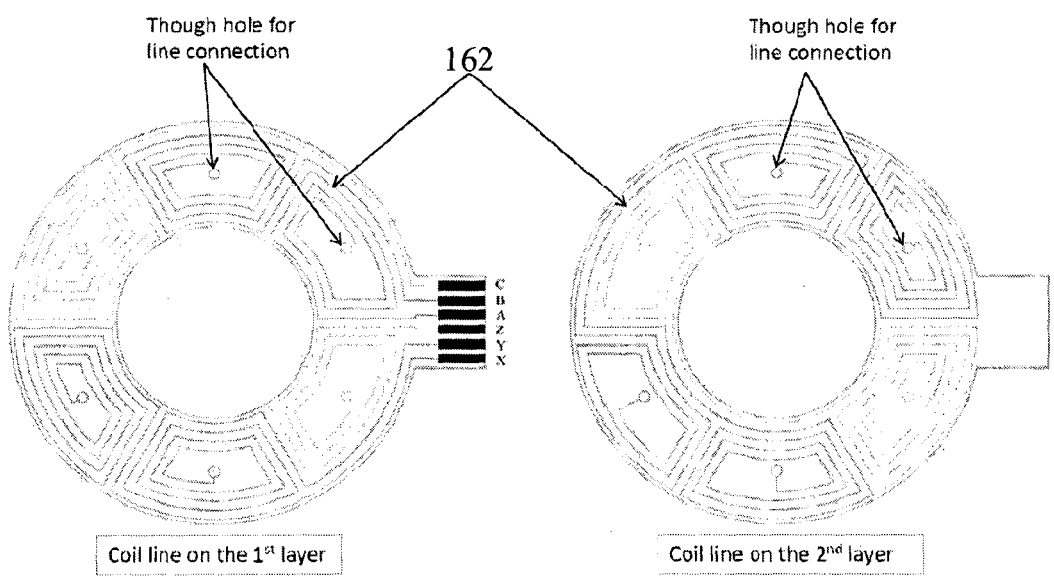
FIG. 15 shows a top schematic view of 3-phase windings for a two-layer printed circuit board in accordance with an embodiment of the invention.
Figure 16A:
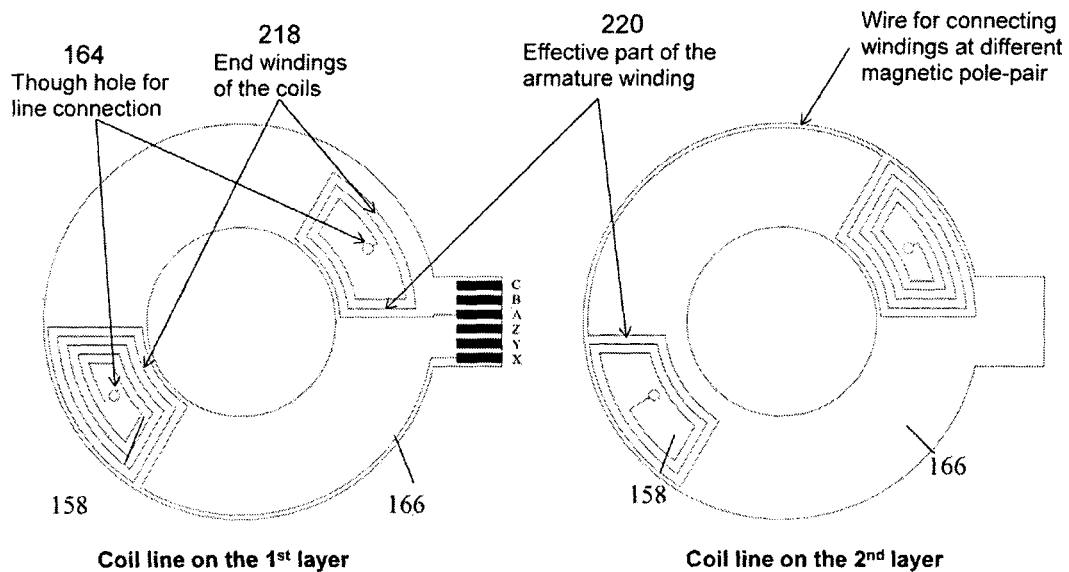
FIG. 16A and FIG. 16B show respective top schematic views of A-phase and B-phase windings for a two-layer printed circuit board in accordance with an embodiment of the invention.
Figure 16B:
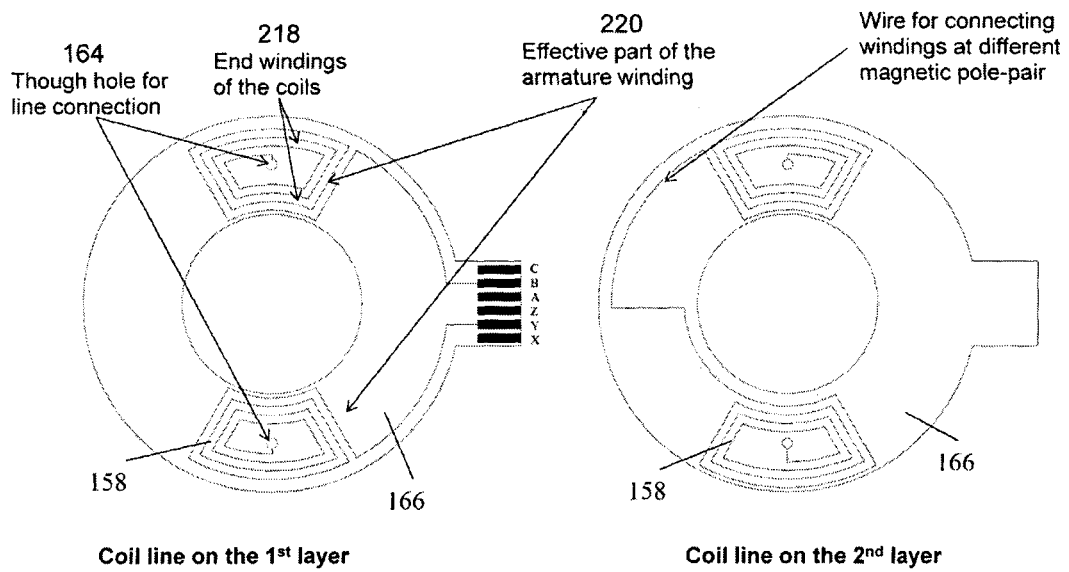
Figure 17:
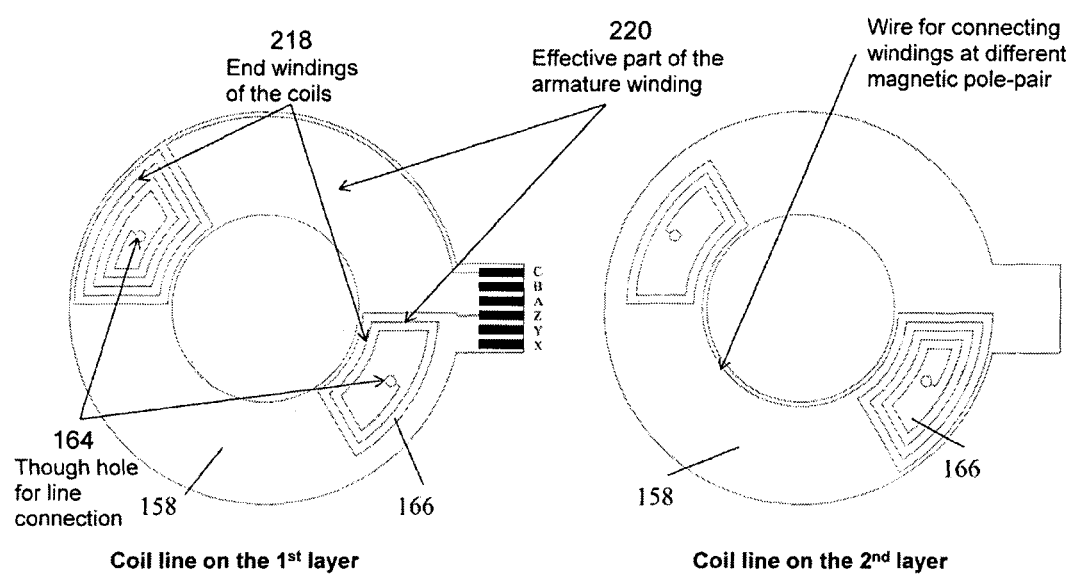
FIG. 17 shows a top schematic view of C-phase windings for a two-layer printed circuit board in accordance with an embodiment of the invention.

FIG. 15 shows schematically a 3-phase windings 158 for a two-layer printed circuit board, FIG. 16A shows schematically the A-phase windings 158 for a two-layer printed circuit board 166, and FIGS. 16B and 17 shows schematically the B-phase and C-phase windings 158 for a two-layer printed circuit board 166. In the embodiment illustrated, three-phase windings 158 are realised with a two-layer printed circuit board 166, although it is to be understood that the multi-phase two-dimensional windings 158 can be formed by printed circuit boards, bonded wires, fine pattern coil, or other wire and circuit technologies. In one magnetic pole-pair range, the windings 158 may be formed by three cycles. It will be appreciated that the effective length of the windings 158 is that which lies in a radially relative to the first axis. The proposed wiring layer advantageously enables winding patterns that increases the effective length of the windings 158 without increasing the length of the windings 158 oriented circumferentially ("end windings"). As evident from the FIGS. 16A, 16B and 17, the end windings 218 can actually be reduced significantly while the effective length or part 220 of the windings 158 are increased. Provided in each winding 158 is a through hole 164 for the conductive trace or wire of a winding 158 in the first layer to communicate electrically with a corresponding winding 158 in the second layer or on the other face of the printed circuit board 166 without interfering with the winding geometry. Further, the corresponding windings 158 in each pair of windings 158 advantageously communicate with each other in the center regions of the windings 158 such that the through hole 164 does not affect winding performance by generating back-electromotive force (emf). The locations of the through holes 164 are selected where the windings 158 would not efficiently generate torque, so that such supposedly inefficient space on the winding layer can be fully utilised.

Figure 20:
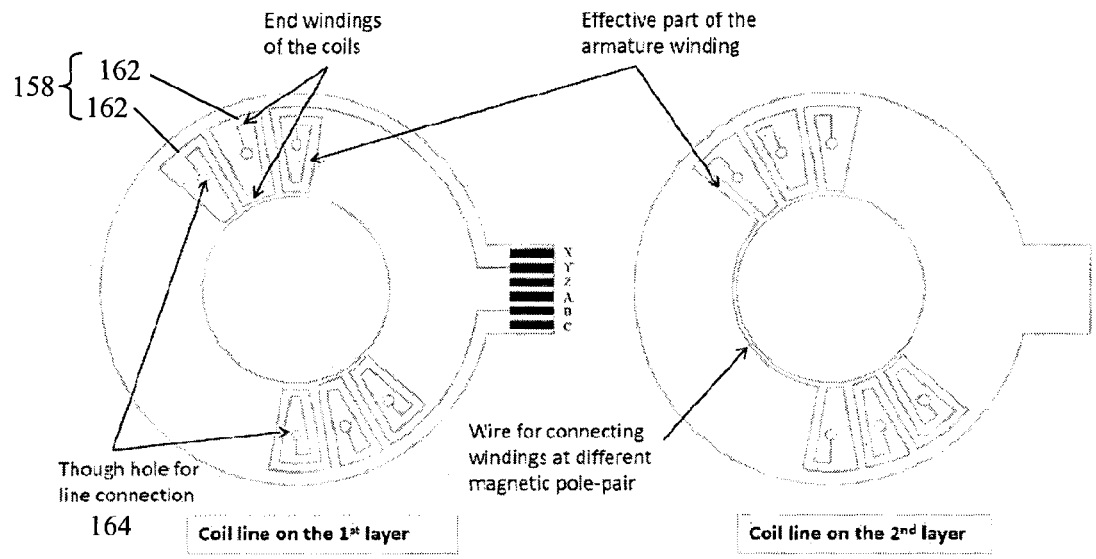
FIG. 20 shows a top schematic view of B-phase windings in which the coils of different magnetic pole-pairs are operably coupled along an inner circumferential side of the windings in accordance with an embodiment of the invention.

Different winding configurations are conceivable, with the connection between different pole-pairs running along the outer circumference of the winding layer as illustrated in FIG. 16 or along both the inner and other circumferences of the winding layer as illustrated in FIG. 20.

In one embodiment, a three-phase spindle motor 108 can be realised with a winding layer in the form of a four-layer printed circuit board 166 with two magnetic pole-pairs, as shown in FIG. 22. It will be appreciated that where a multi-layer printed circuit board 166 is used, some of the windings 158 are also inside the printed circuit board 166. Although the magnitude of the magnetic field generated by the permanent magnet varies in the axial direction, and hence the magnitude of the induced back-emf is different at different layers of the multi-layer printed circuit board 166, the proposed winding layer can advantageously address this variation, and make the flux-linkage of all three phase windings balanced, and this is important in generating balanced back-emf in spindle motor operation. In one aspect, the proposed winding layer can generate the required torque with just two layers of windings 158. In another aspect, for example where the printed circuit board 166 has more tha two layers, the effective lengths of the windings 158 at each layer can be varied to counterbalance the variation in the magnitude of the magnetic field.

Accordingly, the effective number of windings 158 and the length of the windings 158 can be increased without loss in torque or a need to increase the height or the footprint of the spindle motor 108 to make up the needed effective winding 158 for a desired spindle motor torque.

Figure 19:
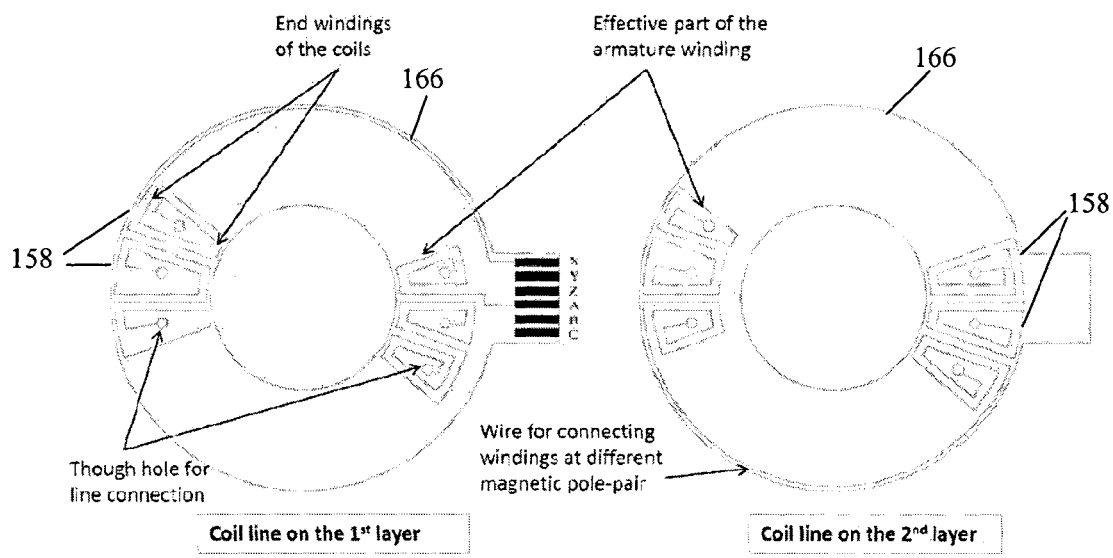
FIG. 19 shows a top schematic view of A-phase windings for eight magnetic pole-pairs where the windings is realized in a two-layer printed circuit board in accordance with an embodiment of the invention.
Figure 21:
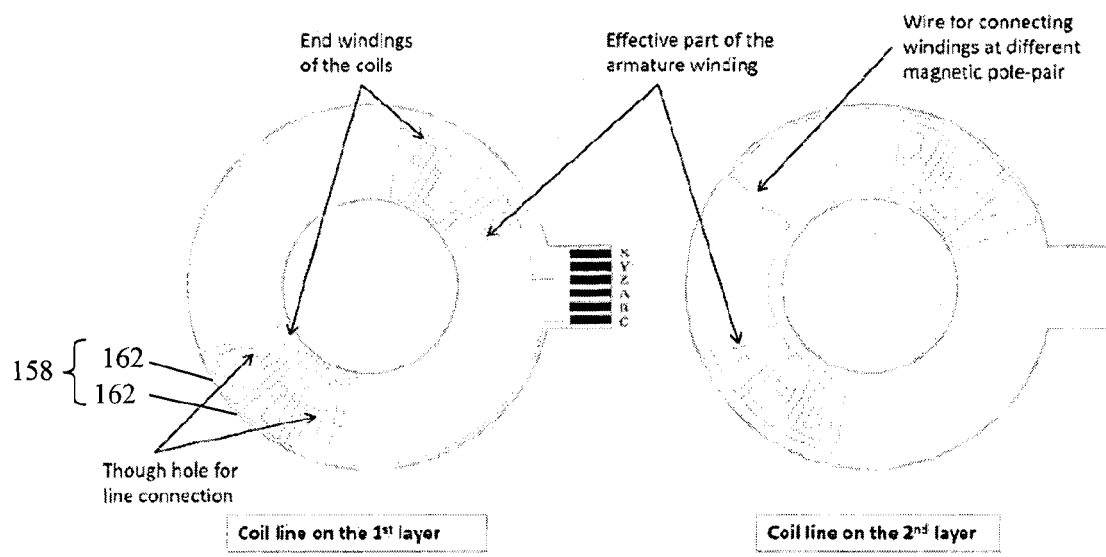
FIG. 21 shows a top schematic view of C-phase windings in which the coils of different magnetic pole-pairs are operably coupled by wiring running selectively along an inner circumferential side and an outer circumferential side of the windings in accordance with an embodiment of the invention.

In another embodiment, the windings 158 are configured for use with the fourth order harmonics in spindle motor operations, for example, FIG. 18. In the illustrated embodiment, in four magnetic pole-pair range, the windings 158 are formed by nine cycles. FIG. 19 shows a A-phase winding 158 for an eight magnetic pole-pair where the winding 158 is realised in a two-layer printed circuit board 166, where the A-phase coils at different magnetic pole-pairs are connected with wiring running on an outer circumferential side of the winding 158. FIG. 20 shows the B-phase winding 158 of this embodiment, in which the coils 162 at different magnetic pole pairs are operably coupled along an inner circumferential side of the windings 158. FIG. 21 shows the C-phase windings 158 in which the coils 162 at different magnetic pole-pairs are operably coupled by wiring running selectively along the inner circumferential side as well as along the outer circumferential side of the winding 158. The coupling between coils 162 at different pole pairs may be in a sinuate shape as illustrated. As in the aforedescribed embodiments involving second order harmonics, the corresponding windings 158 in each pair of windings 158 in this embodiment can advantageously communicate with each other in the center regions of the windings 158 such that the through hole 164 does not affect performance of the windings 158 by generating back-emf. Accordingly, the effective number of windings 158 and the length of the windings 158 can be increased without increasing the height or the footprint of the spindle motor 108. Advantageously, the spindle motor 108 has no cogging torque or unbalanced magnetic pull.

Actuator with Low Profile Pivot Cartridge

Figure 23A:
FIG. 23A shows a schematic cross-sectional view of a data storage device in accordance with an embodiment of the invention.
Figure 23B:
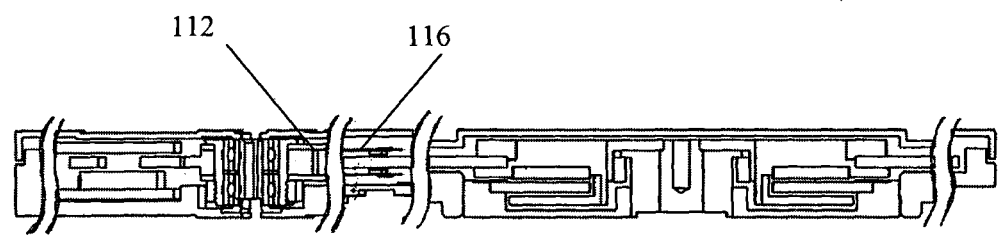
FIG. 23B shows another schematic cross-sectional view of a data storage device in accordance with an embodiment of the invention.

It is evident from FIG. 23A, which shows a schematic cross-sectional view of a data storage device 100 from one view, that the use of a low profile motor 108 such as that described in the foregoing can enable the making of a data storage device 100 with a reduction in its overall thickness by over 30%. At the same time, as illustrated by FIG. 23B which shows a schematic cross-sectional view of the data storage device 100 from another view, any reduction in the overall thickness of a data storage device 100 is further constrained by the overall height of the actuator 112. At the same time, the actuator 112 cannot be discriminately scaled down as it includes at least one actuator arm 116 carrying a HGSA such that rotation of the actuator 112 about the second axis brings the read/write devices into a desired proximity with the desired track on the disk 106.

Figure 24:
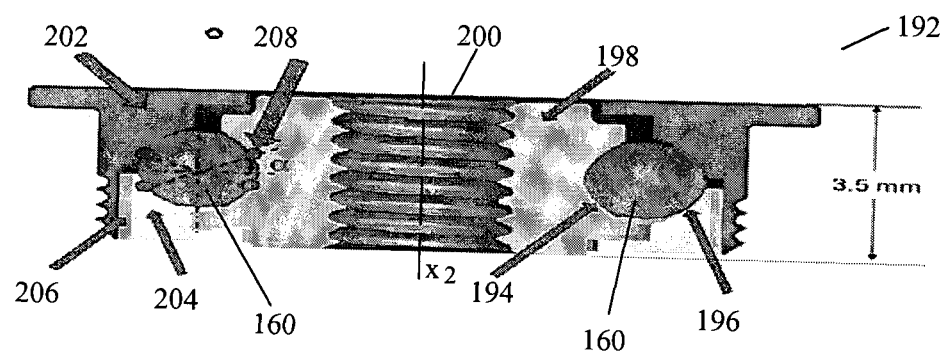
FIG. 24 shows a cross-sectional view of a pivot cartridge in accordance with an embodiment of the invention.
Figure 25:
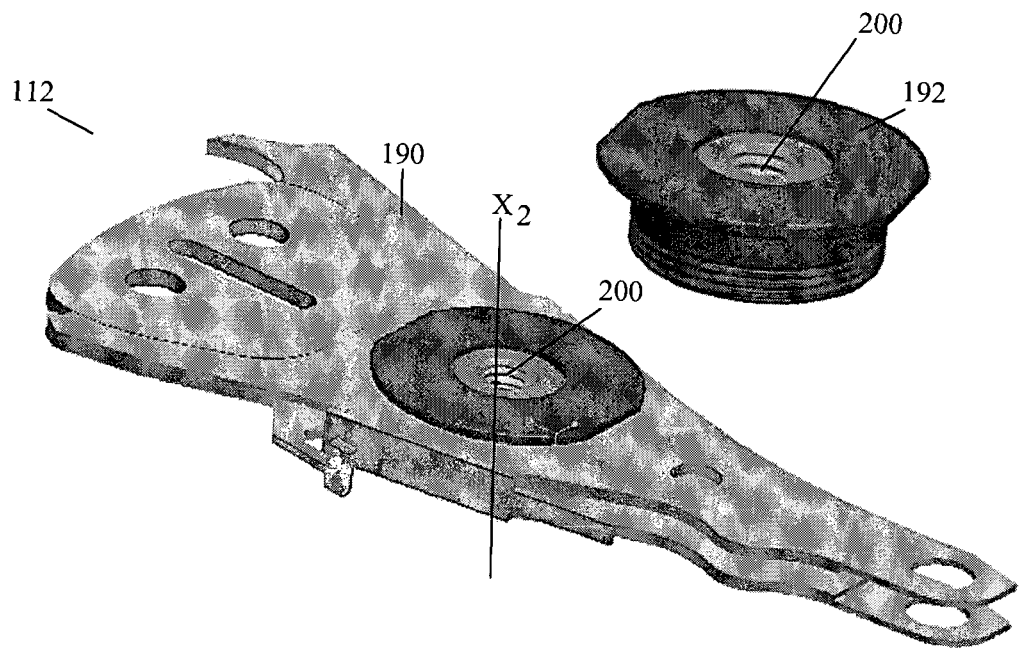
FIG. 25 shows a perspective view of an actuator including an actuator body with a pivot cartridge for rotational movement about an axis in accordance with an embodiment of the invention.

As shown in FIG. 25, the actuator 112 includes an actuator body 190 having a pivot cartridge 192 for rotational movement about the second axis $X_2$. In one embodiment, as shown in FIG. 24, the pivot cartridge 192 has one set of ball bearings 160 in between an inner race 194 and an outer race 196. The inner race 194 may double as a shaft 198 with features for fastening to the base plate (not shown), such as a threaded hole 200 in its center as illustrated. The outer race 196 is formed by a bearing sleeve 202, which may include a locking device or locker 204. The locker 204 may be adhesively or otherwise fixed relative to the bearing sleeve 202 so as contribute towards applying a preselected preload to the ball bearings 160. In such a configuration, there are four contact points 208 for every ball bearing 160, with the contact angles being adjustable to satisfy the preselected bearing stiffness. The ball bearings 160 selected may be larger than those found in typical ball bearings used in pivot cartridges in similar applications. The ball bearings 160 in such pivot cartridges 192 may have a wider bearing pitch, that is, may be spaced apart further compared to the configuration found in typical ball bearings used in similar applications. Thus, advantageously, the present low-profile pivot cartridge 192 enables a reduction in the overall height of the actuator (not shown) and yet provides the requisite preload without causing a degradation of bearing stiffness. Variations of this pivot configuration can be implemented with different motors, for example, with a voice coil motor-drivable actuator 112 such as one illustrated in FIG. 25.

Actuator with PZT Motor

Figure 26:
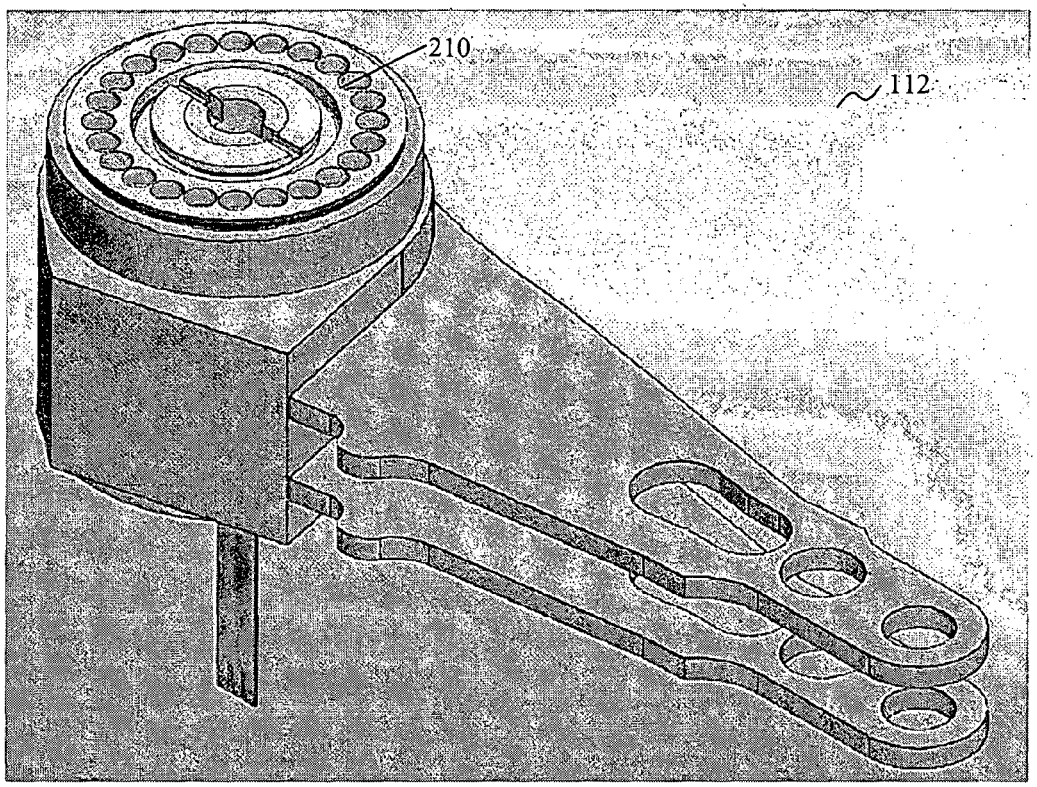
FIG. 26 shows a perspective view of an actuator driven by a piezoelectric (PZT) motor in accordance with an embodiment of the invention.

An actuator 112 with reduced footprint can be achieved by using a piezoelectric (PZT) motor 210 as shown in FIG. 26 instead of a voice coil motor. Alternatively, the present low-profile pivot cartridge 192 as shown in FIG. 24 earlier may be implemented in the actuator 112 incorporating the PZT motor 210 for lower profile as well as reduced footprint. The PZT motor 210 can further be configured to have an inherent limited range of angular movement so that physical limit stops can be redundant. Physical limit stops and latches can nevertheless be provided in the data storage device 100, for the purpose of ensuring that the actuator 112 does not crash the HGSA (not shown) into the spindle motor (not shown) or (in configurations without a load/unload ramp) swing the HGSA off the disk (not shown). Advantageously in the present embodiment, physical limit stops and latches can serve as backup or additional safeguards, thus increasing the robustness and mobility of the data storage device 100. Other PZT actuators may also be selected.

Figure 27:
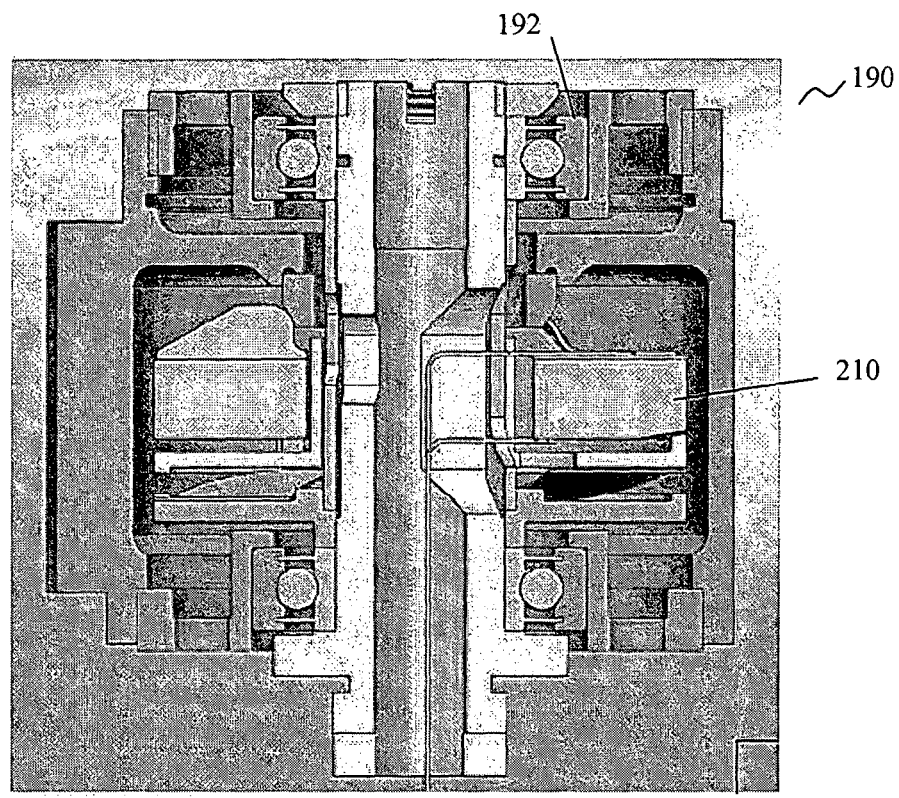
FIGS. 27 and 28 show respective cross-sectional views of an actuator body including a pivot cartridge and an actuator motor in accordance with an embodiment of the invention.
Figure 28:
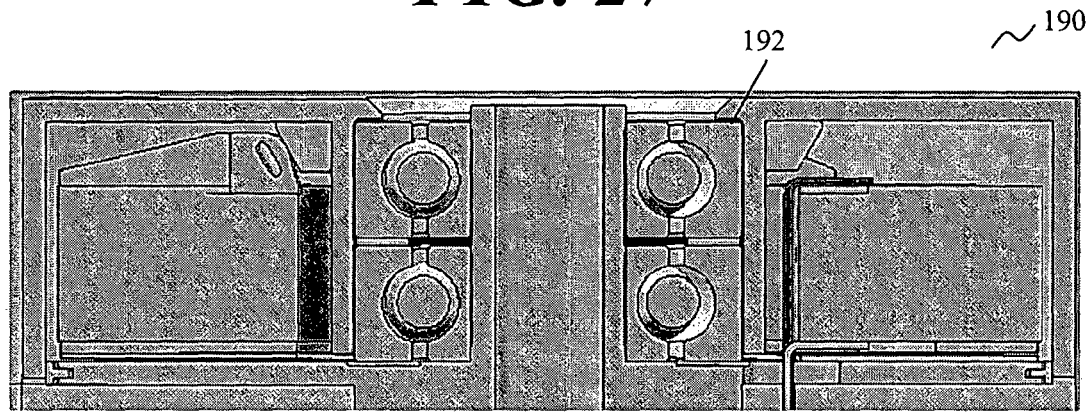
Figure 29:
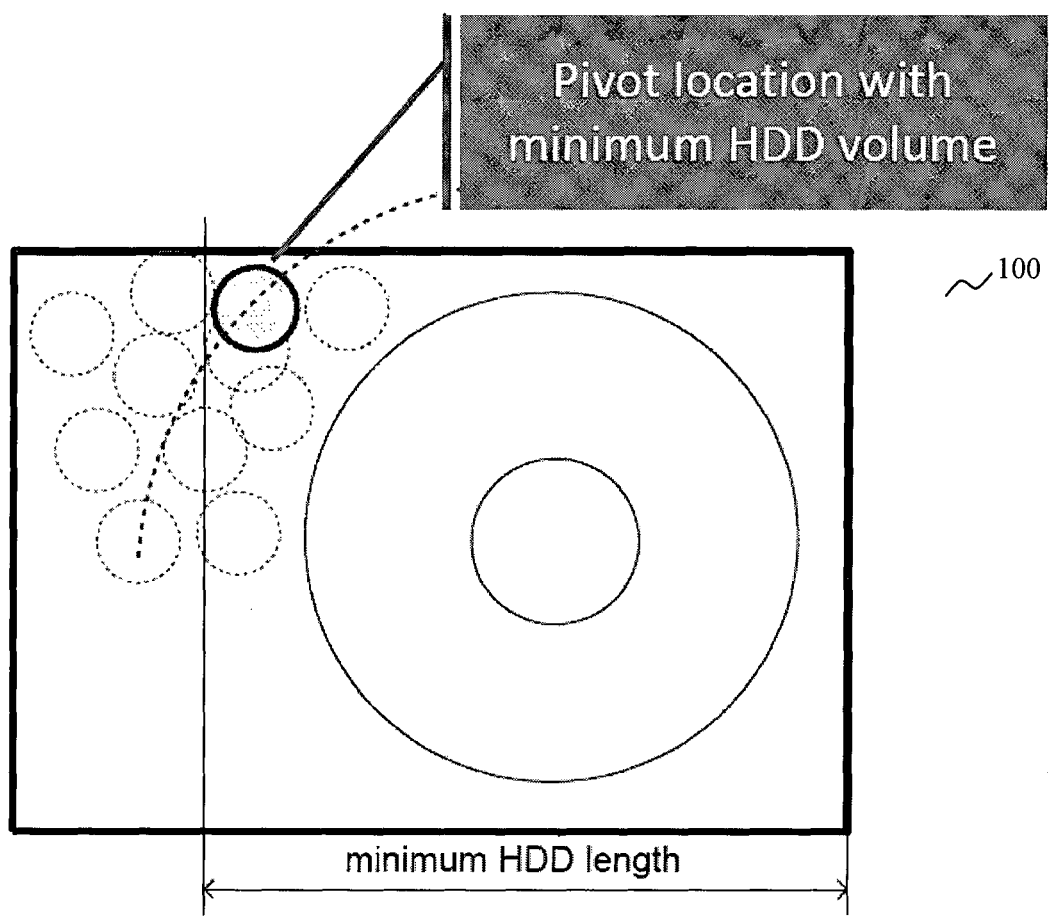
FIG. 29 shows a data storage device including an actuator body with a pivot cartridge and a PZT motor in accordance with an embodiment of the invention.

In one embodiment, the actuator body 190 houses both a pivot cartridge 192 and an actuator motor 210, in which the actuator motor 210 is operable by piezoelectric, as illustrated by FIG. 27 and FIG. 28. This runs contrary to conventional thinking which would have avoided enlarging the actuator body 190 beyond what is necessary to hold the pivot cartridge 192. However, advantageously, the present actuator body 190 which incorporates both a pivot cartridge 192 and a PZT motor 210 would reduce the overall footprint or real estate taken up by the actuator assembly, and thus reduce the overall dimensions of the data storage device 100, as demonstrated by FIG. 29.

Figure 30:
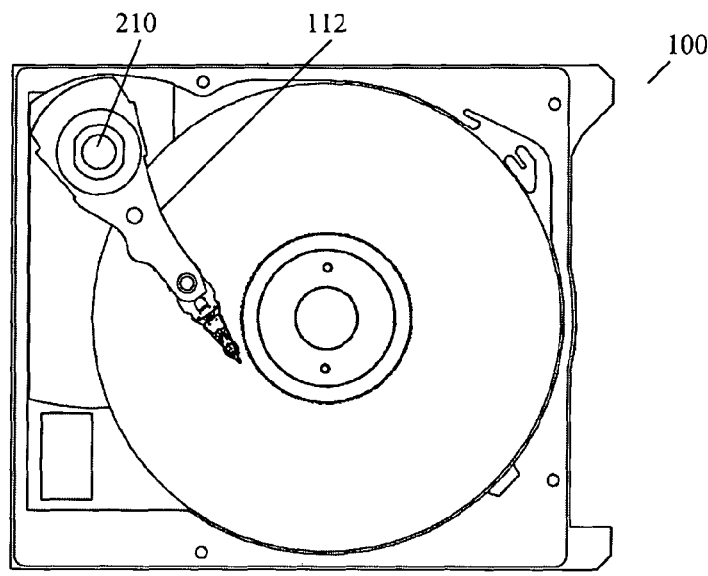
FIG. 30 shows a schematic top view of a data storage device in which an actuator is driven by a PZT motor in accordance with an embodiment of the invention.
Figure 31:
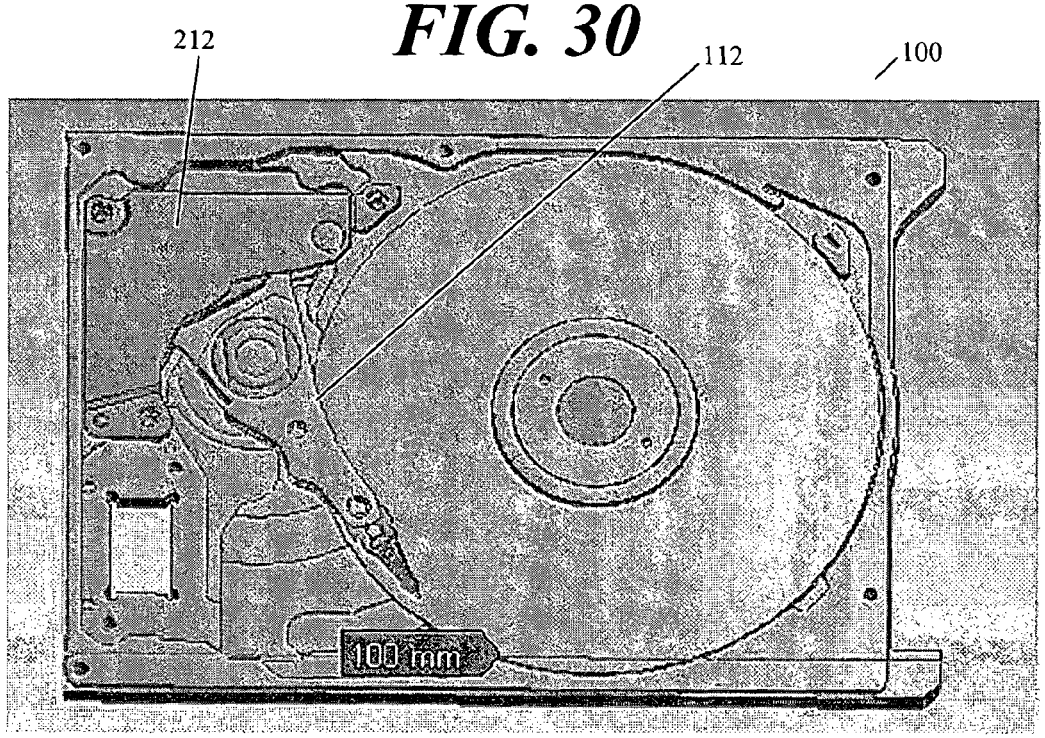
FIG. 31 shows a schematic top view of a data storage device in which an actuator is driven by a voice coil motor in accordance with an embodiment of the invention.

FIG. 30 is a schematic top view of a data storage device 100 in which the actuator 112 is driven by a PZT motor or arrangement 210. FIG. 31 is a schematic top view of a data storage device 100 in which the actuator 112 is driven by a voice coil motor 212. Advantageously, the overall dimensions of the data storage device 100 can be reduced to a more compact size without compromising the size of the media, as evident from a comparison of FIG. 30 and FIG. 31 when the actuator 112 is configured to be operable with PZT driving means 210. A 2.5 inch form factor data storage device 100 with the present actuator 112 can thus have a shorter length and, accordingly, a volume that is 30% smaller than a conventional 2.5 inch form factor data storage device 100, even without accounting for the reduction in volume by virtue of the reduction in the overall thickness of the data storage device 100 owing to the selection of a low profile spindle motor 108 and a low profile actuator 112. As a result the total weight of the data storage device 100 can be reduced by 30% in comparison with conventional 2.5 inch form factor data storage devices. These estimated figures with respect to the 2.5 inch form factor are given merely for illustrative purposes, and it is understood by skilled artisans that reductions in weight, overall dimensions, and thickness may be achievable for other form factors. Hence it can be appreciated that the eligibility or suitability of the present data storage device 100 for use as/in mobile consumer electronics is significantly increased because it will take up less valuable real estate in any host device.

Circular Housing

Figure 32:
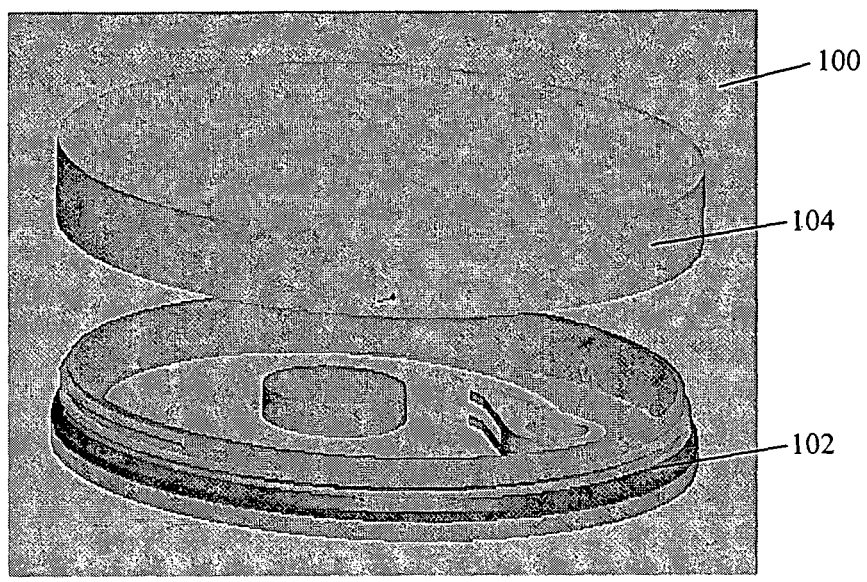
FIGS. 32 and 33 show respective perspective views of a data storage device with a circular housing in accordance with an embodiment of the invention.
Figure 33:
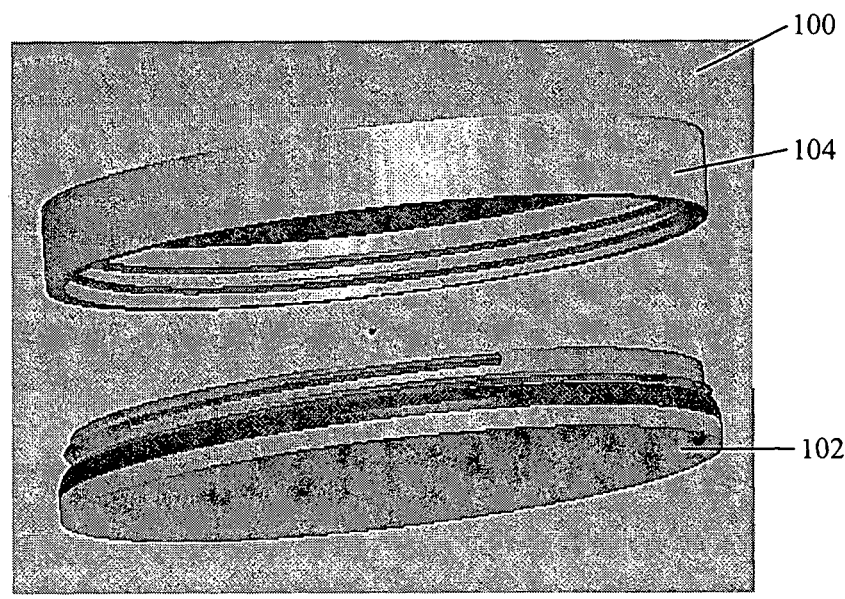

Another advantage conferred by the proposed actuator 112 is the increased flexibility in redefining the overall shape of the data storage device 100. For example, a circular shape may be possible as illustrated in FIG. 32. With this shape, different methods of coupling the base plate 102 and the cover 104 are now viable as illustrated in FIG. 33, and advantageously provide improved sealing or require fewer fasteners, thereby reducing the overall cost and increasing the ease of manufacturing. In embodiments where the data storage device 100 is filled with an inert gas or gaseous mixture other than air, for example helium, it can be appreciated that the ability to configure the coupling edges or sides of the base plate 102 and the cover 104 in new contours can improve sealing while minimizing manufacturing challenges.

Pre-amp and Flex

Figure 34:
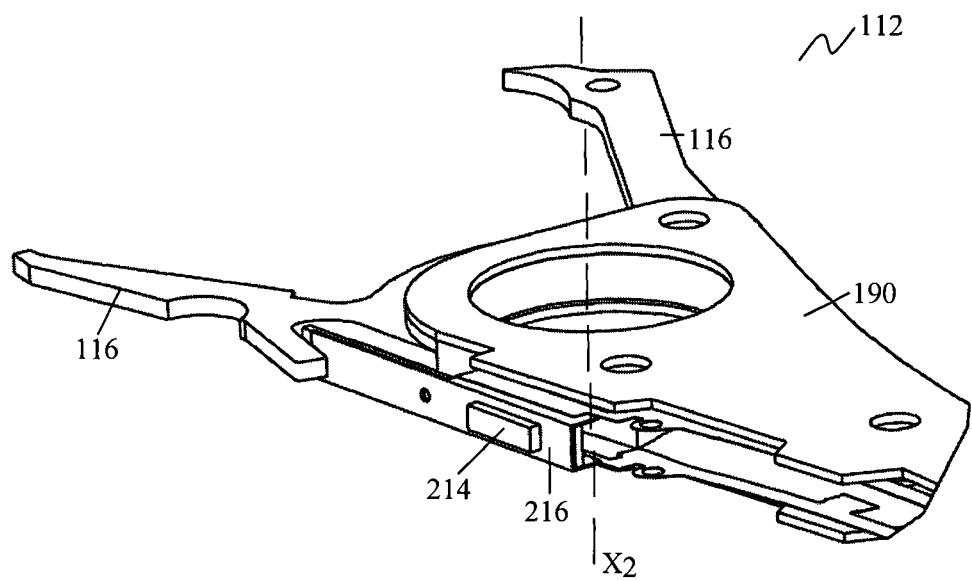
FIG. 34 shows a perspective view of an actuator having an actuator body, wherein a pre-amplifier chip is positioned adjacent to the actuator body in accordance with an embodiment of the invention.
Figure 36A:
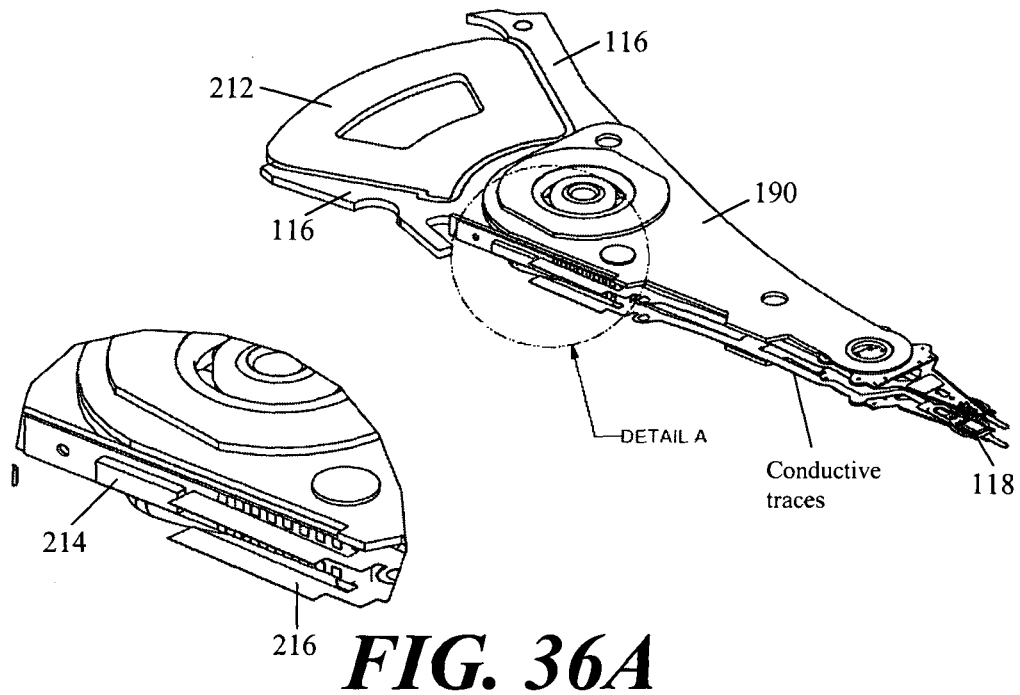
FIGS. 36A and 36B show respective perspective views of an actuator including a flexible circuit in communication with a pre-amplifier chip in accordance with an embodiment of the invention.

In one embodiment as shown in FIG. 34, the actuator 112 includes an actuator body 190 configured for pivotal movement about a second axis $X_2$, the second axis being substantially normal to a plane defined by the base plate (not shown). Extending from the actuator body 190 is at least one actuator arm 116. Extending generally in an opposing direction from the at least one actuator arm 116 is a voice coil 212 (as shown in FIG. 36A). In assembly, the voice coil 212 is disposed in a magnetic field emanating from an arrangement of at least one permanent magnet fixed relative to the base plate such that when an actuating current is controllably supplied to the voice coil 212, forces resulting on the voice coil 212 provide moment forces to turn the actuator 112 about its pivot. In another embodiment, the voice coil motor, which includes the voice coil 212 and the arrangement of at least one permanent magnet and the yoke, is replaced by a PZT motor.

Figure 35:
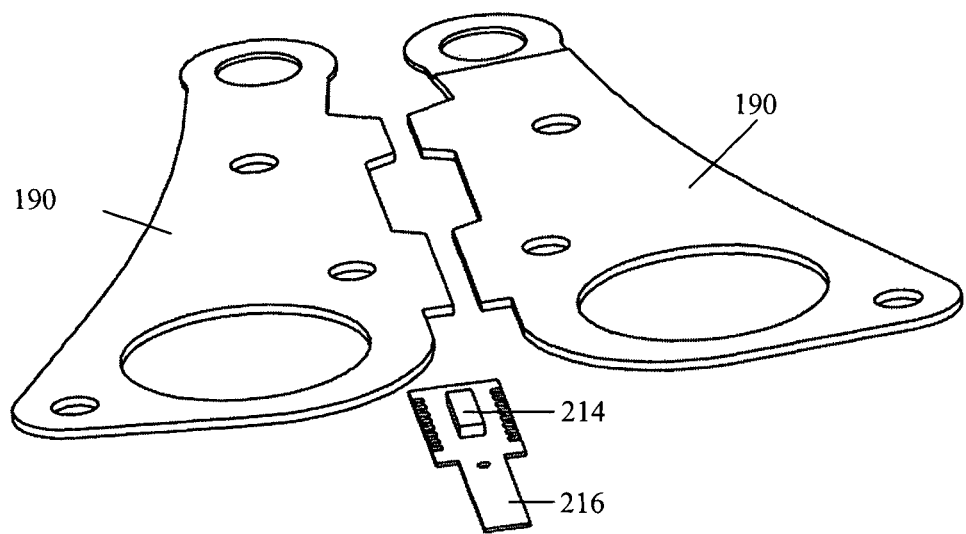
FIG. 35 shows an open-up exploded view of the actuator as shown in FIG. 34 in accordance with an embodiment of the invention.

In assembly, each actuator arm 116 may end distally in coupled engagement with one or two head gimbal suspension assembly (HGSA) (not shown). In a data storage device with one disk with both faces formatted for data storage, an actuator 112 having two actuator arms 116, each actuator arm 116 supporting one HGSA, may be used. Along the suspension (not shown) and the actuator arm 116 is run a length of conductive traces or wiring ending in at least one pre-amplifier 214 before continuing on in a ribbon of flexible circuit (shown as 216 in FIG. 4) to a connector (shown as 126 in FIG. 4) in operable communications with the rest of the circuitry on the printed circuit board assembly. In a low profile actuator 112, the pre-amplifier chip (pre-amp) 214 may be found adjacent the actuator body 190 as shown in FIG. 34. In one embodiment, the pre-amp 214 may be packaged with a length and width no larger than the height of the actuator body 190. It should not be assumed that the actuator body 190 is necessary a monolithically formed cylinder. Rather, the exploded view in FIG. 35 illustrates, the actuator body 190 may be formed by stacking a spacer (not shown) between two actuator arms (the parts labeled 190 in FIG. 35 also serve as the actuator arms), all having a suitably-sized bore for engagement with the pivot and, in some embodiments, also the PZT motor. Alternatively, the PZT motor or the pivot cartridge may be configured to serve as the spacer to establish a desired separation between neighboring actuator arms 116.

Figure 36B:
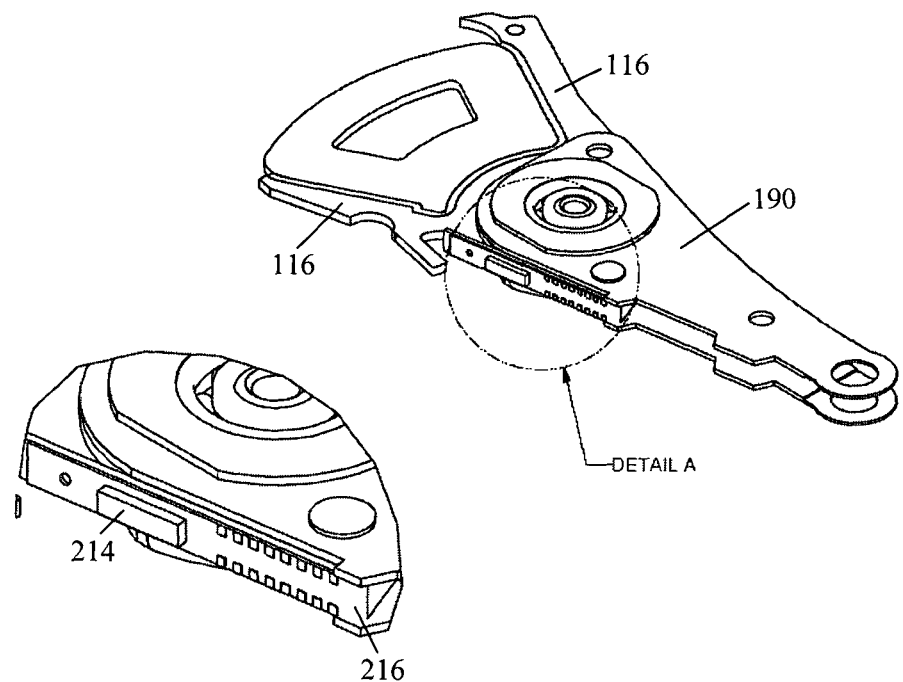

FIGS. 36A and 36B show the details of how the conductive traces or wiring from the HGSA 118 can be connected to the flexible circuit 216 in operable communications with the pre-amp 214. In one embodiment, the pre-amp 214 is sized to a width no larger than the spacing between neighboring actuator arms 116. For clarity, the actuator of FIGS. 36A and 36B is illustrated without the conductive traces or wiring. One end of the flexible circuit 216 at which the pre-amp 214 is mounted may be directly soldered on to one side of the actuator body 190 and/or actuator arms 116. Alternative, the end of the flexible circuit 216 may have a width larger than the spacing or separation between neighboring actuator arms 116. The width of the end of the flexible circuit 216 may be folded with the folded sides being soldered or otherwise adhered to the underside of the upper actuator arm 116 and the upperside of the lower actuator arm 116, as shown in FIG. 34. It is to be understood, of course, that "underside", "upper", "upperside" and "lower" are used for convenience, and not intended to limit the use of the data storage device 100 in a fixed orientation with respect to absolute directions.

Figure 37A:
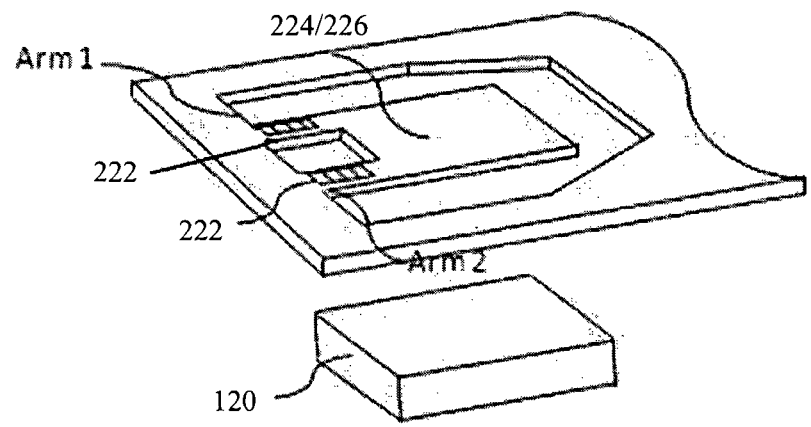
FIGS. 37A and 37B show respective perspective view and exploded perspective view of an actuator including a second stage micro-actuator in accordance with an embodiment of the invention.
Figure 37B:
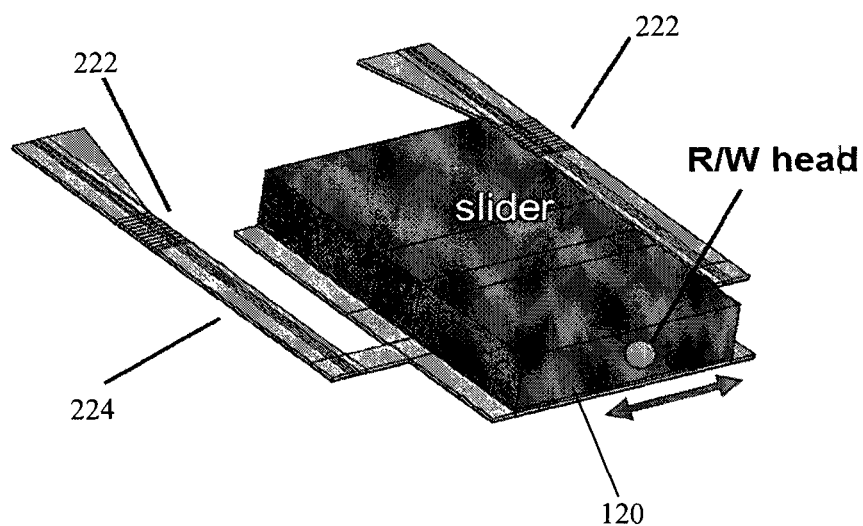

The actuator 112 could further include a second stage micro-actuator 222 as shown in FIGS. 37A and 37B such that the slider 120 can have either an independent, additional translational or rotational movement to enhance the accuracy for bringing the read/write devices 118 into a desired proximity with the desired track on the disk (not shown). In one embodiment, the second stage micro-actuator 222 may be at least one thermal actuator directly fabricated on and/or integrated with a flexure 224, as shown in FIGS. 37A and 37B. The flexure 224 is disposed at one end of the suspension, and includes a tongue 226 by which is supported the slider 120. As can be appreciated, low cost fabrication is enabled while any increase in the thickness of the flexure 224 can be minimal.

ABS

Figure 38:
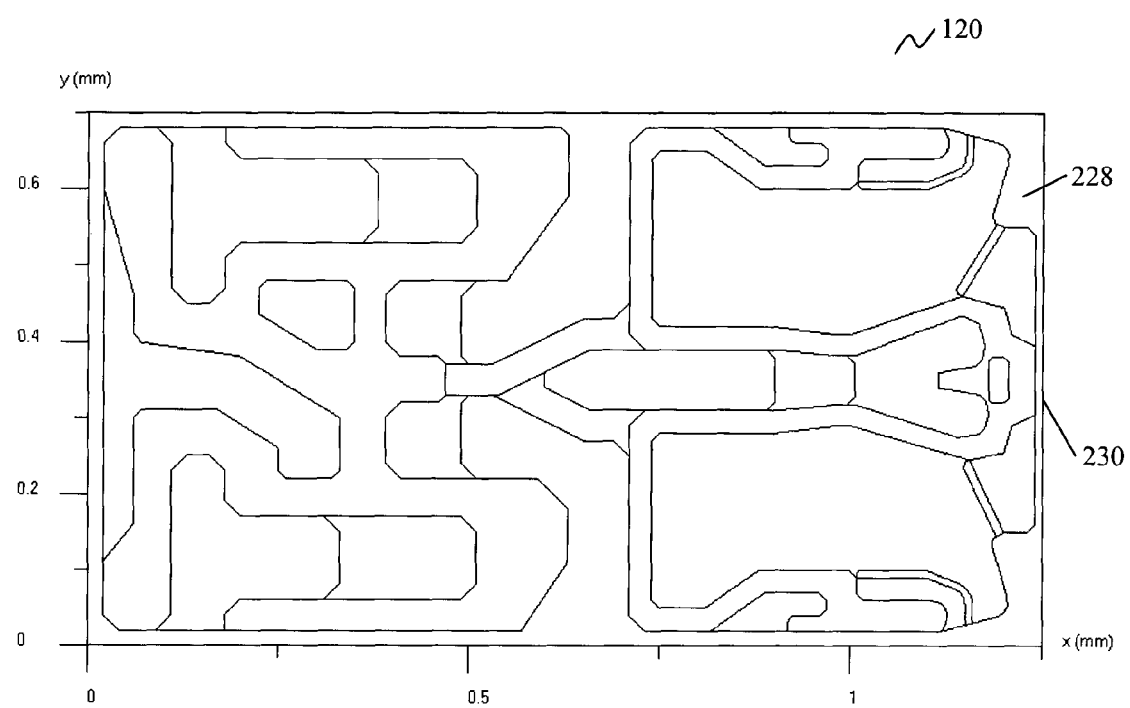
FIG. 38 shows a top view of an air bearing surface (ABS) with a slider for use in low profile or ultrathin data storage devices in accordance with an embodiment of the invention.

The HGSA (not shown) extending from an actuator arm (not shown) ends in a slider 120 bearing read/write devices. Those skilled in the art would appreciate that the slider 120 has an air bearing surface (ABS) 228 with a trailing edge 230 at which read/write devices are located. FIG. 38 is a top view of the ABS 228 of a slider 120 proposed for use in low profile or ultrathin data storage devices 100.

Figure 39:
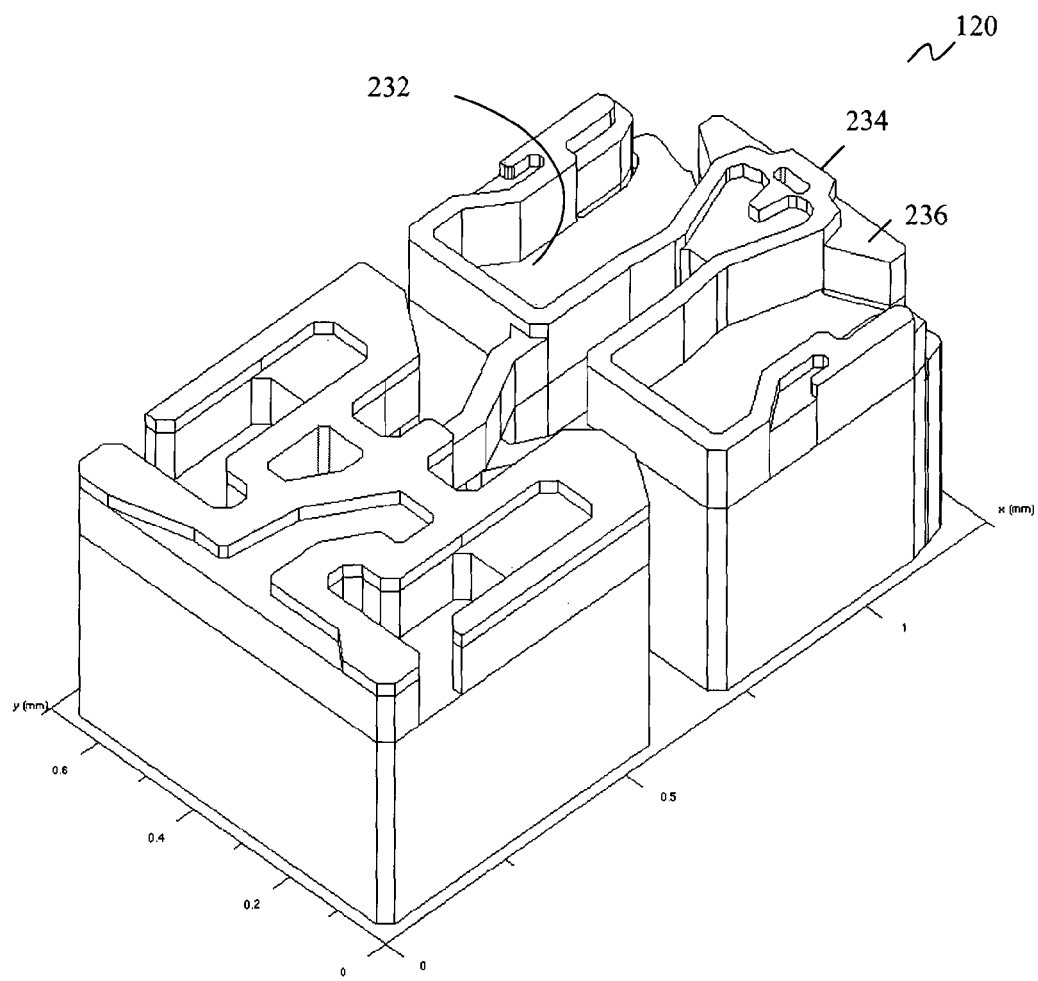
FIG. 39 shows a perspective view of the air bearing surface as shown in FIG. 38 to illustrate the relative elevations of different regions on the air bearing surface in accordance with an embodiment of the invention.

FIG. 39 is a perspective view of the same to illustrate the relative elevations of different regions on the ABS 228. The ABS configuration is particularly suitable for data storage devices 100 designed to operate at 5400 revolutions per minute (RPM) but is also suitable for lower RPM configurations (such as 3600 RPM) with minimum fly height (FH) drop. In other words, the proposed slider 120 is suitable for multi-RPM configurations and for use in mobile data storage applications where power management is priority. Further, the ABS design of FIGS. 38 and 39 has minimal FH-loss at high altitude (3 km) operations.

Figure 40:
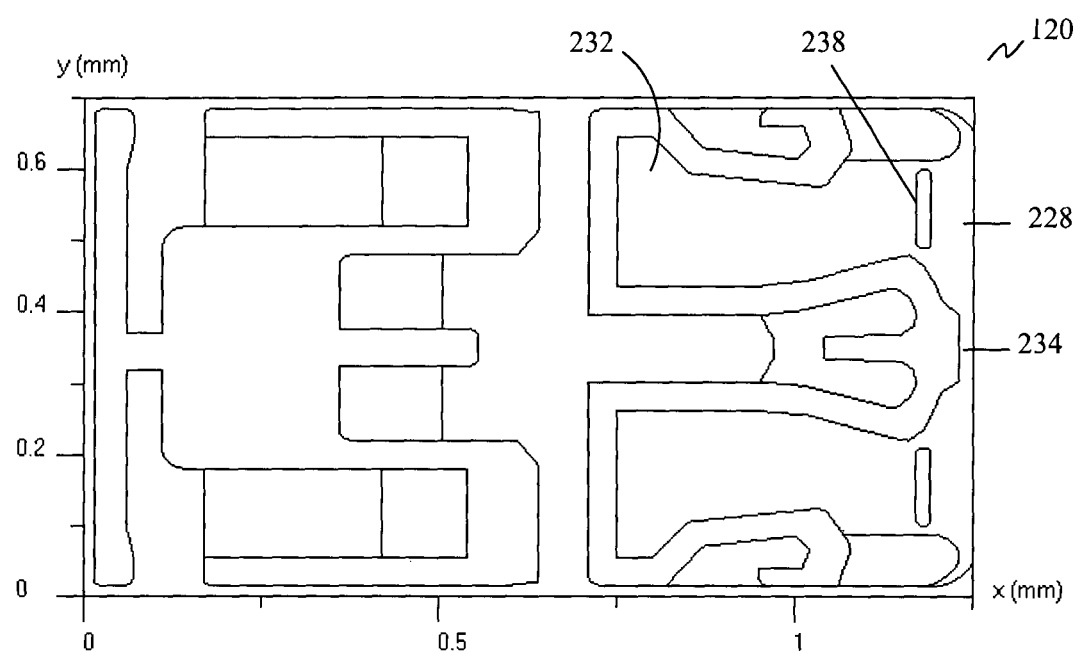
FIG. 40 shows a top view of a slider configured with an air bearing surface with close-etched and deep grooves in accordance with an embodiment of the invention.
Figure 41:
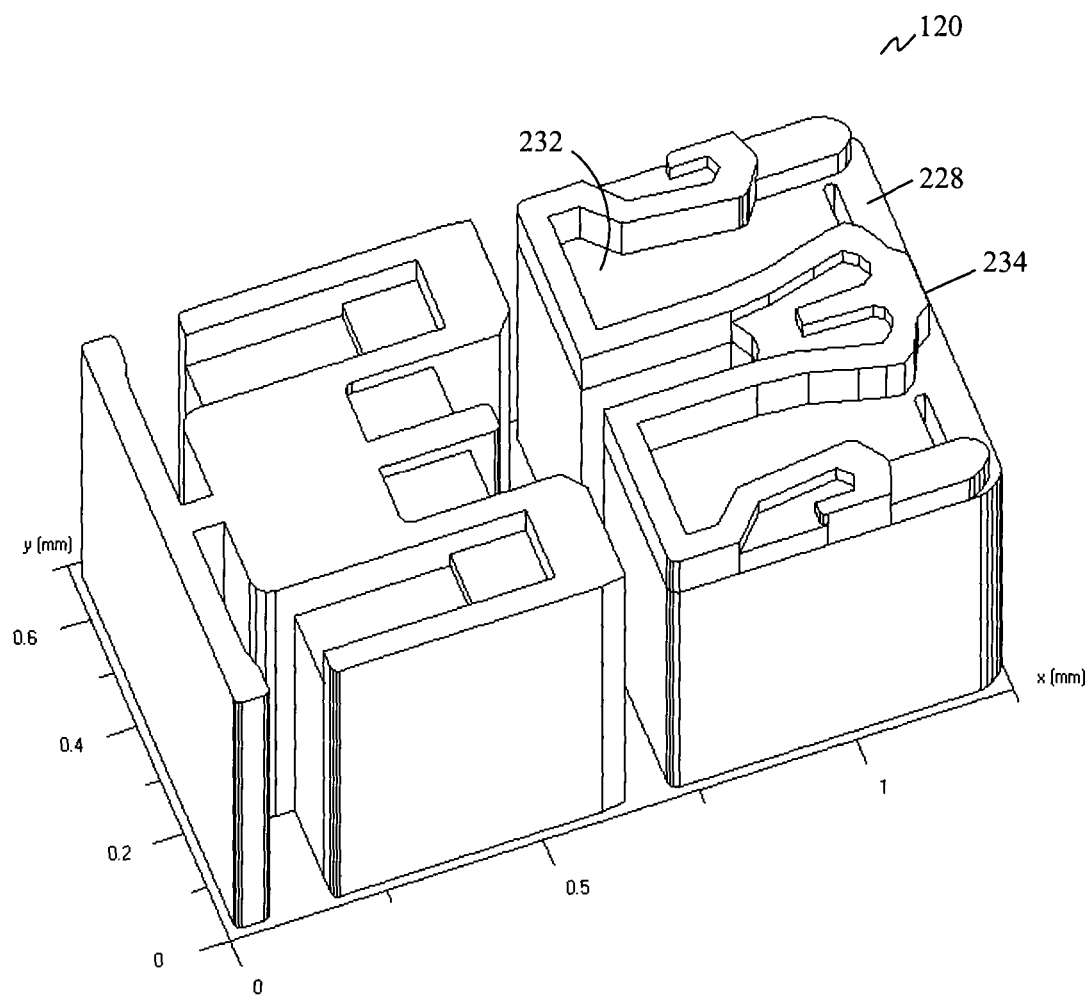
FIG. 41 shows a perspective view of the slider configured with the air bearing surface as shown in FIG. 40 in accordance with an embodiment of the invention.

The proposed ABS configuration may advantageously employ deflector rails 236 and channels to help divert lubricants accumulated in the ABS cavity 232 (as shown in FIGS. 39, 40, 41) away from the center trailing pad 234 (as shown in FIGS. 39, 40, 41) to reduce the "waterfall-effect"—where lubricants collected at the trailing edge 230 of the slider 120 cascade back to the center trailing rail ABS surface 228 during unloading (non-operation) and thus impact the magnetic spacing during the re-loading of the slider 120 to the disk as a result of the presence of the lubricant film on the ABS 228. Additionally, deflector rails or anti-particle rails 236 may be provided to minimize the possibility of airborne particles entering the center channel which can lead to FH modulation or failure. The proposed ABS configuration may employ extended ABS side rails and deep etching of both AlTiC and $Al_2O_3$ at the trailing edge 230 to improve tribological performance and minimize failure in the event of a slider-corner-to-disk contact. Further, the proposed ABS configuration may include close-etched-pattern on the trailing pad 234 to improve the damping ratio of the slider 120.

Figure 42:
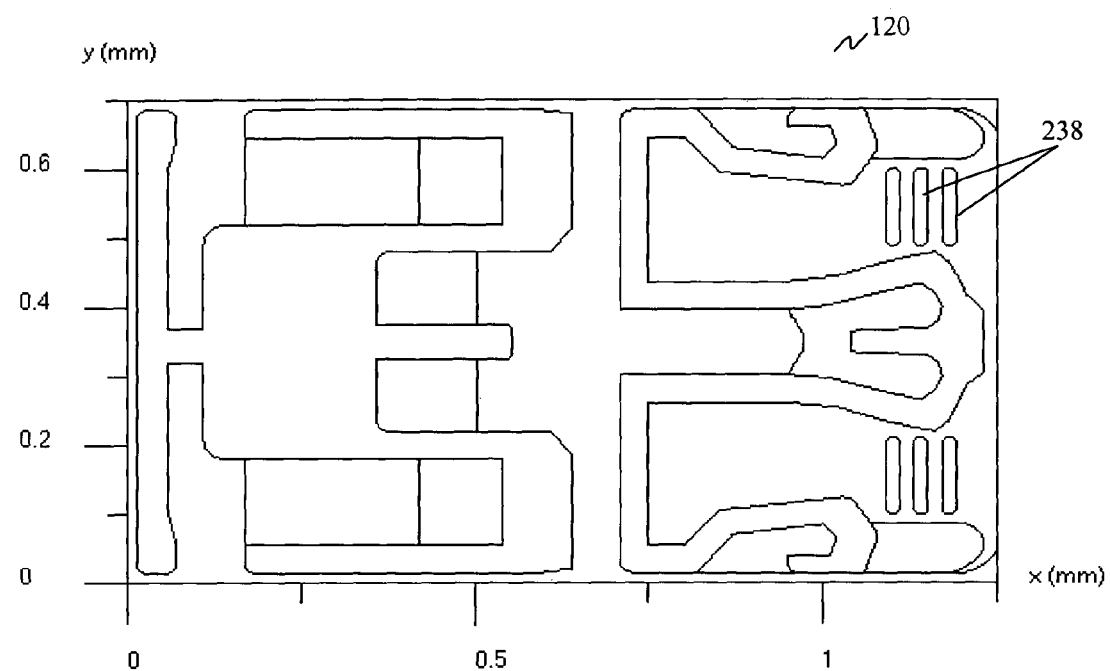
FIG. 42 shows a top view of a slider configured with an air bearing surface with multiple groves and shapes in accordance with an embodiment of the invention.

In another embodiment, the slider 120 is configured with an ABS 228 with close-etched and deep grooves 238 at the negative pressure (sub-ambient pressure) regions of ABS 228 close to the trailing edge 230. The etching depth of the grooves 238 can be the same as the depth of base recess. The grooves 238 are illustrated as shown in a top view in FIG. 40 and in a perspective view of the ABS 228 is given at FIG. 41. The grooves 238 may be located at regions where the reverse air flows meet the forward flows and form stagnation lines. In such a manner, the ABS 228 is provided with regions where lube (lubricant) droplets, particles and contaminations (henceforth generally referred to as "contaminants") are more likely to accumulate. Alternatively described, the grooves 238 may be located at the low air shear stress regions where contaminants are more likely to accumulate. Advantageously, the deep and close grooves 238 help to collect contaminants and avoid the contaminant accumulation on the ABS 228, so as to improve the reliability performance of the slider 120. Advantageously and unexpectedly, it is found that the grooves 238 may help increase the air bearing damping so as to help reduce the slider 120's vibrations at its 2nd pitch mode. It will be appreciated that the configuration of the ABS 228 and the grooves 238 as illustrated by FIGS. 40 and 41 are merely to aid understanding and not intended to preclude other possible configurations of the grooves 238. For example, multiple groves 238 and other shapes may be incorporated, such as the example shown in FIG. 42.

Figure 43:
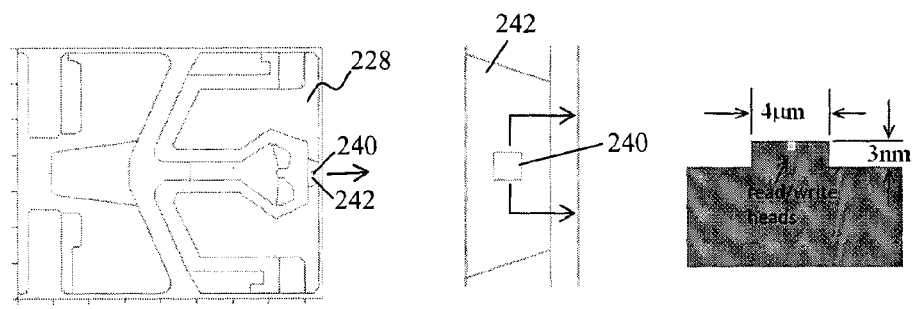
FIG. 43 shows a top view of an air bearing surface including a small pad on a trailing pad in accordance with an embodiment of the invention.
Figure 44:
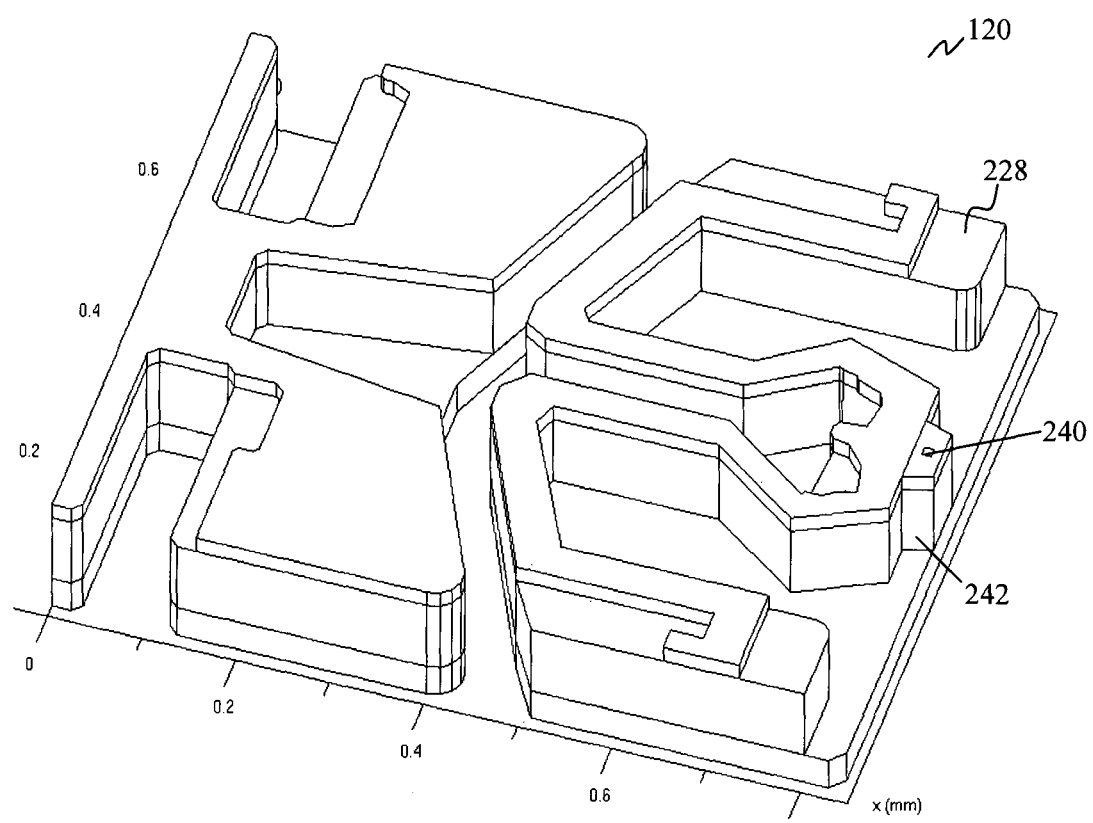
FIG. 44 shows a perspective view of the air bearing surface including a small pad on a trailing pad as shown in FIG. 43 in accordance with an embodiment of the invention.

In another aspect, the ABS 228 may include a small pad 240 on the trailing pad 242 (center pad at the trailing edge), as illustrated by FIGS. 43 and 44. Non-limiting suggestions for possible dimensions include a height of the small pad 240 of between 1 and 6 nanometers (nm) with a maximum length of the small pad 240 being smaller than 10 micrometers (μm) and the area of the small pad 240 may be less than 30 square micrometers. Incorporating the small pad 240 on the trailing pad 242 is expected to significantly reduce the short range forces. As the slider 120 has only one stable flying state, it does not demonstrate the slider 120 bouncing at various fly heights. Advantageously, slider bouncing is minimized or non-existent at fly heights of less than 1 nanometer. Further, the trailing pad 242 has very small short range forces, but has strong air bearing force.

Shields

Embodiments of a proposed shielding device will be described with reference to a differential current perpendicular to plane (CPP) dual spin valve magnetic recording head 244 for perpendicular recording, although it will be understood by one skilled in the art that the following description does not preclude the selection of other types of recording devices (generally described as read heads in the present application) for use with the present data storage device.

Figure 45:
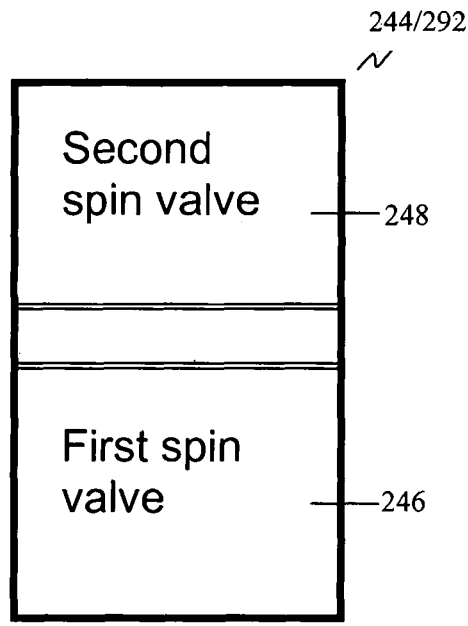
FIG. 45 shows a self-biased dual spin valve read head having a first spin valve and a second spin valve in accordance with an embodiment of the invention.

In one embodiment, there is provided a self-biased dual spin valve read head 244 having a sensor 292. The sensor 292 includes a first spin valve 246 and a second spin valve 248, as illustrated schematically in FIG. 45, in which the provision of a hard bias is not necessary.

Figure 46:
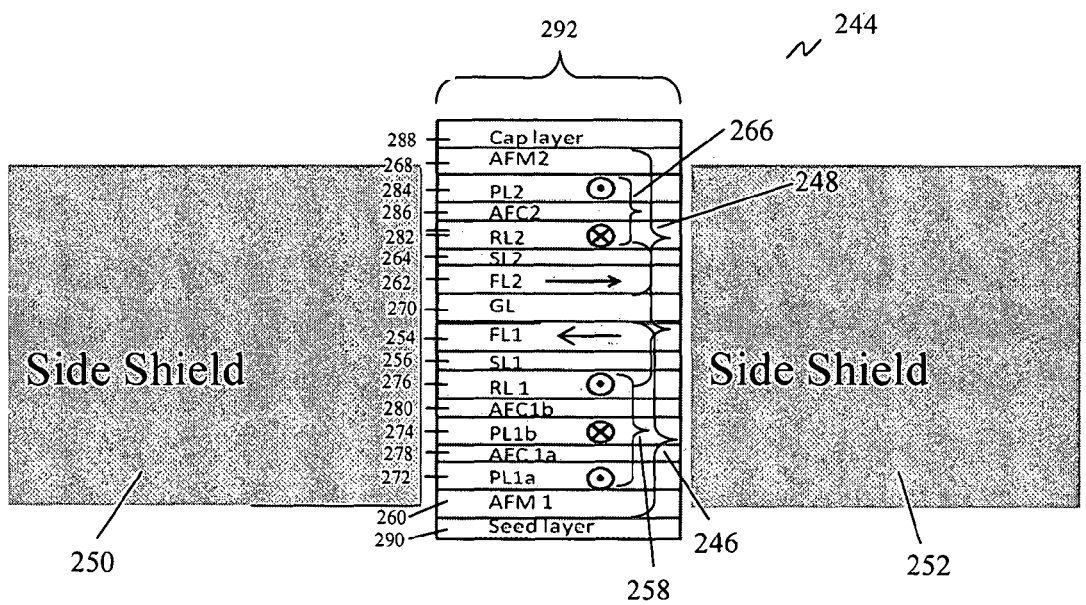
FIG. 46 shows a self-biased dual spin valve read head with two side magnetic shields on opposing sides of the sensor in accordance with an embodiment of the invention.

As shown in FIG. 46, the first spin valve 246 includes a first free layer structure (FL1) 254, a first spacer layer (SL1) 256 disposed adjacent to the first free layer structure 254, a first pinning structure 258 disposed adjacent the first spacer layer (SL1) 256, and a first anti-ferromagnetic layer (AFM1) 260 disposed adjacent to the first pinning structure 258. The second spin valve 248 includes a second free layer structure (FL2) 262, a second spacer layer (SL2) 264 disposed adjacent to the second free layer structure 262, a second pinning structure 266 disposed adjacent the second spacer layer (SL2) 264, and a second anti-ferromagnetic layer (AFM2) 268 disposed adjacent the second pinning structure 266. A separator structure (GL) 270 may be provided between the first spin valve 246 and the second spin valve 248. The separator structure 270 may be immediately adjacent the first free layer structure 254 and the second free layer structure 262. The read head 244 may be configured for differential CPP operation. The read head 244 may be configured with an odd number of the first ferromagnetic layers in the first pinning structure 258 and an even number of the second ferromagnetic layers in the second pinning structure 266 so as to enable the sensor 292 to provide a differential signal when a current flows through the sensor 292.

The first anti-ferromagnetic layer 260 and the second anti-ferromagnetic layer 268 may be of the same material.

The odd number of first ferromagnetic layers in the first pinning structure 258 may include a first pinned layer (PL1a) 272, a first further pinned layer (PL1b) 274 and a first reference layer (RL1) 276 and the even number of first anti-ferromagnetic coupling layers may include a first sub-anti-ferromagnetic coupling layer (AFC1a) 278 and a first further sub-anti-ferromagnetic coupling layer (AFC1b) 280.

The first sub-anti-ferromagnetic coupling layer 278 may be disposed between the first pinned layer 272 and the first further pinned layer 274 so as to form an anti-ferromagnetic coupling between the first pinned layer 272 and the first further pinned layer 274 such that the first pinned layer 272 may be of a different magnetization direction from the first further pinned layer 274. The first further sub-anti-ferromagnetic coupling layer 280 may be disposed between the first further pinned layer 274 and the first reference layer 276 so as to form an anti-ferromagnetic coupling between the first further pinned layer 274 and the first reference layer 276 such that the first further pinned layer 274 may be of a different magnetization direction from the first reference layer 276.

The even number of second ferromagnetic layers may include a second reference layer (RL2) 282 and a second pinned layer (PL2) 284 and the odd number of second anti-ferromagnetic coupling layers may include a second sub-anti-ferromagnetic coupling layer (AFC2) 286.

The second sub-anti-ferromagnetic coupling layer 286 may be disposed between the second reference layer 282 and the second pinned layer 284 so as to form an anti-ferromagnetic coupling between the second reference layer 282 and the second pinned layer 284 such that the second pinned layer 284 may be of a different magnetization direction from the second reference layer 282.

The first anti-ferromagnetic layer 260 may be disposed in contact with the first pinned layer 272 such that the first anti-ferromagnetic layer 260 may be configured to fix a magnetization direction of the first pinned layer 272 through exchange coupling between the first anti-ferromagnetic layer 260 and the first pinned layer 272.

The second anti-ferromagnetic layer 268 may be disposed in contact with the second pinned layer 284 such that the second anti-ferromagnetic layer 268 may be configured to fix a magnetization direction of the second pinned layer 284 through exchange coupling between the second anti-ferromagnetic layer 268 and the second pinned layer 284.

The first reference layer 276 and the second reference layer 282 may be of different magnetization directions.

In an embodiment, the first anti-ferromagnetic layer 260 and the second anti-ferromagnetic layer 268 may be of the same material and may be of the same magnetization direction. Therefore, the first pinned layer 272 and the second pinned layer 284 may also be of the same magnetization direction due to exchange coupling between the respective first anti-ferromagnetic layer 260 and the first pinned layer 272 and between the second anti-ferromagnetic layer 268 and the second pinned layer 284.

The first further pinned layer 274 may include a magnetic thickness substantially equal to a combined magnetic thickness of the first pinned layer 272 and the first reference layer 276 so that the magnetic thickness of the total first pinning structure 258 may be close to zero to enhance the pinning field (the pinning field is inversely proportional to the magnetic thickness of the first pinning structure 258).

In various embodiments, the magnetic thickness may be defined as the product of the saturation magnetization ($M_s$) and the physical thickness (t) of the layers. As an example, it may not be necessary to have a completely cancelled magnetic thickness in the respective first pinning structure 258 and second pinning structure 266. In this regard, using the first pinning structure 258 as an example, a slightly larger magnetic thickness of the respective first pinned layer 272 or the first further pinned layer 274 than the first reference layer 276 may be beneficial to reduce the magnetostatic field from the first pinning structure 258 acting on the first free layer structure 254. Similarly, for the second pinning structure 266, a slightly larger magnetic thickness of the second pinned layer 284 than the second reference layer 282 may be beneficial to reduce the magnetostatic field from the second pinning structure 266 acting on the second free layer structure 262.

In an embodiment, the respective first pinned layer 272, the first further pinned layer 274, the first reference layer 276, the first free layer structure 254, the second pinned layer 284, the second reference layer 282 and the second free layer structure 262 may include the same or different material. As an example, each of the respective first pinned layer 272, the first further pinned layer 274, the first reference layer 276, the first free layer structure 254, the second pinned layer 284, the second reference layer 282 and the second free layer structure 262 may include any number of ferromagnetic layers with different materials and orders, like the first further pinned layer 274 may include CoFe/CoFeB, and the first reference layer 276 may include CoFeB/CoFe or CoFe/CoFeB. Further, the respective first pinned layer 272, the first further pinned layer 274, the first reference layer 276, the first free layer structure 254, the second pinned layer 284, the second reference layer 282 and the second free layer structure 262 may also include a single layer or a multilayer structure, for example, CoFe/NiFe for the first free layer structure 254; the second free layer structure 262, CoFe/CoFeB for the first reference layer 276; the second reference layer 282.

In an embodiment, each of the respective first anti-ferromagnetic layer 260 and the second anti-ferromagnetic layer 268 may include an anti-ferromagnetic material selected from a group consisting of IrMn, $Ir_2Mn$, PtMn, FeMn, for example.

The first free layer structure 254 may include a magnetization direction parallel or anti-parallel to the second free layer structure 262. As an example in FIG. 46, the first free layer structure 254 may include a magnetization direction parallel to the second free layer structure 262 as shown by the arrows.

The separator structure 270 may include a gap layer (GL). The separator structure 270 may include a single layer structure or a multi-layer structure for example Ru/Ta/Ru or Ru/Cu/Ru depending on user and design requirements.

In an embodiment, each of the respective first spacer layer 256 and the second spacer layer 264 may include an insulator, a metal or a Heusler alloy for example. The separator structure 270 may include a non-magnetic electrically conducting material. As a further example, the separator structure 270 may include metals such as Ta, Ru, Al, Cr and Heusler alloy such as CuCrAl for example.

In an embodiment, each of the respective first free layer structure 254 and the second free layer structure 262 may include either a single layer or a multi-layer of ferromagnetic materials selected from a group consisting of transition metals and their alloys, half and full Heusler alloys for example.

As an example in FIG. 46, the first pinning structure 258 may include three first ferromagnetic layers (i.e. the first pinned layer 272, the first further pinned layer 274, the first reference layer 276) and two first anti-ferromagnetic coupling layers (i.e. the first sub-anti-ferromagnetic coupling layer 278, the first further sub-anti-ferromagnetic coupling layer 280). As a further example, the first pinning structure 258 may include five first ferromagnetic layers and two first anti-ferromagnetic coupling layers. As an example, the first pinning structure 258 may include only one ferromagnetic layer (i.e. first reference layer 276). As a yet further example, the first pinning structure 258 may include five first ferromagnetic layers and four first anti-ferromagnetic coupling layers. The first pinning structure 258 may include any suitable odd number of first ferromagnetic layers and any suitable even number of first anti-ferromagnetic coupling layers, wherein each of the odd number of first ferromagnetic layers may be separated from another of the odd number of first ferromagnetic layers by at least one of the even number of first anti-ferromagnetic coupling layers.

The second pinning structure 266 may include two second ferromagnetic layers (i.e. the second reference layer 282 and the second pinned layer 284) and one second anti-ferromagnetic coupling layer (i.e. the second sub-anti-ferromagnetic coupling layer 286). As a further example, the second pinning structure 266 may include four second ferromagnetic layers and one second anti-ferromagnetic coupling layer. As a yet further example, the second pinning structure may include four second ferromagnetic layers and three second anti-ferromagnetic coupling layers. The second pinning structure 266 may further include any suitable even number of second ferromagnetic layers and any suitable odd number of second anti-ferromagnetic coupling layers, wherein each of the even number of second ferromagnetic layers may be separated from another of the even number of second ferromagnetic layers by at least one of the odd number of second anti-ferromagnetic coupling layers.

The sensor 292 may further include a seed layer 290 disposed on the first anti-ferromagnetic layer 260. In an embodiment, the seed layer 290 may include a metal selected from a group consisting of Ta, NiFe, Cr, NiFeCr, CrRu, for example.

The sensor 292 may further include a capping layer 288 disposed on the second anti-ferromagnetic layer 268. In an embodiment, the capping layer 288 may include any conductive materials such as Ta, Ti, Ru, Au and Cr.

Figure 48:
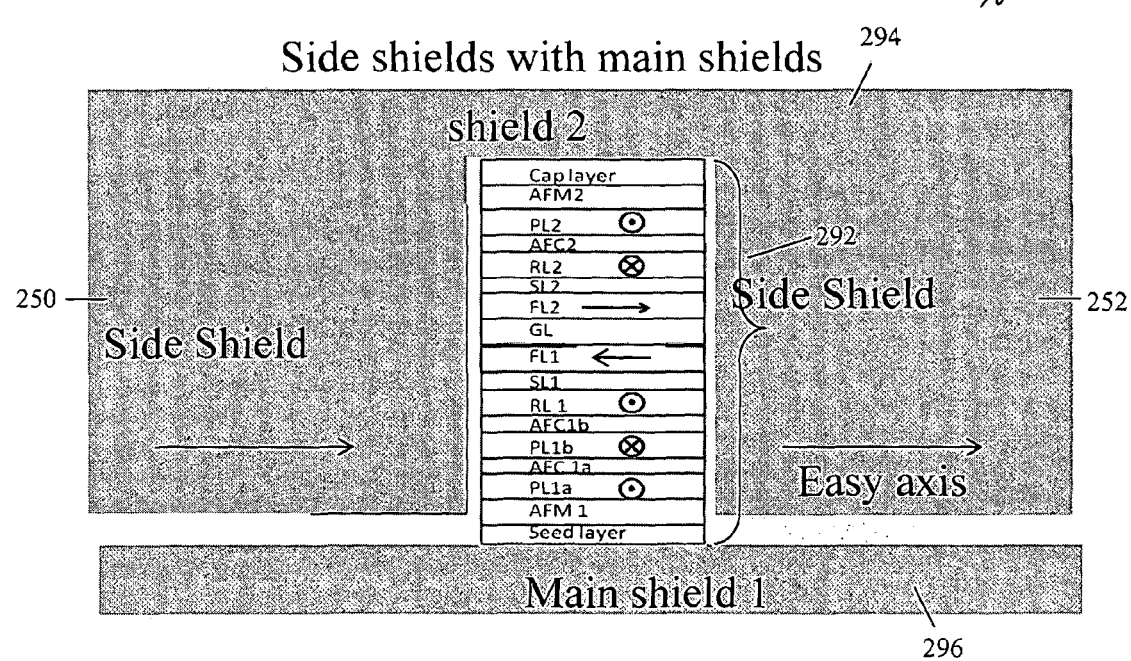
FIG. 48 shows a self-biased dual spin valve read head with two side magnetic shields and two top and bottom magnetic shields in accordance with an embodiment of the invention.
Figure 49:
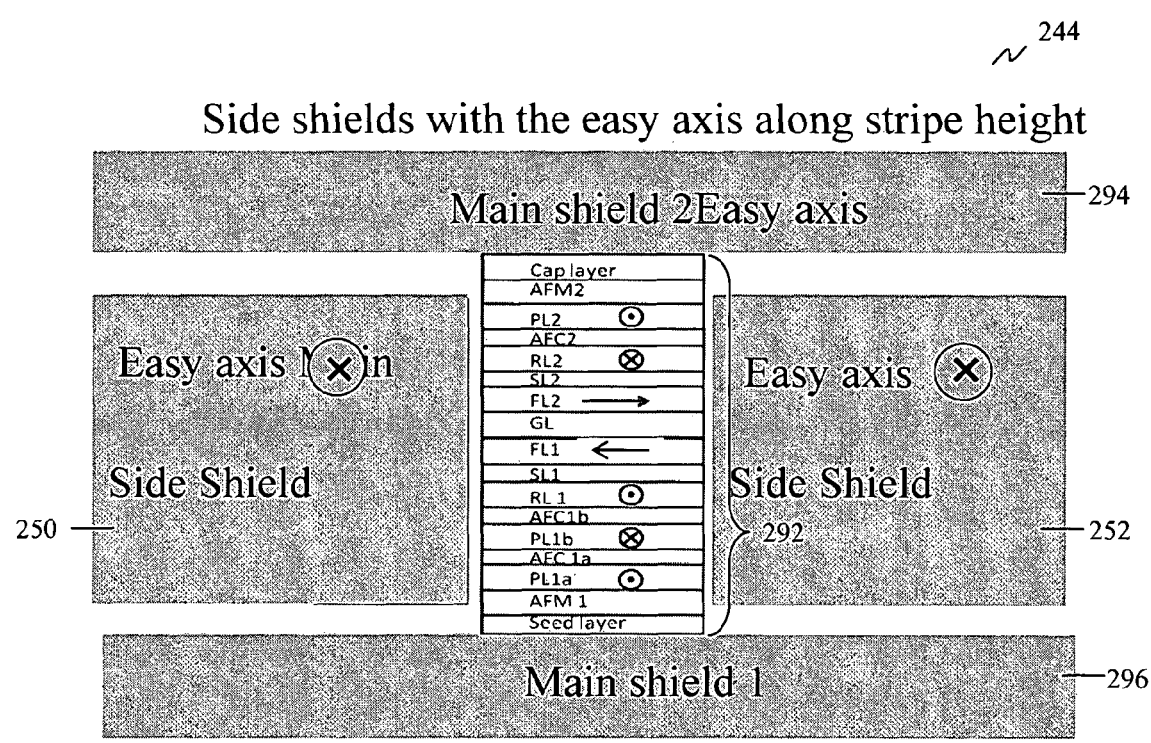
FIG. 49 shows a self-biased dual spin valve read head with two side magnetic shields and two top and bottom magnetic shields, the two side shields with the easy axis along stripe height in accordance with an embodiment of the invention.

In one embodiment, there is further provided at least a first side magnetic shield 250 and at least a second side magnetic shield 252, in which at least part of the first side magnetic shield 250 and at least part of the second side magnetic shield 252 are on opposing sides of the sensor 292, as illustrated schematically in FIGS. 46, 48 and 49.

Figure 47:
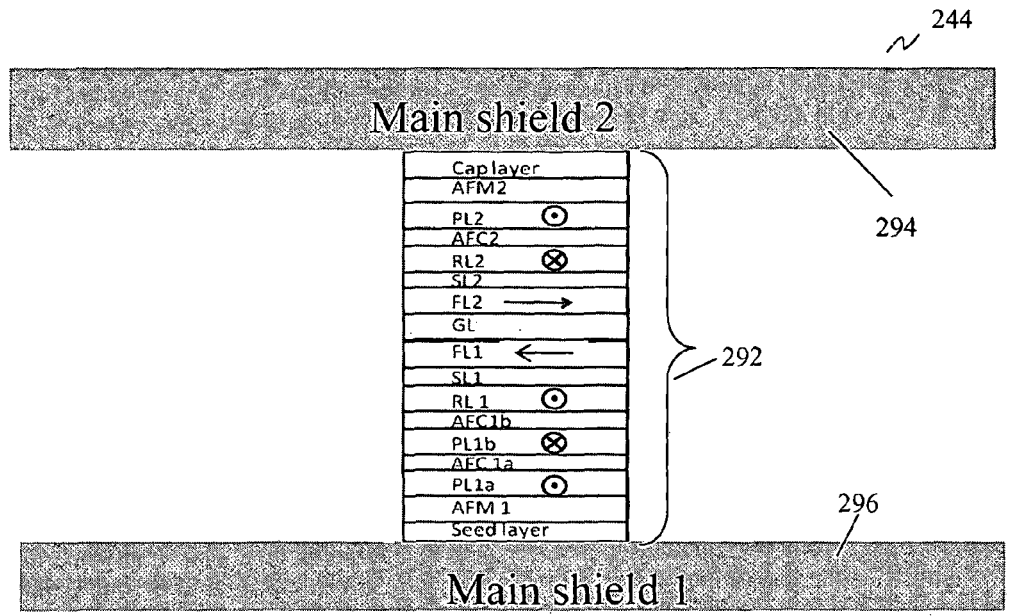
FIG. 47 shows a self-biased dual spin valve read head with two top and bottom magnetic shields in accordance with an embodiment of the invention.

In an embodiment, there is further provided at least a top magnetic shield 294 and a bottom magnetic shield 296 may be respectively disposed on the top and the bottom of the sensor 292 in a downtrack direction, such as illustrated schematically in FIGS. 47, 48 and 49. The downtrack direction refers to the direction in which the read head 244 is configured to travel relative to the disk or media when the data storage device is in operation. In another embodiment, the first side magnetic shield 250 and the second side magnetic shield 252 may be disposed on opposing sides of the read head 244 in a cross track direction such that at least part of a first selected magnetic shield (of multiple magnetic shields 250, 252, 294, 296) and at least part of a second selected magnetic shield (of multiple magnetic shields 250, 252, 294, 296) are separated by an insulator without any intervening dual spin valve structure, as illustrated in FIGS. 48 and 49. The magnetic shields 250, 252, 294, 296 may be selected from soft ferromagnetic materials, as will be appreciated by one skilled in the art. Advantageously, the present embodiments enable a reduction in side reading, and thus facilitate higher recording density.

WiFi and Inductively Coupled Battery for Enabling I/O and Battery Charging While Maintaining the Data Storage Device in a Sealed Environment In accordance with the present embodiment, the capacity of the data storage device 100 is remarkably increased and the operation performance of the data storage device 100 is significantly improved by providing the data storage device 100 in a sealed housing 298 filled with helium gas. It has long been recognized that with a helium environment, the position error of the magnetic head due to flow induced vibration can be significantly reduced. This is due to the lighter mass and higher damping of helium compared to an air environment. In addition, in a helium environment, the disk storage device 100 has increased corrosion resistance capability between the head and the media, lower power consumption, smoother temperature distribution, and less problems due to humidity, altitude and other atmospheric effects as compared to an air environment.

Figure 50:
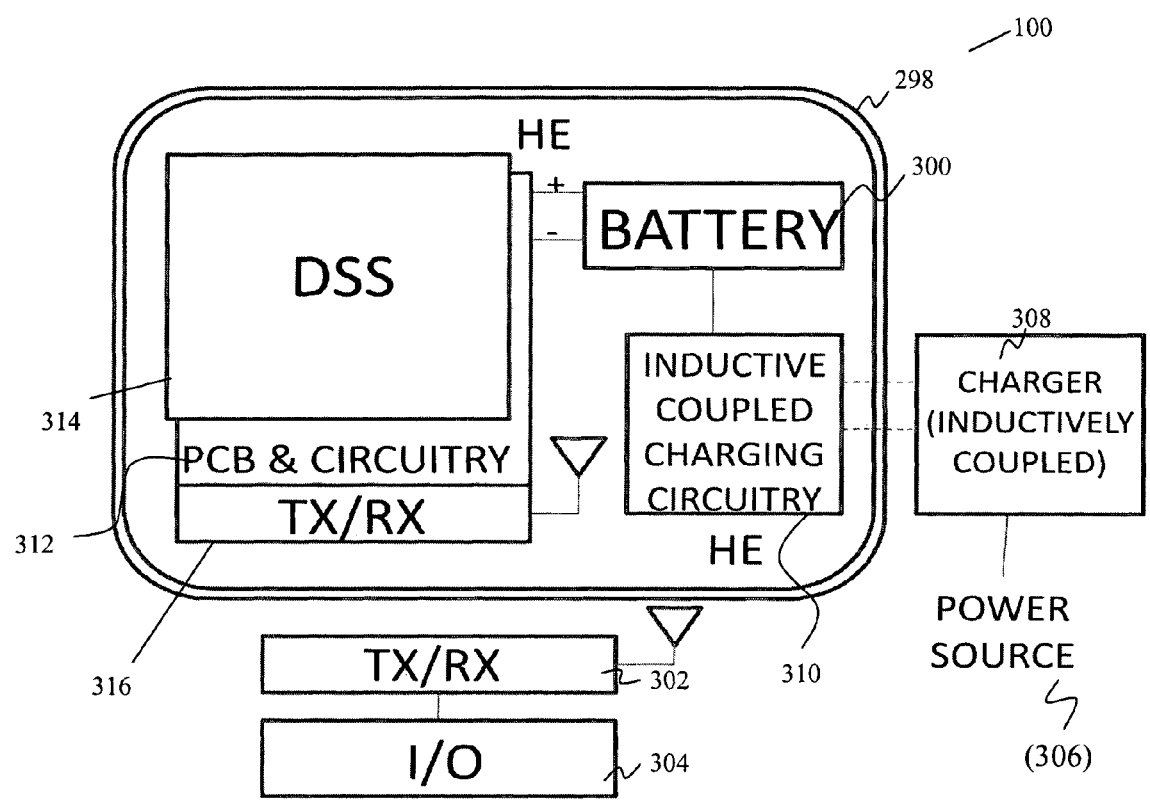
FIG. 50 shows a block diagram of a data storage device in a sealed housing in accordance with an embodiment of the invention.

Referring to FIG. 50, a block diagram depicts the data storage device 100 in a sealed housing 298. The housing 298 can be formed of a ceramic or a liquid crystalline polymer and sealed after fabrication. Prior art hard disk drives could not assure the integrity of the sealed housing because orifices had to be provided in the housing for supplying power to the components and for providing the data signals for storage into the device or reading from the device. The invention overcomes these deficiencies in the prior art by providing a battery 300 for powering the circuitry and apparatus of the data storage device 100 and providing means for inductively coupling or inductive coupling circuitry 310 to a power source 306 outside the sealed housing 298 in order to charge the battery 300.

Figure 51:
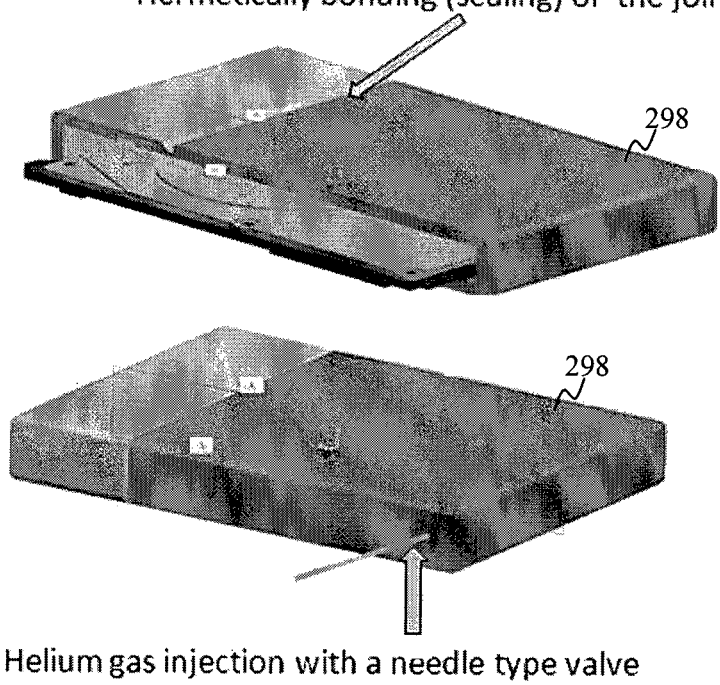
FIG. 51 shows a perspective view of a data storage device in a sealed housing in accordance with an embodiment of the invention.

The housing 298 can be made of ceramic or liquid crystal polymer or any other material which has near to zero helium gas permeability. The housing 298 can be hermetically sealed using any of several known kinds of sealants or by coating, laser welding, or glass fret soldering or any similar sealing method as shown in FIG. 51.

In addition, short-range, high throughput external transceiver means 302 is provided to wirelessly coupling an external input/output source 304 to the printed circuit board (PCB) with hardware circuitry 312 of the data storage device 100.

Preferably the external transceiver means 302 is a matched pair of radio frequency transceivers communicating in accordance with known RF protocols such as WiFi or short-range 60 GHz. Thus, as depicted in FIG. 50, the mechanisms of the data storage device 100 such as the disk storage device and read/write controls therefore (Data Storage Software (DSS) 314), the PCB with the hardware circuitry 312 for operation of the disk storage device 100, and the battery 300 are sealed in the Helium environment along with inductive coupling circuitry 310 for coupling the battery 300 to the external charger 308 and an internal transceiver circuitry 316 for coupling the DSS 314 to the I/O device 304. Permanent sealing can be done at the factory in a controlled environment to significantly reduce the possibility of a failure of the housing seal.

Figure 52:
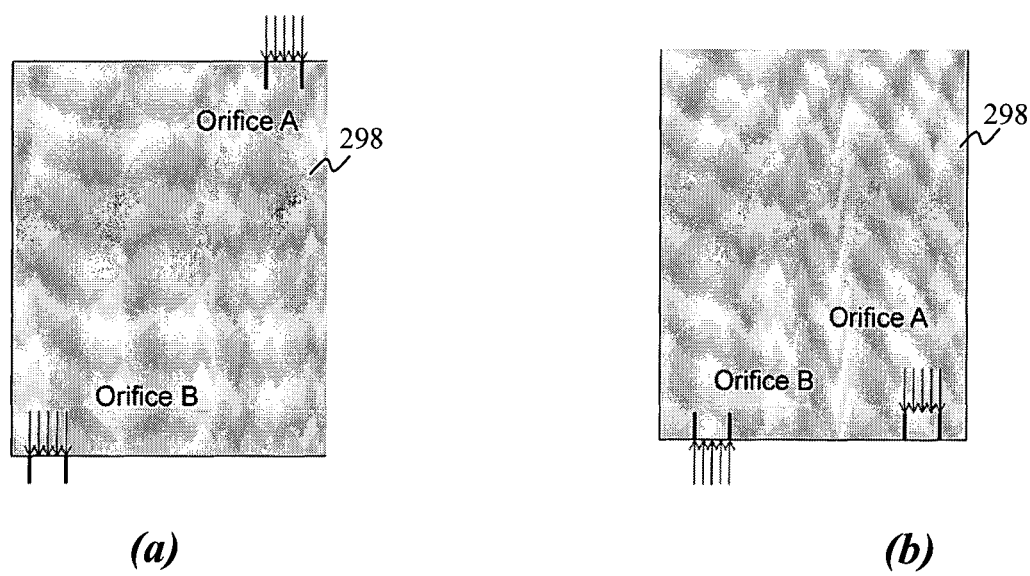
FIGS. 52A and 52B show respective layouts of orifices A and B in a sealed housing in accordance with an embodiment of the invention.
Figure 53:
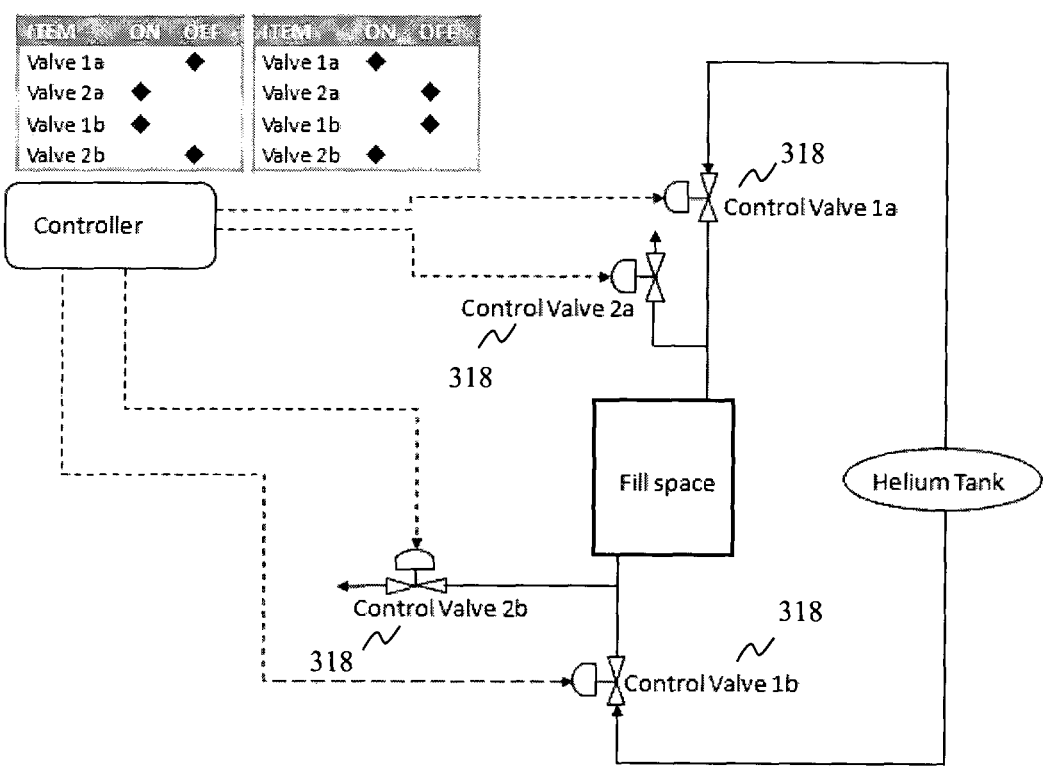
FIG. 53 shows a schematic of oscillatory helium injection process implemented and controlled using solenoid valves in accordance with an embodiment of the invention.

In accordance with the preferred embodiment, an oscillatory helium gas injection method is proposed for instilling the helium gas to the sealed housing 298. As shown in FIG. 52, in a helium-filled housing 298, there are two orifices A and B. While orifice A is used to inject helium gas inside the housing 298, orifice B is concurrently used to purge to residual air from the housing 298. A short time later, orifice B is used to inject helium gas inside the housing 298, while orifice A is used to purge the residual air. After a few rounds of oscillating orifices A and B from injecting or purging, the housing 298 will be fully filled with helium gas and the residual air will be completely purged out. The layout of the orifices A and B is depicted in FIGS. 52A and 52B. The oscillatory helium injection process can be implemented and controlled using solenoid valves 318 as shown in FIG. 53. After injection of the helium gas, the orifices A and B will be hermetically sealed using a sealant.

A system and method for monitoring the helium concentration in a housing 298 of a data storage device 100 in accordance with the present embodiment is disclosed. In one embodiment, a pair of ultrasonic sensors is placed in the housing 298 of the data storage device 100 to monitor the level of helium content using an ultrasonic wave propagation approach since the sound speed in helium gas is approximately three times higher than in air. If the sound speed falls below a certain level indicating that the helium concentration in the housing 298 of the data storage device 100 has fallen to a dangerously low level, an automatic notification will be sent to users in order to remind the users to back-up the data stored on the data storage device 100.

Improved Controller and Driver for a Rotary PZT Actuator

Hard disk drives (HDD's) provide important data-storage medium for computers and other data-processing systems. In most hard disk drives, rotating disks coated with a thin magnetic layer or recording medium are written with data. The data on such recording medium is arranged in concentric circles or tracks. Data is read or written with a read/write (R/W) head, which consists of a small horseshoe-shaped electromagnet. A typical hard disk servo system utilizes a voice coil motor (VCM) actuator for moving the head across the recording medium.

The two main functions of the R/W head positioning servomechanism in disk drives are track seeking and track following. Track seeking moves the R/W head from the present track to a specified destination track in minimum time using a bounded control effort. Track following maintains the head as close as possible to the destination track center while information is being read from or written to the disk. It is suggested that on a disk surface, tracks should be written as closely spaced as possible to maximize usage of the disk surface. This means an increase in the track density. Track density is the reciprocal of the track width. An increase in track density results in a more stringent requirement on the allowable variations of the position of the heads from the true track center.

With a demand for increasingly larger data storage capacity without significant increase in the size of the recording medium, the track width must necessarily be smaller leading to lower error tolerance in the positioning of the head. Therefore, a controller for track following has to achieve tighter regulation in the control of the servomechanism positioning the head. Basically, functions of a servo system for positioning the head can be divided into three stages: a track seeking stage, a track settling stage and a track following stage. Current hard disk drives use a combination of classical control techniques, such as proximate time optimal control techniques during the tracking seeking stage and lead-lag compensators and PID compensators in the track following stage. Additionally, some notch filters are used to reduce the effects of high frequency resonant modes. These classical methods have difficulty meeting the high performance demands for hard disk drive operation.

To meet the high performance demands, improved nonlinear control techniques have been proposed. One such nonlinear control technique is a proximate time-optimal servomechanism (PTOS) which achieves near time-optimal performance for a large class of motion control systems characterized by a double integrator. However, PTOS is made to yield a minimum variance with smooth switching from the track seeking to track following modes via a mode switching controller.

Figure 54:
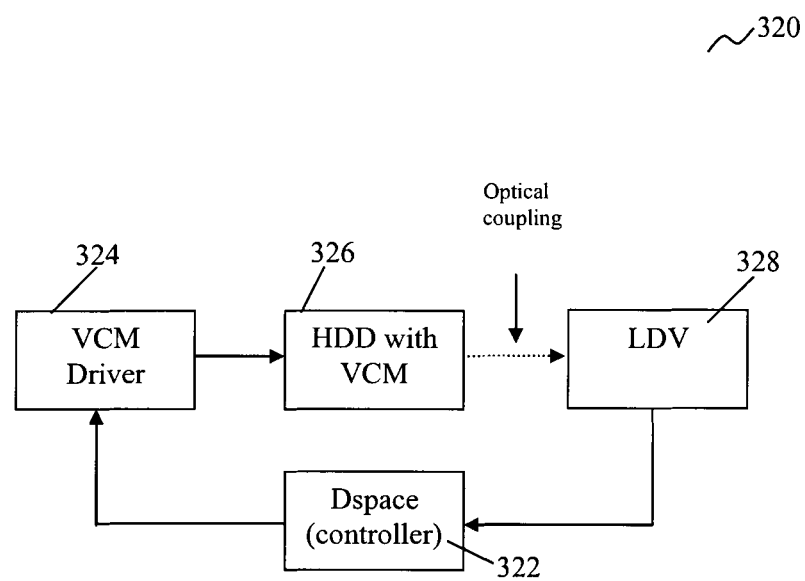
FIG. 54 shows a conventional data storage device using a voice coil motor actuator in accordance with an embodiment of the invention.

Referring to FIG. 54, a conventional data storage device 320 using a VCM actuator 326 includes a controller 322, a VCM driver 324 and the VCM actuator 326 to control positioning of the head (not shown) for reading and writing operations. A laser doppler vibrometer (LDV) 328 is optically coupled to the head to measure the absolute position thereof for determining the time for response to stay and settle commands provided to the controller 322. In this manner, the response time for different seek lengths and different settling times were measured as seen in Table 2.

TABLE 2

Settling time for various seek lengths

| Seek length in μm | Settling time in msecs |
|---|---|
| 0.8 | 0.56 |
| 4 | 1.77 |
| 8 | 1.67 |
| 20 | 2.85 |
| 40 | 3.23 |
| 80 | 4.11 |
| 160 | 4.52 |

In accordance with the present embodiment, a rotary piezoelectric (PZT) motor is used for actuation of the head-suspension assembly. The PZT motor reduces volume, mass and cost of the data storage device 100 by replacing the VCM. Also, the PZT motor improves the accuracy of the actuation of the head-suspension assembly due to the PZT's accurate step control. Some of the advantages of the PZT based primary actuation are cost reduction, size reduction of the data storage device and associated housing material cost reduction, relatively lower power consumption, elimination of heat generated by the coil in the VCM motor, elimination of "cross-talk" between the VCM and a head-gimbel assembly (HGA) since the traces are now separated from each other, and possible elimination of a secondary Dual Stage Actuator (DSA) at the slider.

In order to achieve the speed and accuracy needed to achieve the improved track density requirements, the PZT stator (motor) can be operated using two distinct modes of operation, "seek" operation using an AC signal to maintain continuous movement and "track" operation using a DC signal for track following. For a "seek fast" mode of operation, the electrodes on the face of the PZT stator receive phase shifted sine electrical signals in the stator's ring natural frequency, thereby creating three standing waves under the three tips of the PZT stator. The standing waves result in the PZT motor rotor receiving many kicks, creating a "stick-slip" motion, to keep the rotor in a fast rotary movement. The "seek fast" mode is utilized when the data storage device needs to move the arm fast from one area of the disc to another. A "seek slow" mode of operation is used when a slow continuous movement of the arm is needed. For the "seek slow" mode of operation, an input sine signal in the stator's ring natural frequency is applied to one set of the pair of sets of the electrodes and to the common electrode, selected set of electrodes determining the rotation direction.

A "track following" secondary mode of operation applies a DC electrical voltage to the electrodes on the face of the PZT stator, thereby creating an actuator (or "flexor like") movement where the tip containing the head will tilt while still in contact with the rotor. This secondary mode is implemented after the arm has been moved to a designated area near the desired track by the seek mode to move the arm to an individual track and then follow this track. In accordance with the present embodiment, the "track following" mode can be implemented is operated and controlled by the existing servo to maintain the arm within an on-track stability (as the disc rotates) having a discrete movement of no more than 0.1 nanometers. There are two sub-modes of operation for "track following": "Track Fine" where each of the two sets of electrodes receive opposing voltages, and "Track Coarse" where only one of the two sets of electrodes receives a voltage.

Figure 55:
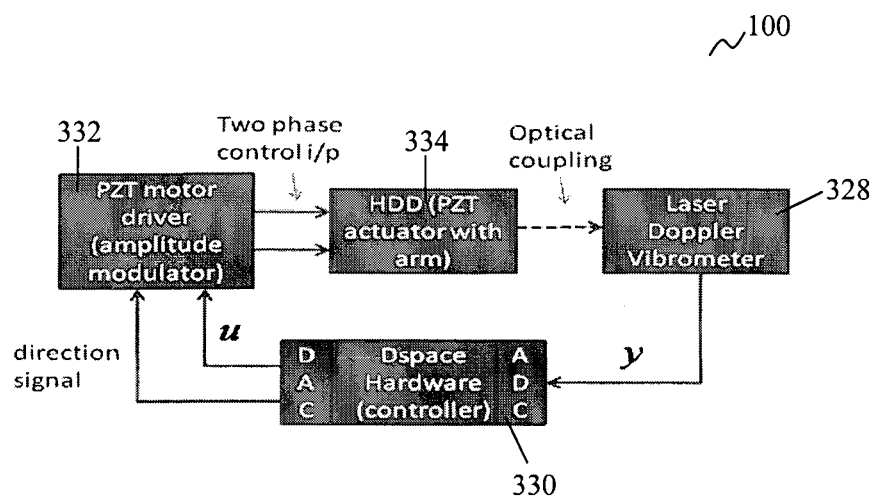
FIG. 55 shows a data storage device using a rotary piezoelectric (PZT) motor in accordance with an embodiment of the invention.

Referring to FIG. 55, the data storage device 100 in accordance with the present embodiment includes a controller 330, a PZT motor driver 332 and the PZT actuator 334 to control the arm for positioning of the head (not shown) during reading and writing operations. Similar to the VCM controller design, the PTOS controller 330 for PZT actuator 334 can be designed but the final control input to the PZT motor must be an amplitude modulated signal using the resonance frequency of the PZT motor as the carrier signal. While not shown, a data signal processor is coupled to the PZT motor driver and generates the 127 KHz carrier signal. The PZT driver 332 thus converts the control output from the controller 330 into suitable two-phase amplitude modulation signals to drive the PZT motor.

As described above in regards to FIG. 54, a LDV 328 is likewise optically coupled to the head to measure the absolute position thereof for determining the time for response to stay and settle commands provided to the controller 330. The controller hardware utilizes additional software to generate two control signals for the PZT motor driver 332. The first signal, labeled u, is in volts and is defined in accordance with a PTOS control law as set out in Equation (1).

$$u = u_{max} \cdot sat\left(\frac{k_2[f(e) - v]}{u_{max}}\right) \quad (1)$$

where e=r−y and the function $f(e)$ is defined as $$f(e) = \begin{cases} \frac{k_1}{k_2}(e) & \text{for } |e| \le y_l \\ sgn(e)\left[\sqrt{2u_{max}a\alpha|e|} - \frac{u_{max}}{k_2}\right] & \text{for } |e > y_l| \end{cases} \quad (2)$$

Figure 55A:
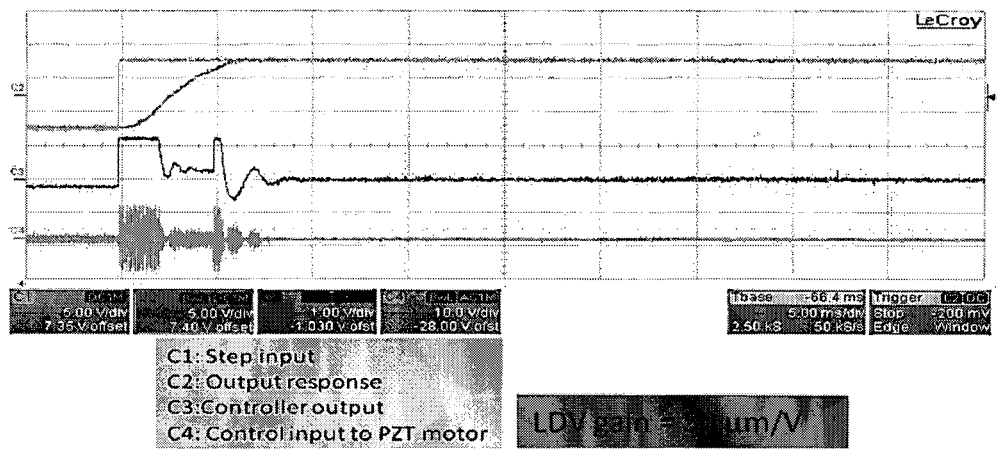
FIG. 55A shows a plot of a response from a data storage device using a rotary piezoelectric (PZT) motor in accordance with an embodiment of the invention.

Note that α is commonly regarded as the discount factor of the PTOS scheme, whereas $y_l$ is its linear region. The other values were adjusted to obtain a smooth output response from the actuator 334 as shown in FIG. 55A. Thus, a direction signal is applied to the PZT motor driver 332 along with u and the driver 332 generates a two-phase control signal to achieve its smooth output response. Advantageously, the output response is also faster. Referring to Table 3, the response time for different seek lengths and different settling times are much faster than those in Table 2.

TABLE 3

Settling time for various seek lengths

| Seek length in μm | Settling time in msecs |
|---|---|
| 10 | 1.5 |
| 300 | 3.0 |
| 500 | 4.5 |

Common actuator arm control problems can be minimized by the control system in accordance with the present embodiment, thereby providing an improved PZT motor-enabled data storage device 100 for improved operation with many or all of the previously discussed advantages. For example, it is recognized by those skilled in the art that the disk eccentricity due to shock in modern disk drives will be approximately 50 μm at the fundamental rotational frequency of the spinning disk. The repeatable run out (RRO) capability of the PZT system to follow the disk slip includes harmonics in the RRO due to the nonlinearities in the PZT motor system. These nonlinearities can be removed by increasing the control bandwidth and/or by using multi-sine control inputs. Thus, the control structure of the present embodiment can be used to perfect following of the disk slip. Adaptive feed-forward capability of the actuator under control of the system of the present embodiment permits tracking of all the harmonics, particularly after increasing the control bandwidth to minimizes any tracking errors.

Buried Servo Layer

Figure 56:
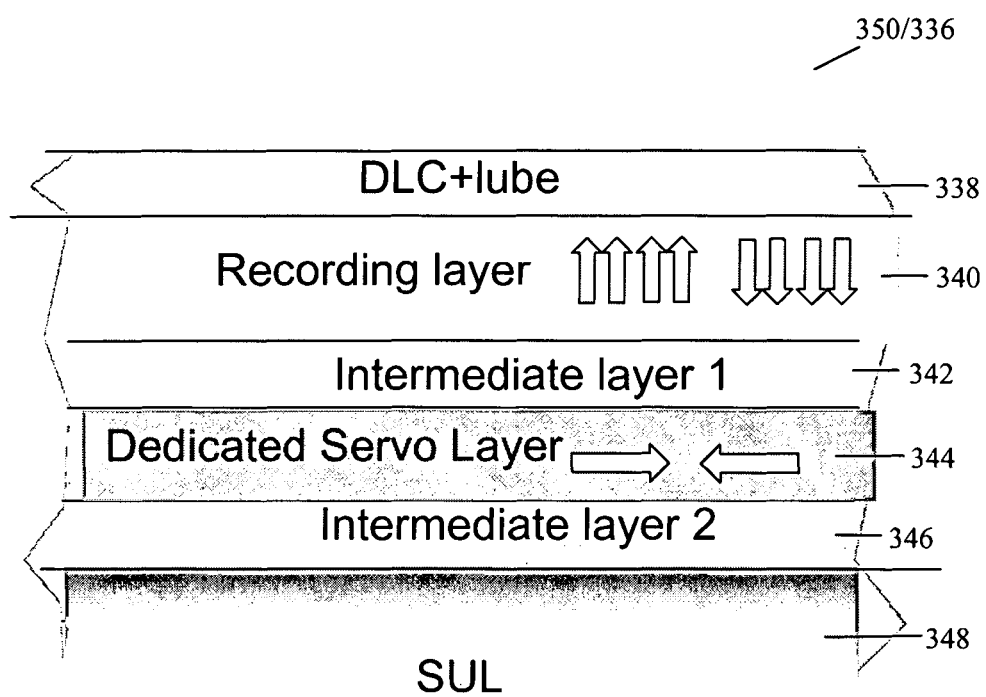
FIG. 56 shows a cross-sectional view of a media for a data storage device in accordance with an embodiment of the invention.

Dedicated Layer Servo for High Surface Utilization and Continuous Servo Feedback Signal of Magnetic Disk Drives Referring to FIG. 56, a cross-sectional view of media 350 for the data storage device 100 in accordance with the present embodiment is depicted. The media 350 is a disk-shaped media. Functionally, the data storage layer stack or structure 336 of each disk media surface includes a diamond-like carbon (DLC) layer with lubricant covering 338, a data recording layer 340, an intermediate layer 342 (i.e. first intermediate layer or Intermediate Layer 1), a dedicated servo layer 344, another intermediate layer (i.e. second intermediate layer or Intermediate Layer 2) 346, a magnetic soft underlayer (SUL) 348, a third intermediate layer (not shown) and a disk substrate (not shown). In accordance with the present embodiment, the buried servo layer 344 is separated from the recording layer 340 by the intermediate layer 342. Below the servo layer 344 is another intermediate layer 346 separating the servo layer 344 from the magnetic soft underlayer 348. Those skilled in the art will recognize that most of today's disk media are two-sided; accordingly the present structure would be duplicated in reverse to create the second recording/servo layer structure stack. In addition, while the functional layer stack structure 336 has been depicted in FIG. 56, those skilled in the art will recognize that the actual structure is carefully constructed and typically includes processes that form the media 350 in many different layers and that the view of FIG. 56 is a simplified drawing of a media structure utilizing a recording layer 340 having a perpendicular magnetization orientation and a separate servo layer 344 which can either have a perpendicular or a longitudinal magnetization orientation in accordance with the present embodiment. Also, each functional layer (i.e. recording layer 340, servo layer 344) can have one or more than one actual material layers to realize their said functions.

The structure 336 of the present embodiment increases a recording layer utilization ratio (i.e., the ratio of actual data storage capacity of the recording layer 340 to possible storage capacity of the disk surface) because no part of the recording layer 340 is utilized for location detection (i.e., none of the recording layer 340 is tasked or dedicated as servo sectors or provides positioning signals for servo control). Prior art disk media either had dedicated one whole disk surface for a servo layer, or embedded servo burst sectors between data sectors in the recording layer for location detection, or did not use the perpendicularly oriented media data layer for data storage.

Such prior art devices without the dedicated servo layer buried underneath the data layer in accordance with the present embodiment also have limited position feedback which reduces the achievable track storage density. In many instances, such prior art media uses discrete position signals to discretely provide position feedback. As data storage devices such as hard disk drives increase storage capacity of the disk media through storage schemes such as shingled writing, increased surface utilization ratio and higher positioning accuracy will be required. The dedicated servo layer 344 in accordance with the present embodiment advantageously allows continual position feedback thereby providing continual location detection without utilizing any of the recording layer 340 for location detection. Therefore, the present embodiment of the disk media 350 using the dedicated buried servo layer 344 not only provides higher positioning accuracy through continual location determination, but also removes the servo burst sectors from the recording layer 340, thereby increasing surface utilization of the storage space in the recording layer 340 and further increasing the data recording density by increasing the track positioning accuracy.

Automatic Gain Control Burst Free Disk Drives with Clock Signal Generated from Dedicated Servo Layer (Advantages of #1) [1 and 2 of 3]

Additional recording layer storage space is freed up in the disk media 350 of the present embodiment thereby improving the surface utilization rate for data recording because, with the removal of the servo burst sectors from the recording layer 340, additional portions of the recording layer 340 dedicated to automatic gain control (AGC) signals and servo control signals are no longer needed. Conventional disk drives use automatic gain control to establish a reference for servo burst amplitude detection and servo control. The buried servo layer removes the necessity of these signals.

However, conventional disk drives also use the automatic gain control to establish a feedback clock signal for synchronization of media read and write operations to minimize the effect of spindle speed fluctuation. The buried servo layer 344 in accordance with the present embodiment advantageously provides a continual, predictable signal as a position error signal for location detection. This position error signal can be utilized as a feedback clock signal for the synchronization of the data read and write operations, thereby improving the surface utilization rate (i.e., removing additional reasons for providing an AGC signal in the recording layer) while simultaneously minimizing the effect of spindle speed fluctuation.

High Coercive Squareness Servo Layer Magnetic Design

In accordance with the present embodiment, fabrication of the buried servo layer 344 and storage of the magnetic information therein optimizes data retention and magnetic readability. Data storage is achieved in the data recording layer 340 by changing the perpendicular magnetization direction at locations in the data storage layer or data recording layer 340. With regards to the storage of positioning information in the buried servo layer 344, the positioning information can be magnetically stored in the buried servo layer 344 by either perpendicularly orientated magnetization or longitudinally orientated magnetization of the dedicated servo layer 344.

The dedicated servo layer 344 is designed in such a way that its nucleation field Hn is larger than the saturation field required for the saturating data writing in the data layer or data recording layer 340 and its coercive squareness value is close to one, where the coercive squareness is a parameter describing the slope stiffness of the media hysteresis loop at coercivity. A coercive squareness of one means that the slope is vertical or the slope value is infinite. The buried servo layer 344 can sustain the stored information so long as the effective writing field reaching the buried servo layer 344 when writing to the data recording layer 340 is less than the nucleation magnetic field of the buried servo layer 344. Longitudinally stored data is more stable at lower bit storage densities, but can be affected by the numerous times that data is written to the recording layer 340 due to the lower loop squareness of the buried servo layer 344. The loop squareness is the ratio of the remnant magnetization to the saturation magnetization of the magnetic layer. Thus, the buried servo layer 344 may be fabricated to optimally store data longitudinally if the nucleation field Hn of the buried servo layer 344 is higher than the saturating field required for data writing in the perpendicularly oriented data recording layer 340.

In addition, as discussed later, reading the buried servo occurs at low frequencies while a high bandpass filter is used to read information stored in the recording layer 340. Therefore, it is preferred to suppress the magnitude of higher order harmonics of the signals from the buried servo layer 344 to prevent interference with reading information from the recording layer 340. Such a suppression can be achieved by optimizing the thickness of the first intermediate layer (or Intermediate layer 1) 342 between the data layer (or data recording layer 340) and the servo layer 344 and by proper control of the transition region length of magnetization of two neighboring bits. For example, a large grain size can increase the transition region length and help to reduce the higher order harmonics of the buried servo signal, especially in conjunction with using a low field gradient head for writing data to the servo layer 344, because of the broadened transition region length. Proper selection of the first intermediate layer 342 will lead to a correspondingly high head-media spacing (HMS) for servo layer reading. In addition, the saturation magnetic field of the servo layer 344 needs to be moderated because a large saturation field with servo signals at lower densities produces a stronger magnetostatic interaction between the servo layer 344 and the recording layer 340 which can lead to increased periodical transition shifts in the recording layer 340. Preferably, the buried servo layer 344 is fabricated with a magnetic saturation that is at most less than or equal to 120% of the maximum magnetic field of the magnetic recording head used for writing to the servo layer 344 to optimize writeability thereto in terms of bit error rate control of the data reading process.

Control of the fabrication process for the recording magnetic, layer 340 can be varied in terms of grain size and magnetic anisotropy constant value (Ku) to achieve a profile of coercivity magnetic field squareness for the buried servo layer 344, a squareness for the recording layer 340, and a surface roughness Ra (where granular formation of a layer roughens the surface and continuous formation of a layer smoothens the surface). Preferably, the nucleation field of the servo layer 344 is at least equal to or larger than eighty percent of the saturation field of the recording layer 340.

Grain size and Ku value can be increased or lessened through selection of materials for the recording layer 340 and the servo layer 344, as well as the surrounding layers (intermediate layers 342, 346 and the soft underlayer 348). Composition of the recording layer 340 and the servo layer 344 should preferably include at least one magnetic material such as CoCrPt, CoCrPt oxides, CoCrPtRu, CoPt, CoPt oxides, Co/Pt, CoPd, Co/Pd, Co/Pd oxides, FePt oxides, Fe/Pt, FePd oxides, or Fe/Pd. Composition of the intermediate layers (Intermediate Layer 1 342 and Intermediate Layer 2 346, FIG. 56) should preferably include at least one magnetically insulative material such as Ru, Ru oxides, NiW, NiWZr, NiWZrAl, NiWZrFe, CoCr, or CoCrRu. The soft underlayer (SUL) 348 should preferably include at least one of the following materials: CoFe, CoTaZr, CoTaZrFe, or FeTaC. It is also preferable that the multiple layers be deposited by sputter deposition or variants thereof (e.g., CVD) where the deposition may be controlled to control the grain size for optimizing each layer.

Heating Assisted Servo Writing for Dedicated Layer Servo Disk Drives

The buried servo layer 344 in accordance with the present embodiment is written to only once. A preferred approach is to increase the coercivity and nucleation field Hn of the servo layer 344. This may lead to a too high coercivity, so high that the servo writing head cannot write the servo layer 344 properly. As a result, assisting writing power in the form of thermal energy may be required. Thermal energy is introduced to assist the writing process of the servo signal onto the servo layer 344. The buried servo layer 344 in accordance with the present embodiment presents difficulties when writing thereto. For example, the requirements for a very high nucleation field and saturation field of the buried servo layer 344 makes it difficult for the magnetic head writing to the servo layer 344 to write properly over that servo layer 344. However, the preferred high coercivity field and high Ku for the servo layer 344 results from an anti-data writing interference requirement and not a thermal stability requirement. Accordingly, a large area heat assisted writing process can be used to reduce the coercivity field of the servo layer 344.

Figure 57:
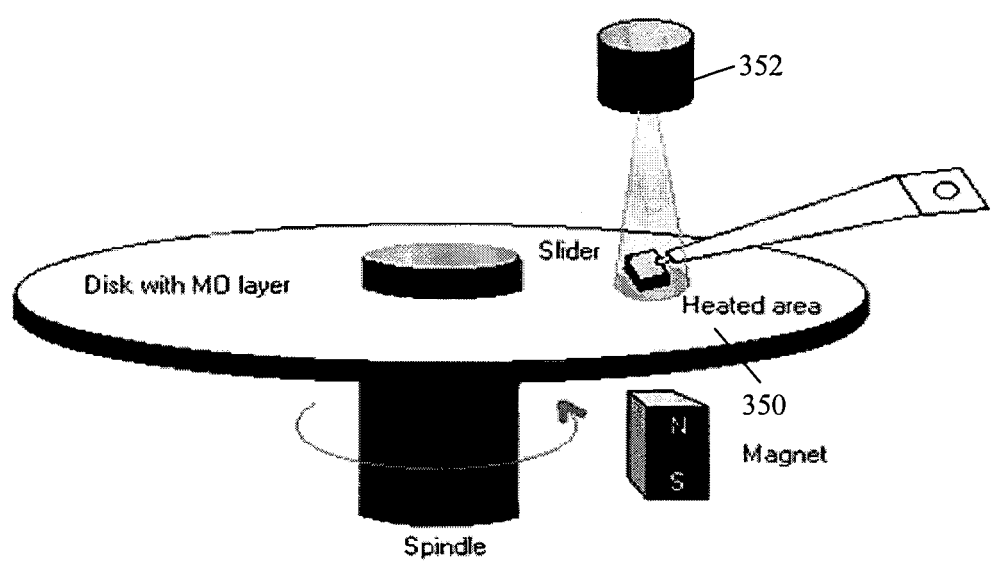
FIG. 57 shows an additional thermal source being provided to assist the writing process of a servo signal onto a servo layer in accordance with an embodiment of the invention.

An additional thermal source 352 such as infrared heating or injection of hot air during the writing of the servo layer 344 will assist in achieving an optimally recorded servo layer 344 with long data life and a high nucleation field and saturation field. For infrared heating, an adjustable infrared heating apparatus 352 could be utilized for heating up a large enough area in front of the magnetic head, having a diameter greater than preferably twenty millimeters, as seen in FIG. 57. Alternatively, an infrared lamp 352 could be used to heat up the total media surface 350 in an enclosed environment during servo layer recording (since servo layer recording needs to only occur once, the environment for that recording can be controlled). In addition to infrared heating of the media surface 350, the media surface 350 (or a portion thereof where the recording is being done) could be heated by injection of hot air or a hot gas to increase the coercivity field of the servo layer 344.

Figure 58:
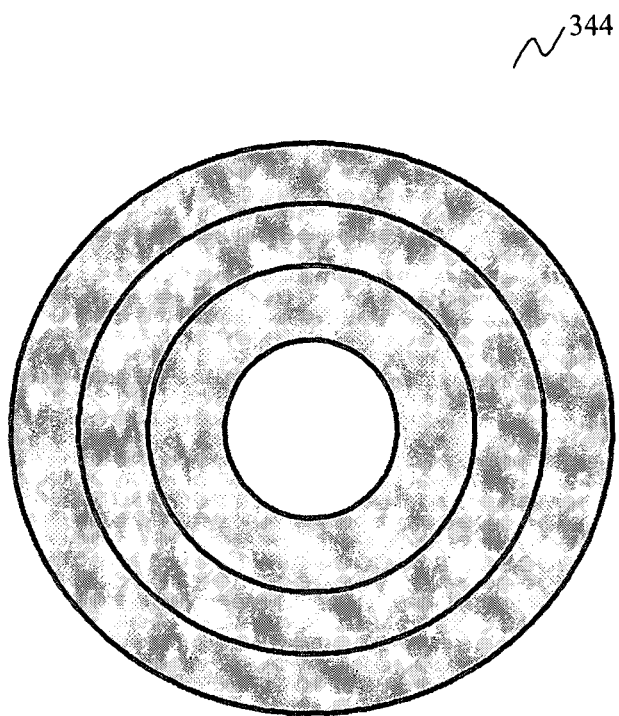
FIG. 58 shows a structure of a buried servo layer in accordance with an embodiment of the invention.

Frequency Based Servo Signal to Produce Position Error Signal (PES) for Buried Servo As seen in FIG. 56, the head senses not only the information magnetically stored in the recording layer 340, but also magnetic information in the buried servo layer 344. The magnetic information in the buried servo layer 344 is used to determine location of the head in relation to the media 350. The structure of the buried servo layer 344 is a continuous track structure such as shown in FIG. 58. This structure of the buried servo layer 344 allows improved location detection through continuous position error signal (PES) monitoring which is enabled by varying the frequency of the magnetic information on the tracks so that as the head passes over the buried servo layer 344, the amplitude of the frequency of magnetic change on adjacent tracks can be used to detect the orientation of the head over the media 350. Continuous position error signal monitoring allows a full spectrum of PES monitoring and advantageously full track frequency based PES using an analog filter while allowing the PES to be derived from very weak readback signals. A scheme for determining location of the head by manipulating the magnetic information stored on tracks of the servo layer 344 in accordance with the present embodiment stores such information in alternative spacings on the tracks of the servo layer 344 so that as the head passes over these tracks the frequency of magnetic shift (change in magnetic flux) varies in accordance with frequencies stored on the adjacent tracks.

Figure 59:
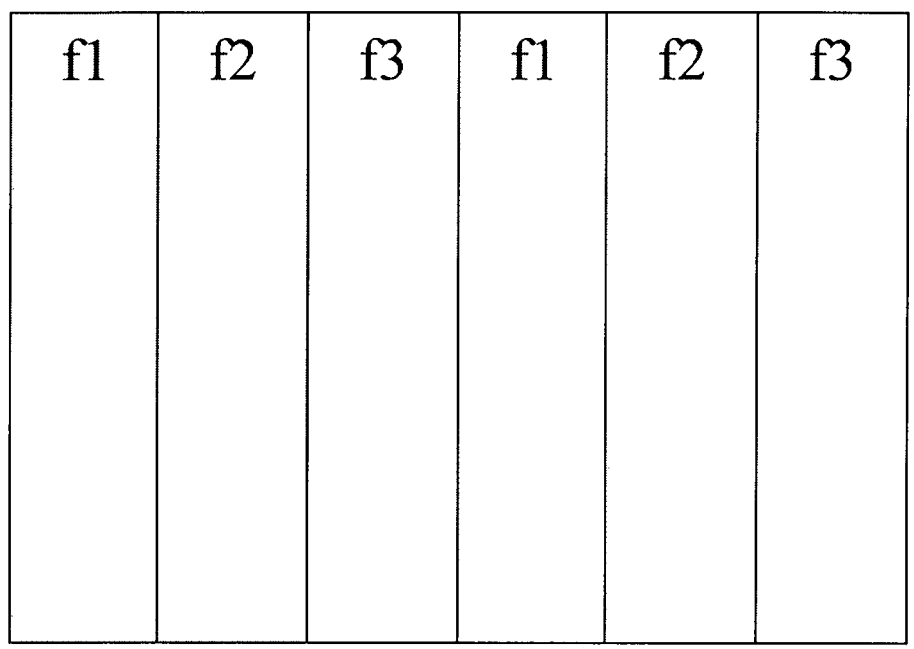
FIG. 59 shows three frequency signals alternatively assigned to servo layer tracks in accordance with an embodiment of the invention.
Figure 59A:
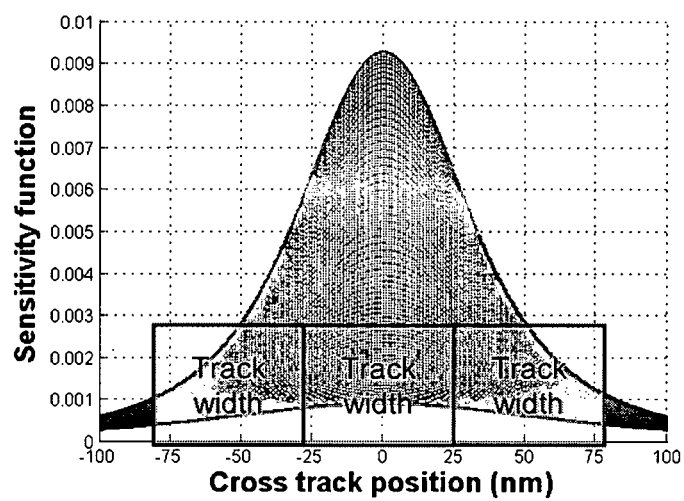
FIG. 59A shows a cross track signal sensitivity plot in accordance with an embodiment of the invention.

For continuous PES monitoring, at least two frequencies should be used for the continuous tracks shown in FIG. 58. In accordance with the present embodiment, the head to servo layer spacing is designed to be large to aid in reading and writing to the recording layer 340 while simultaneously reading the servo layer signal. Given such spacing, the head typically detects up to three tracks of signals from the servo layer 344. Therefore, in accordance with the present embodiment, three frequency signals (F1, F2, F3) are alternatively assigned to the servo layer tracks as shown in FIG. 59. As seen from the cross track signal sensitivity plot of FIG. 59A, when the head is centered over one track, signals from the adjacent tracks on either side can be received, but signals from tracks further removed cannot be detected. Thus, the PES can be determined by determining the variation of the relative amplitudes of the three frequency signals F1, F2 and F3 from the norm as depicted in FIG. 59A.

Another concern of assigning frequencies F1, F2 and F3 is to minimize interference between reading the servo layer signal(s) and reading the recording layer signals. To manage this concern, it is proposed to select bit lengths for storing information in the tracks of the buried servo layer 344 that generate low frequencies with minimal higher order harmonics. For example, with a bit length of approximately two hundred nanometers in the outer diameter tracks for a 2.5 inch disk-shaped data storage media 350, the servo layer signal is approximately forty megahertz. The bit length spacing produces enough spacing loss to make it feasible to effectively eliminate the higher order harmonics. However, if we keep the same servo layer signal frequency at the inner layer, the bit length spacing is reduced to around one hundred nanometers. Increasing the bit length at the inner diameter would produce a bit length too large at the outer diameter, thereby producing stronger higher order harmonics. Accordingly, in accordance with the present embodiment, the tracks are assigned to multiple zones (at least two) where the assigned frequencies (and consequently the bit length spacing on the tracks) is different from zone to zone. While the different zones will require different bandpass filters when separating the combined readout signal from the servo layer 344 and the recording layer 340, the increased complexity of the signal processing with the increased number of bandpass filters can be balanced with controlling the spacing loss to effectively eliminate higher order harmonic interference in the higher frequencies used for reading information from the recording layer. Preferably, the frequency of the largest servo bit interval is lower than eighty percent of the smallest bit interval of the data bits.

Data & Servo Signal Separation Via Servo Layer Magnetic Design & Electrical Filters (Signal Processing Subsystem with Constrained Code for a Buried Servo Drive)

Figure 60:
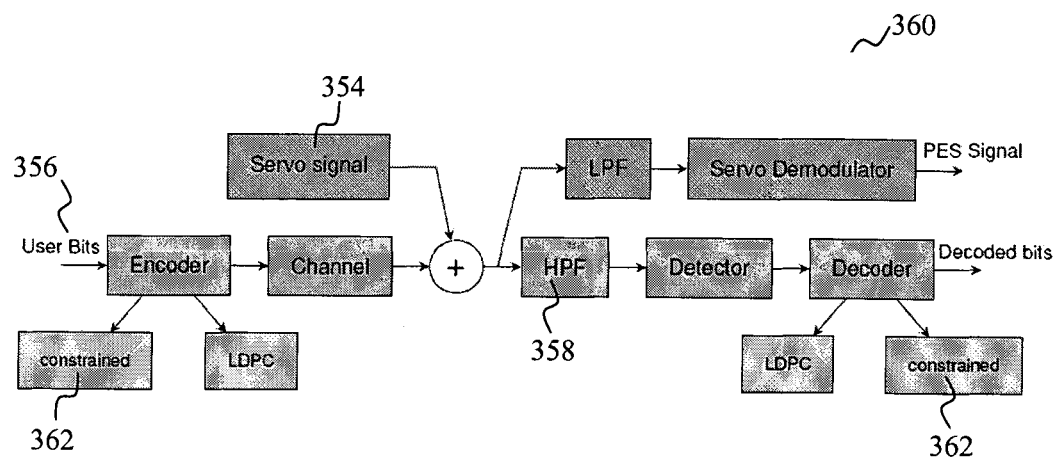
FIG. 60 shows a signal processing subsystem in accordance with an embodiment of the invention.
Figure 61:
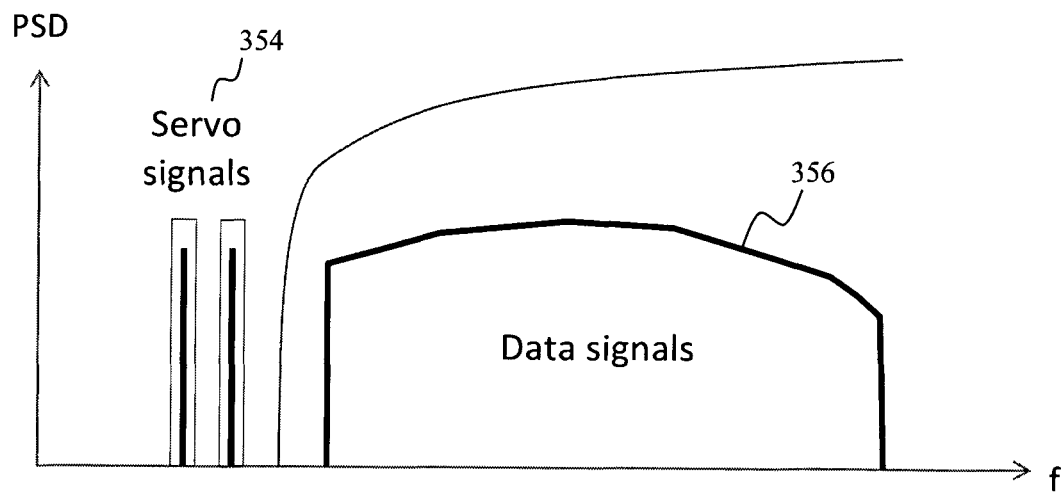
FIG. 61 shows a recovery of servo signal and data signal with one or more filters in accordance with an embodiment of the invention.

With reference to FIG. 60, the reader in the head detects both the servo layer signal and the recording layer signal when reading signals from the media 350. In accordance with the present embodiment, the servo signals 354, the data signal 356, and the high-pass filter (HPF) 358 are defined in a manner to assist the signal separation and reduce interference between the two signals 354, 356. With reference to FIG. 60, the signal processing subsystem 360 jointly optimizes the "Servo Signal" 354, "Constrained Code" 362 and "HPF" 358 boxes. The servo frequency and type of servo scheme used determine the spectrum of the servo signal 354, while the channel frequency and constrained code 362 shapes the frequency spectrum of the data signal 356. For the channel, the high-pass filter 358 is designed to maximize the energy content from the data signal 356 while simultaneously minimizing the energy content of the servo signal 354. Referring to FIG. 61, while the head receives a combined signal, the present embodiment is able to recover the servo signal 354 and the data signal 356 with one or more low-pass/high-pass/bandpass filters.

Such separation is required for signal detection, particularly as the servo signal 354 appears as noise to the channel and needs to be mitigated. For instance, interference between the recording layer data signal 356 and the servo signal 354 can be reduced by imposing the maximum run-length constraint, which is also known as the k constraint (i.e. the maximum number of '0's between two consecutive '1's) into the recording layer data signal 356. The k constrained codes can help to suppress the low frequency components of the data signal 356. This ensures that less information is lost after the high pass filter 358 as shown in FIG. 60, which is designed to pass the recording layer data signal 356 while rejecting the servo signal 354. At the same time, the constrained code 362 reduces the frequency contamination of the data signal 356 in the servo bandwidth. Detection of the data signal 356 and the servo signal 354 is aided by defining the frequencies of the two components such that there is little frequency overlap between the data signal 356 and the servo signal 354, permitting the data signal 356 and the servo signal 354 to be separated and detected. Referring back to FIG. 56, the buried servo layer 344 is located under the recording layer 340, thereby having a higher head media spacing when reading the servo signal 354. Accordingly, the servo signal 354 in accordance with the present embodiment is defined at a lower frequency by increased bit length spacing, therefore, reducing the spacing loss so that the servo signal 354 can be detected with enough signal strength.

The lower frequency signal may have strong higher order harmonics as described above. Such harmonics can contaminate the recording layer data signal 356. Accordingly, several techniques are used to reduce the contamination. It is proposed to optimize the head media distance in order to suppress the harmonics of the servo signal 354 significantly. A majority of the control of higher order harmonics of the servo signal 354 is achieved in this manner. Also, digital data signal processing techniques are used to further suppress minor harmonics signals.

In addition, the servo signal frequency can be defined to reduce the higher order harmonics. For example, a too low frequency servo signal is square shaped and produces higher order harmonics. In order to control the higher order harmonics, the servo signal 354 picked up by the reader is preferably sinusoidally shaped. A sinusoidal servo signal 354 is feasible if the transition length is longer and the head media spacing is higher. For longer transition lengths, the Ms of the recording media 350 can be increased and a low field gradient writer can be used for writing to the servo layer 344.

Method and Implementation of Read While Write for Servo Signal

The buried servo layer 344 allows implementation of continuous PES monitoring and location detection. However, in conventional hard disk drives and similar data storage devices, the head either reads or writes, but cannot perform both operations simultaneously. In accordance with the present embodiment, the head operation and signal processing is modified to allow simultaneous reading of the servo layer signal 354 while writing to the recording layer. This feature advantageously allows increased precision in tracking movement of the head 364, even during writing.

Figure 62:
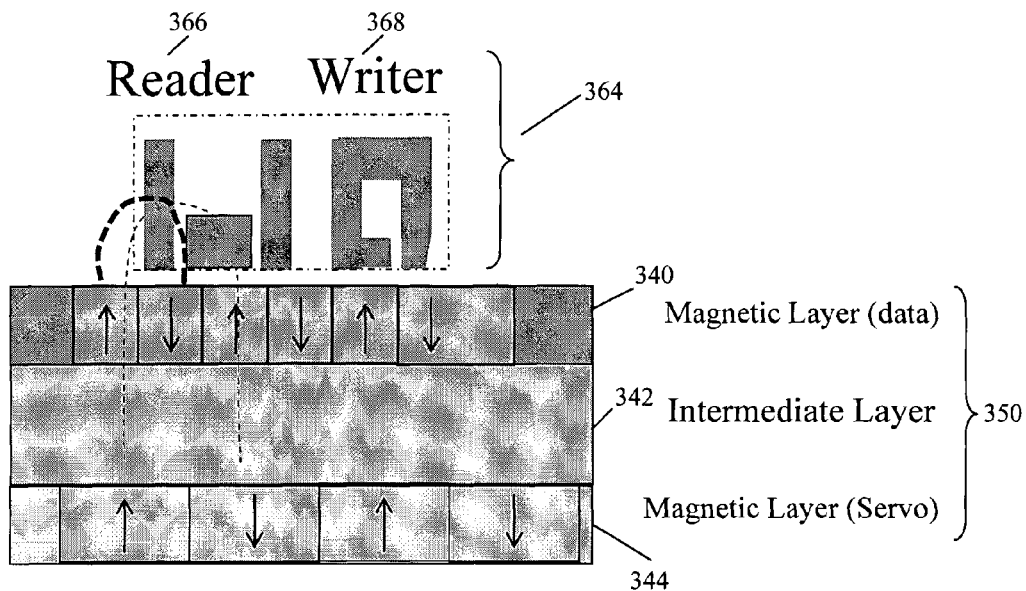
FIG. 62 shows a head positioned over a media in accordance with an embodiment of the invention.
Figure 62A:
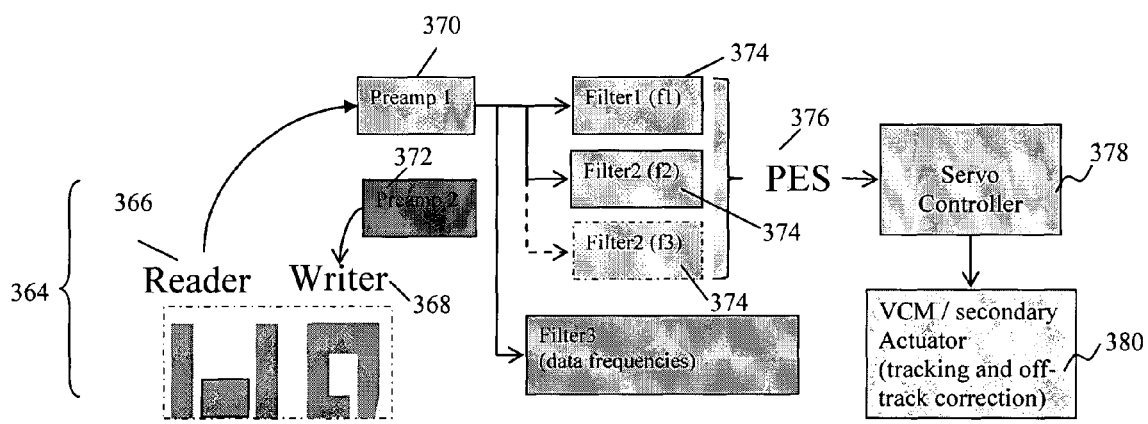
FIG. 62A shows two pre-amplifiers used in a read while write process in accordance with an embodiment of the invention.

Referring to FIG. 62, the head 364 includes a reader 366 and a writer 368 and is positioned over the media 350. As discussed above, the media 350 includes a recording layer 340 for magnetically storing data and a buried servo layer 344, the two magnetic layers 340, 344 separated by one or more intermediate layers 342. Referring also to FIG. 62A, the read while write process is enabled by providing two preamplifiers 370, 372 (instead of the conventional single amplifier) because current commercial preamplifiers are not able to concurrently support read and write operations. Preamp 1, 370 is coupled to the reader 366 and can read the combined servo layer signal 354 and recording layer signal 356 during read operations. Also, in accordance with the present embodiment, Preamp 1, 370 also receives signals read by the reader during write operations; a second preamplifier, Preamp 2, 372 amplifies the data signal 356 before providing it to the writer 368 for writing the data into the recording layer 340. So, during read and write operations, the signal from the reader 366 passes through Preamp 1, 370 and then through the three low frequency narrow bandpass filters 374 to generate the position error signal (PES) 376 which is used by a servo controller 378 to control the actuator 380 for tracking and off-track correcting of the slider arm (not shown). Instead of using analog narrow bandpass filters 374, digital signal processing techniques can also be used, such as Fast Fourier Transform implemented in Field Programmable Gate Arrays (FPGA).

Figure 63:
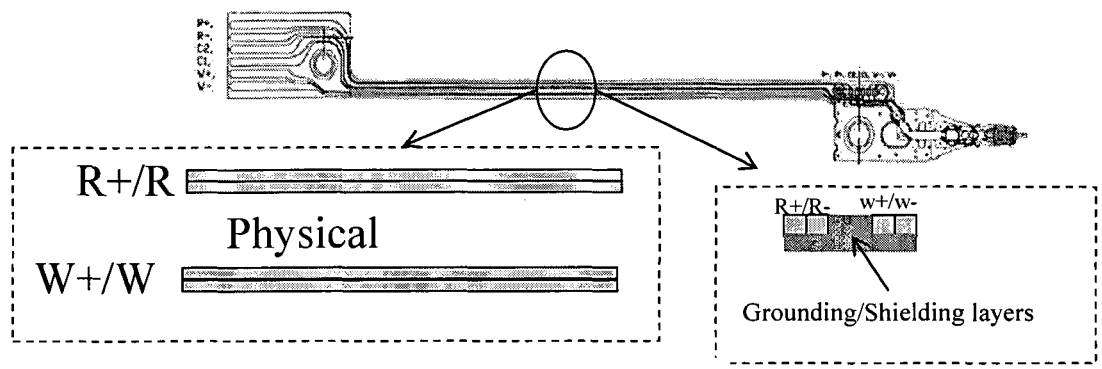
FIG. 63 shows a reduction of interference of a read signal and a write signal during read while write in accordance with an embodiment of the invention.

The separate signal processing electronics for the read operation and the write operation minimizes interferences between the two signals (servo layer signal 354 and recording layer signal 356). In addition, the above-discussed frequency separation of the servo layer signal 354 and data signal or recording layer signal 356 which allows separate recovery thereof through filtering of the read signal, allows recovery of the PES signal while ignoring the recording layer data signal 356 during write to the recording layer 340. As seen in FIG. 63, additional reduction of interference of the read signal and the write signal during read while write can be achieved by increasing the physical separation distance between the plus and minus read lines and the plus and minus write lines on the actuator arm as well as using grounding and/or shielding layers to reduce any coupling between the read and write lines.

Figure 64:
FIG. 64 shows a read while process in accordance with an embodiment of the invention.

Thus it can be seen that the continuous PES tracking to improved continual actuator positioning can be accommodated even when writing. Referring to FIG. 64, the read while write process includes the read sensor (i.e., the reader) obtaining the readback signal which includes a signal from the dedicated servo layer 344. The readback signal is then processed in real-time by analog and/or digital electronics to obtain information from the servo layer 344: both the PES information as well as determining the location of the head 364, including the reader 366 and the writer 368. This location of the head 364 is used for real-time control of the actuator arm 250 and the head 364 for precise and synchronized writing by the writer 368. In addition to application in the buried servo layer 344 implementation as described, the ability to perform read while write enables synchronization of the edge of a writing field to a physical bit (e.g., for application in a bit patterned medium (BPM)) and readback and write in a synchronized fashion for Two Dimensional Magnetic Recording (TDMR).

Some Electronic Designs for Buried Servo Layer in Thin Drive Data Storage Device (Late Disclosure) (Servo Pattern Layouts)

As can be seen in FIG. 56 and the description hereinabove, the present embodiment presents a design for disk media 350 which locates the servo pattern on a buried servo layer 344. In accordance with another aspect of the present embodiment, the servo pattern can be located on the buried servo layer 344 or on the data layer 340 in a manner to provide more surface for user data thereby improving the space efficiency on the disk media 350. In addition, the object is to provide address information such as track address and sector number and provide servo bursts for demodulation of the PES (position error signal) with low sensing noise in a manner that is easily written to the buried servo layer 344 with servo track writing.

Design A

Figure 65:
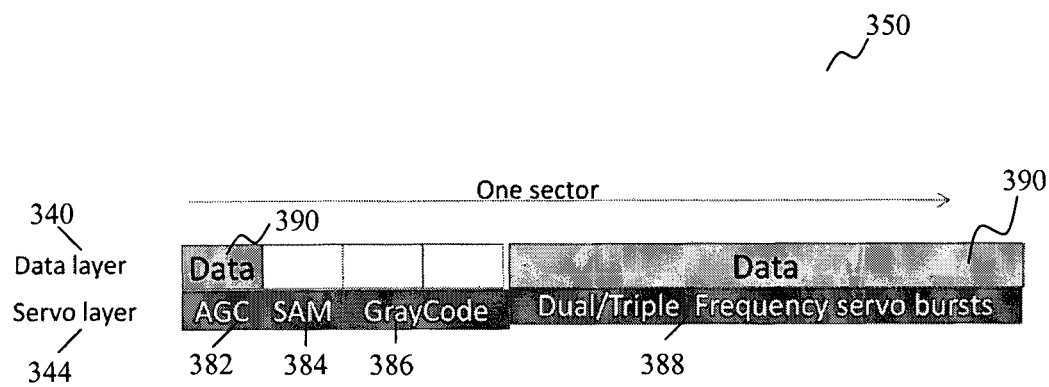
FIG. 65 shows a disk media including a buried servo layer with all of the servo patterns being written on the buried servo layer in accordance with an embodiment of the invention.

Referring to FIG. 65, all of the servo patterns are written on the buried servo layer 344. The automatic gain control (AGC)

382 is a number of bursts at a fixed frequency. The sector address mark (SAM) 384 and the GrayCode (track address) 386 is coded in accordance with conventional methods. Servo bursts 388 are dual or triple frequency bursts as described above. To make sure that the SAM 384 and the GrayCode 386 can be decoded correctly, no data is written on the corresponding portions of the top data layer 340 above these codes (i.e. the SAM 384 and the GrayCode 386). In servo patterns, the SAM 384 and the GrayCode 386 occupy a very small portion. Therefore, this method will significantly increase the space efficiency as compared with conventional one-layer magnetic recording schemes.

For the servo pattern design of FIG. 65, media servo write equipment is needed to pre-write the servo patterns on the buried servo layer 344.

Design B

Figure 65A:
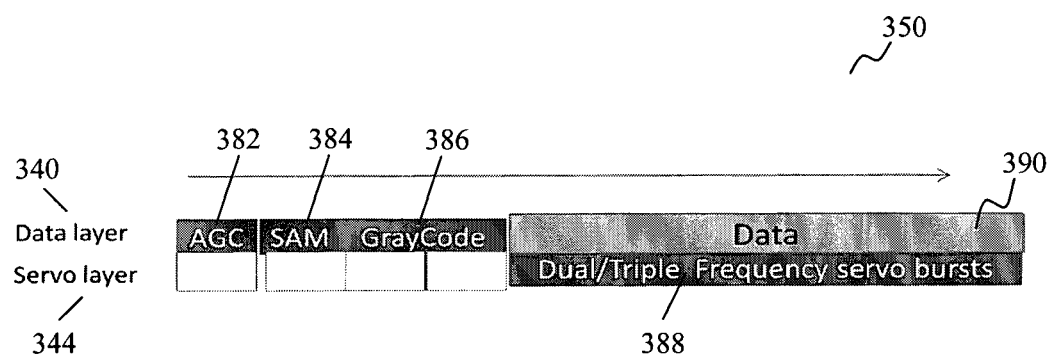
FIG. 65A shows a disk media in which an automatic gain control (AGC), sector address mark (SAM), GrayCode are written on a data layer and servo bursts are placed on a buried servo layer in accordance with an embodiment of the invention.

Referring to FIG. 65A, in an alternate embodiment, the AGC 382, the SAM 384 and the GrayCode 386 are all written on the data layer 340 while the servo bursts 388 are placed on the buried servo layer 344. To make sure that the SAM 384 and the GrayCode 386 can be decoded correctly, no servo bursts are written on the corresponding portions of the buried servo layer 344 below these codes. Usually, the AGC 382 is the largest portion of a conventional servo pattern. Thus, the space efficiency of the structure 350 depicted in FIG. 65A is lower than the structure depicted in FIG. 65. As the servo layer 344 continuously provides the PES signal, the number of these sections (i.e., the AGC 382, the SAM 384 and the GrayCode 386) can be reduced to the number of data sectors 390. Accordingly, if a 4 kbit sector or even a larger size sector is used, the space efficiency is still higher than conventional methods.

For the servo pattern structure of FIG. 65A, only the servo bursts 388 need to be pre-written to the buried servo layer 344. The AGC 382, the SAM 384 and the GrayCode 386 can be filled in with Self Servo Writing Capability in the channel as shown without any error propagations. And with the application of other technologies, such as in-situ fly height detection, the AGC portion 382 may not even be necessary, thereby further improving the space efficiency.

Preamplifier Design with Consideration of Read and Write Simultaneously

Figure 66:
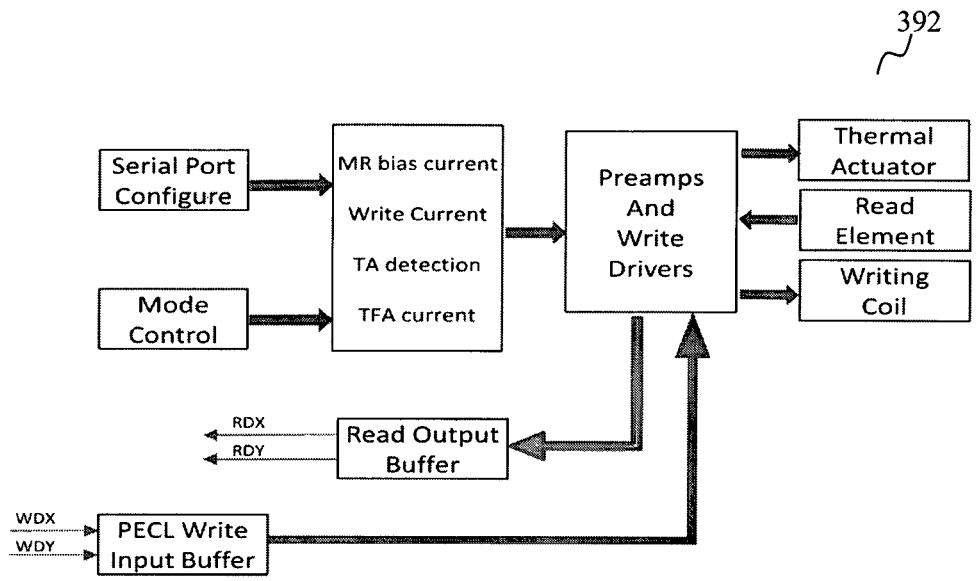
FIG. 66 shows a general functional block diagram for a conventional preamplifier having around five different operational modes in accordance with an embodiment of the invention.

FIG. 66 shows a general functional block diagram for a conventional preamplifier 392 having around five different operational modes: Read with MR bias on/off, enable TFA; Write with MR bias on/off, enable TFA; Read Inactive with MR bias off, enable TFA; Sleep with MR bias off and TFA off; and Low power read/write. When in a non-read mode, the read output is high Impedance or clamped.

Figure 67:
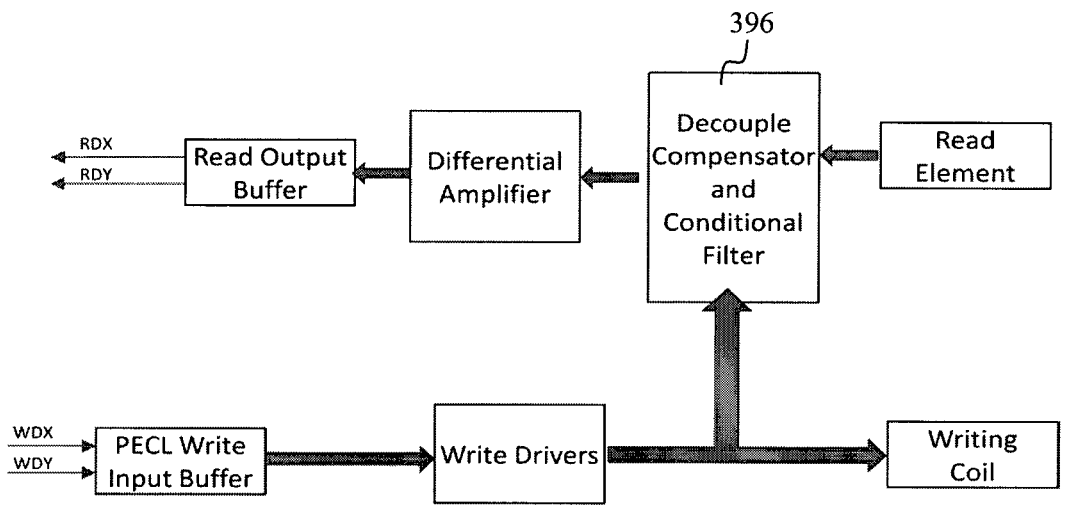
FIG. 67 shows a modified design of a functional block diagram for a preamplifier in accordance with an embodiment of the invention.

A modified design of a pre-amplifier 394 is depicted in FIG. 67. The modified design implements an additional mode, a read&write mode, to support read and write simultaneously. When in the read&write mode, the differential readout RDX and RDY is always available to reflect the real signal picked up by the read element no matter whether the driver for write is enabled or not. Usually, when writing, a high frequency signal will toggle the current passing through the write element. This signal could be coupled into the read loop, contaminating the read loop or even saturating the differential amplifier 394.

The modified design illustrated in FIG. 67, includes a decouple compensator and a conditional filter 396. The decouple compensator and the conditional filter 396 are implemented before the signal is inputted into the differential amplifier 394. In this manner, the coupled signal from the writing current is reduced. The modified design of the pre-amplifier 394 refers to the overall block design where the read and write can occur at the same time (thereby enabling continuous reading of the servo signal 354 and at the same time writing of data.

Hybrid Drive

Hybrid Drive Technology-NVM Management

In accordance with another aspect of the present embodiment, the data storage device 100 is a hybrid data storage device which includes a non-volatile memory (NVM) 398 acting as a cache memory and fast access storage which enables low power operation of the data storage device 100 and increases its performance. Conventional data storage devices such as hard disk drives use volatile memory, such as DRAM or SRAM, for the cache memory. However, these memory devices have limited capacity, high cost and suffer from data loss and data integrity in the event of power failure. With the recent reduction in both price and power consumption of large size non-volatile memory, such as flash memory, NVM cache memory 398 can be used in the data storage device 100 to enable large reductions in power consumption, fast data access and high reliability.

Figure 68:
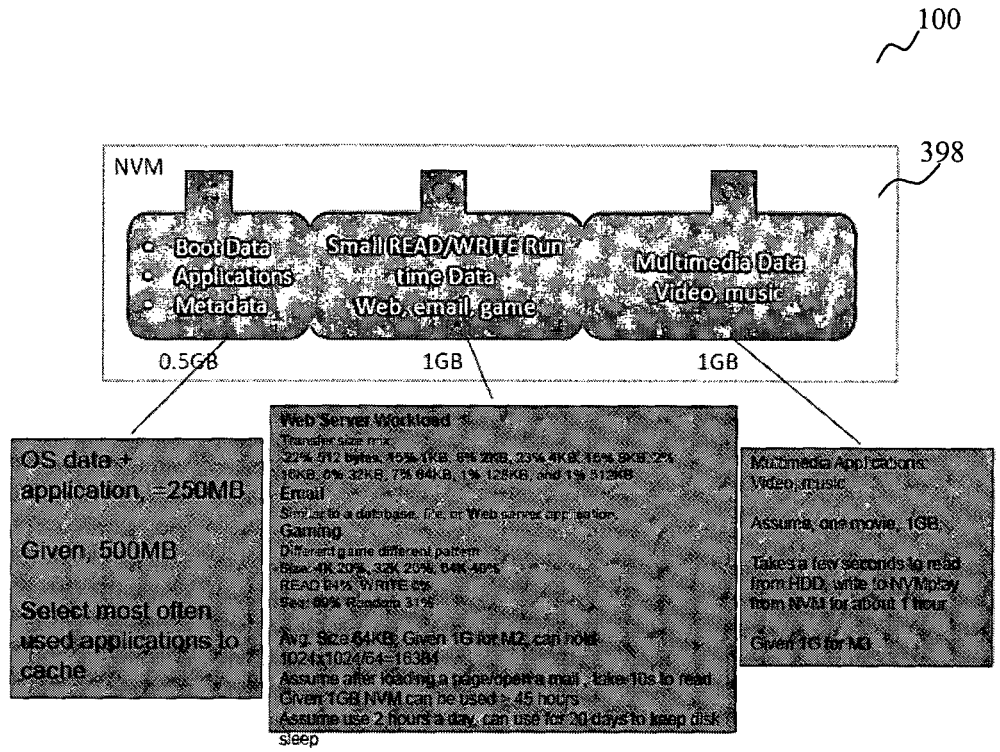
FIG. 68 shows three types of data being stored in a non-volatile memory (NVM) cache in accordance with an embodiment of the invention.

In accordance with the present embodiment, data management utilizes the NVM cache 398 for temporary and medium term data storage, while transferring the data to the disk storage for long term storage. Such data management would take into account the likely uses of the data storage device 100, including the type of data that would need to be stored (e.g., will it be stored for long times or short times, and will the data need to be backed-up or transferred to the disk storage immediately or can such transfer be scheduled for a later time). Referring to FIG. 68, three types of data can be stored in the NVM cache 398 in accordance with the present embodiment to achieve considerable reduction in power consumption by the data storage device. The first type of data (C1) includes the operating system and its associated data (referred to as Boot Data) and various applications to speed up the system boot up and application loading. In addition, space can be set aside for other applications and metadata which is frequently used.

The second type of data (C2) is mainly used for application runtime data and data created or accessed by applications or users. Examples of frequently used applications are web-surfing, email access, gaming applications.

The final type of data (C3) is multimedia data such as music or video data. With the use of, for example, a 2.5 gigabit NVM 398, careful tasking of the NVM cache 398 can result in significant power savings. In fact, this small-size NVM cache 398 is enough for typical users to keep the disk drive in a minimal power consumption sleep mode for a large percentage of each day, if not all day. Thus, power consumption of a hybrid data storage device 100 in accordance with the present embodiment can be about half of a conventional hard disk drive and about equal to power consumption of a solid state device while offering much larger storage capacity than the solid state device.

Hybrid Drive Technology-shingled Writing Disk

Figure 69:
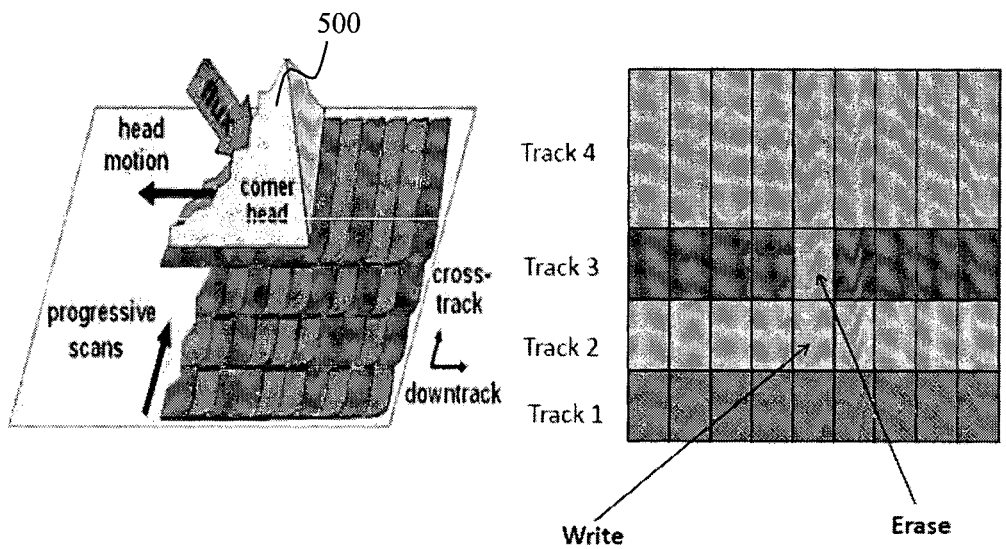
FIG. 69 shows conventional restricted read write systems implementing shingled writing in accordance with an embodiment of the invention.

In accordance with a further aspect of the present embodiment, a data management layer uses the NVM storage media 398 of the hybrid data storage device 100 to enable unrestricted data access to shingled writing disks. Unrestricted data access refers to the normal READs/WRITEs/UPDATEs without overwriting previously written data. In conventional data storage devices such as hard disk drives and tape drives, input/output access to the memory only allows restricted reading and writing for facilitation of reading the data. Restricted reading and writing writes the data to the disk memory once and allows it to be read out many times. Referring to FIG. 69, the problem with conventional restricted read write systems implementing shingled writing is depicted. The recording head moves in the downtrack direction as the data is written in blocks or shingles, and successive scans move across the disk in a cross-track direction. A corner of the head 500 is shown over Track 4 in the left hand portion of FIG. 69. The magnetic flux of the head 500 is used when writing a shingle or shingles of data to the tracks of the disk. As shingles are written, particularly a single shingle as shown in the right hand portion of FIG. 69, the flux may bleed over to an adjoining track and may erase a shingle on an adjacent track. Thus, implementation of shingled writing in conventional data storage devices because restricted read and write does not permit any updates or modifications to the shingles of data in order to correct such cross-track erasures and creates such errors when writing a single shingle or a small number of shingles. Accordingly, less efficient storage schemes are used in conventional data storage devices.

Figure 70:
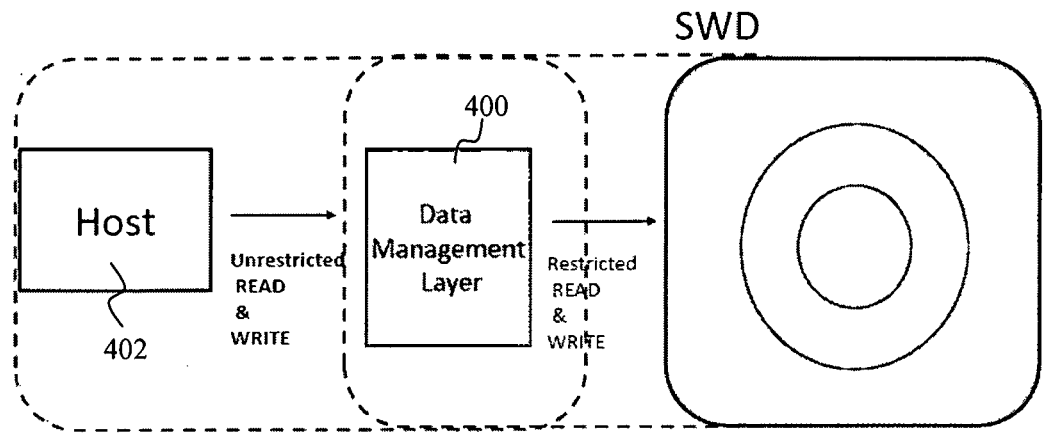
FIG. 70 shows a data management layer which allows unrestricted reading and writing to a hybrid data storage device in accordance with an embodiment of the invention.

In accordance with the present embodiment, a data management layer 400 as shown in FIG. 70 allows unrestricted reading and writing to the hybrid data storage device, with the data management layer 400 managing restricted reading and writing of the disk memory for shingled writing, thereby optimizing the data storage performance at a limited cost. The data management layer 400 may be located in the host device 402, the data storage device 100, or utilize portions of both devices 402, 100.

Figure 71:
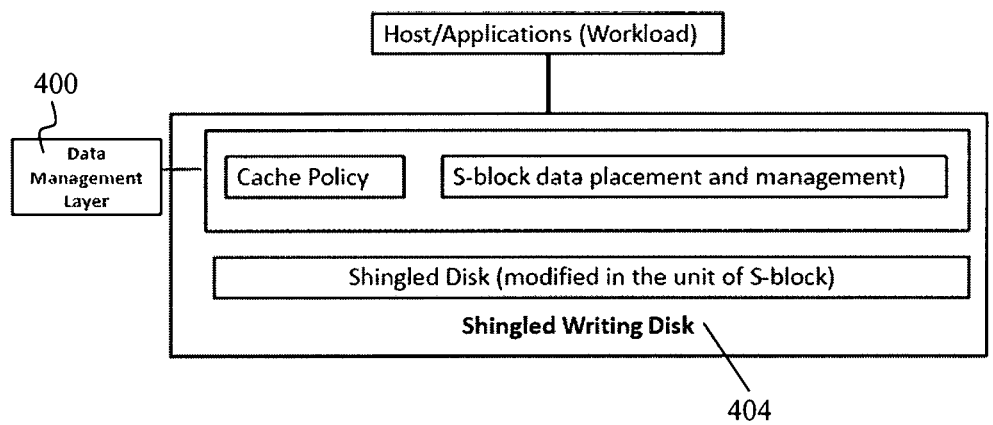
FIG. 71 shows a data management layer which utilizes a non-volatile memory of a hybrid data storage device for an improved storage into a shingled writing disk in accordance with an embodiment of the invention.

Referring to FIG. 71, the data management layer 400 utilizes the non-volatile memory 398 of the hybrid data storage device 100 for improved storage into a shingled writing disk 404 by using the NVM 398 both as cache memory for data buffering and as a fast storage media to store highly accessed metadata used by the shingled data management layer.

Figure 72:
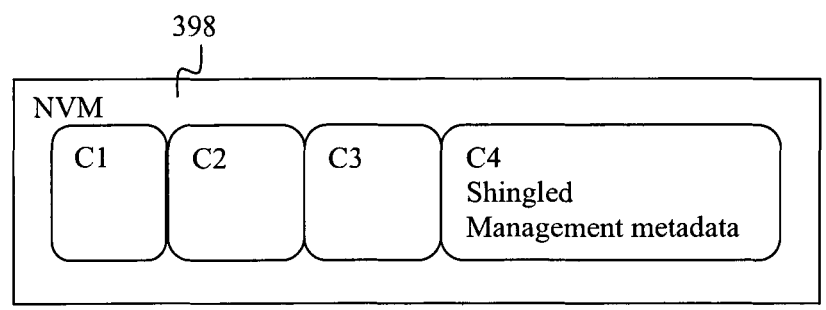
FIG. 72 shows a non-volatile memory in a shingled writing hybrid disk with additional portions for storing metadata for shingled data management in accordance with an embodiment of the invention.

Referring to FIG. 72, the NVM 398 in a shingled writing hybrid disk may have additional portions (referred to as C4 in the FIG. 72) for storing metadata for shingled data management. The metadata for singled data management contains information that translates the logical addressing of data from the host to the physical address of the shingled disks, which is represented hierarchically as Databand/Ring band and, finally, the physical sector locations. For each data access to the shingled disks 404, the metadata for shingled data management needs to be referred to or updated. Therefore, with the metadata stored in the fast access NVM 398, the time to access data in the device can be shortened and the disk performance can be improved. The NVM management module 404 in FIG. 71 is responsible for managing both the metadata and the data buffering.

Figure 73:
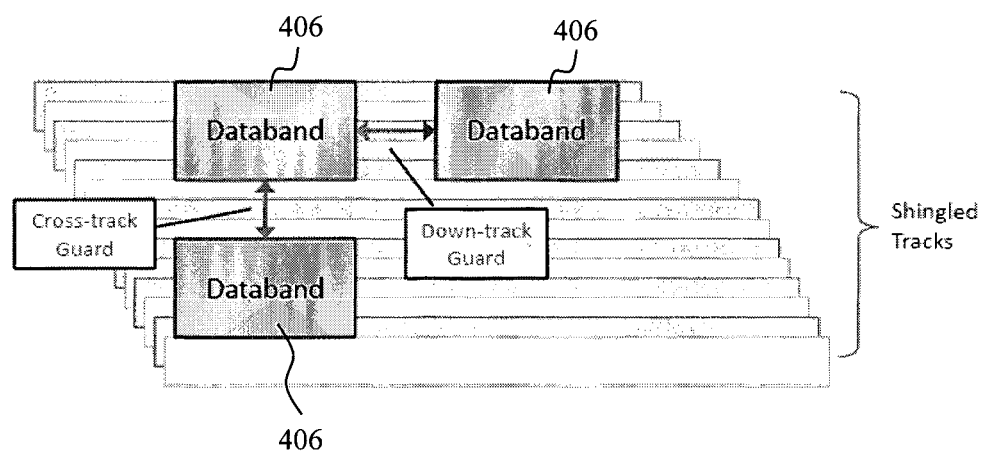
FIG. 73 shows singled writing disks being logically organized as multiple data bands in accordance with an embodiment of the invention.
Figure 74:
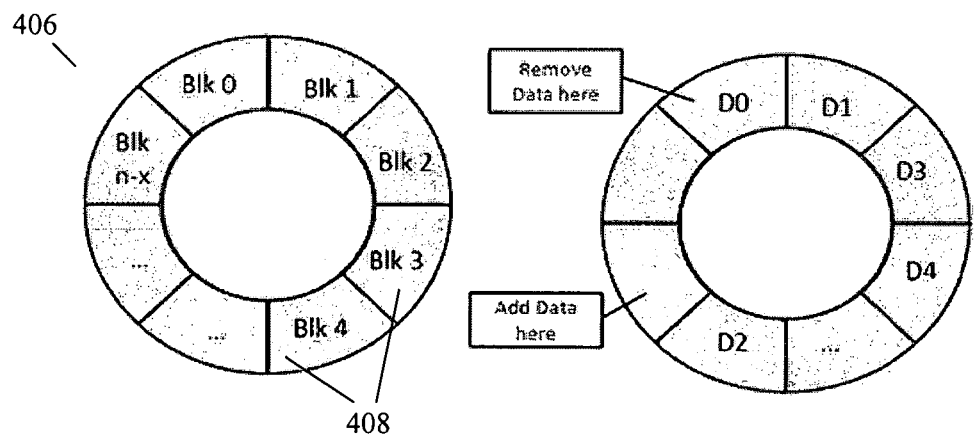
FIG. 74 shows each ring band managing ring blocks as a circular ring in accordance with an embodiment of the invention.

Referring to FIG. 73, the shingled writing disks 404 are logically organized as multiple data bands 406 and each band 406 consists of multiple blocks 408. We refer to this data band 406 as a Ring band and blocks 408 in the Ring bands 406 as Ring blocks. Each Ring band 406 manages its Ring blocks 408 as a circular ring (refer to FIG. 74). When small size data writes are received from the host device 402, the data management layer 400 stores them in the cache memory 398. When large blocks of data are received for storage to the shingled writing disk 404, the NVM 398 is bypassed and the blocks of data are stored directly in the shingled disks 404. Periodically, the data in the cache memory 398 is flushed to the shingled disks 404.

Shingled disk 404 is logically laid out into databands 406 (e.g., the Ring bands) such that writing or updating to the media will not affect the whole disk media 350, but instead will be confined within the context of a single databand/Ring band 406. Referring to FIG. 73, it can be seen that the Ring bands 406 extend in a downtrack direction on multiple adjoining shingled tracks. Each Ring band 406 is separated from adjoining Ring bands 406 in both the cross-track direction and the downtrack direction by guards (e.g., cross-track guards and down-track guards). Large Ring bands 406 reduce the space occupied by the guards, thereby increasing the storage capacity of the shingled disk 404. Each Ring band 406 is further divided into multiple uniformly sized Ring blocks 408. The data update can be done in the units of Ring blocks 408 instead of the whole Ring band 406. This manner of updating is more efficient and can improve system performance.

Use of the Ring block 408 allows writing of the data to the shingled disks 404 in blocks. Multiple blocks 408 make up one Ring band 406. Likewise, multiple shingled sectors make up one block 408. In addition, a Ring block 408 may consist of sectors which are on one or multiple tracks. The data management layer 400 allows a single block 408 to be written or updated. In this manner, a single Ring block 408 can be updated or modified, instead of modifying the whole Ring band 406.

Figure 75:
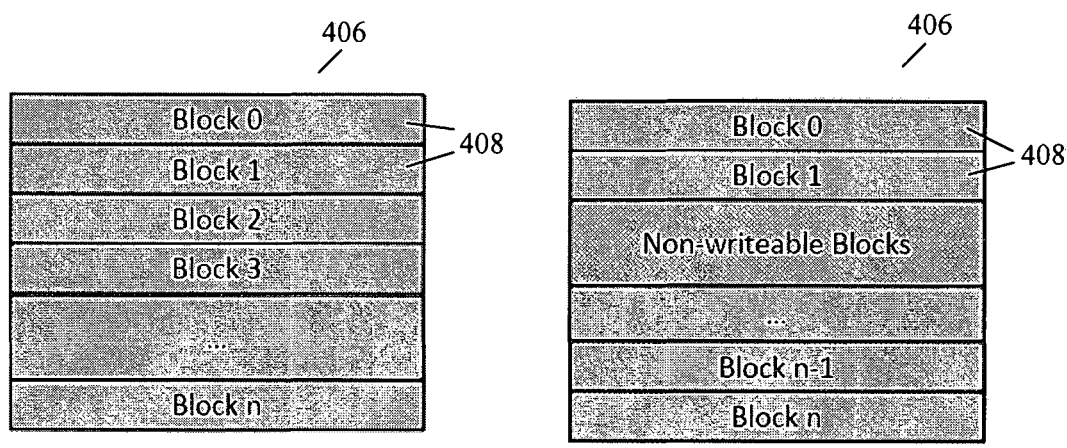
FIG. 75 shows a databand on a disk including Block 0 to Block n in accordance with an embodiment of the invention.

Referring to FIG. 75, the Databand/Ring band 406 on the disk includes Block 0 to Block n. Each Ring block 408 consists of multiple shingled sectors in a single track which occupies the whole downtrack in the Ring band 406. In other words, each shingled track can be composed of multiple Ring blocks 408 with each Ring block 408 mapped onto separate Ring bands 406. The number of writeable blocks 408 per databand/Ring band 406 is the number of cross-tracks within the Ring band 406 minus the non-writable blocks 408 within the Ring band 406. The non-writeable blocks 408 are used for the cross-track guard and these non-writeable blocks 408 are located within the Ring band 406 at different locations and on a rotating basis thereby allowing all writeable blocks 408 in the Ring band 406 to be updated/modified without erasing previously written data nearby.

The Ring band 406 have a number of Ring blocks 408 defined therein and blocks of data are temporarily formed as a circular ring. Managing the data as blocks in a circular ring makes it easy to remove (flush) the blocks and to add the blocks 408/data to the buffer. Referring to FIG. 75, the circular ring arrangement of the data blocks 408 is depicted. The Ring blocks 408 are arranged in a circular ring such as shown in the left hand portion of FIG. 75. As the Ring block numbers 408 in the Ring band 406 may not correspond to the physical block numbers for storage to the shingled disk, data may be easily added to the Ring band 406 at one end and removed from the Ring band 406 at the other end as shown in the right hand portion of FIG. 75.

Figure 76:
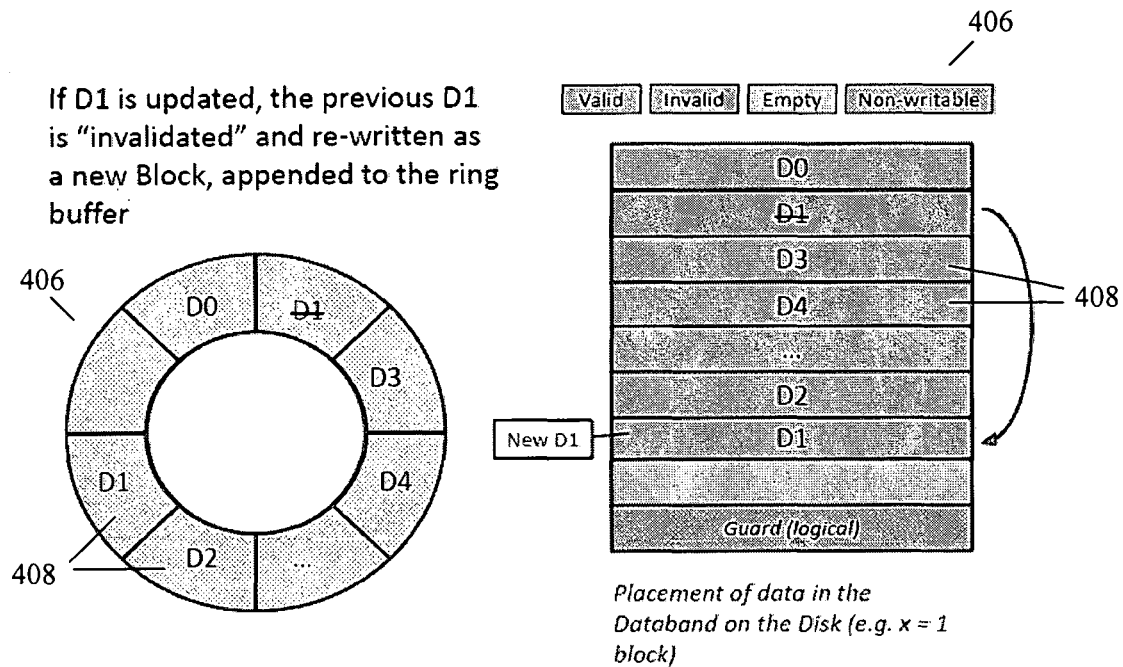
FIG. 76 shows a circular ring structure which simplified updating and/or modification of blocks by a data management layer in accordance with an embodiment of the invention.

The circular ring structure of the Ring band 406 simplifies updating and/or modification of blocks by the data management layer 400 as shown in FIG. 76. When a block 408 is updated (e.g., Block D1), the previous corresponding block 408 is "invalidated" and re-written as a new block 408 is appended to the Ring band 406. A corresponding modification in the data band structure 406 is shown in the right hand portion of FIG. 76.

Figure 77:
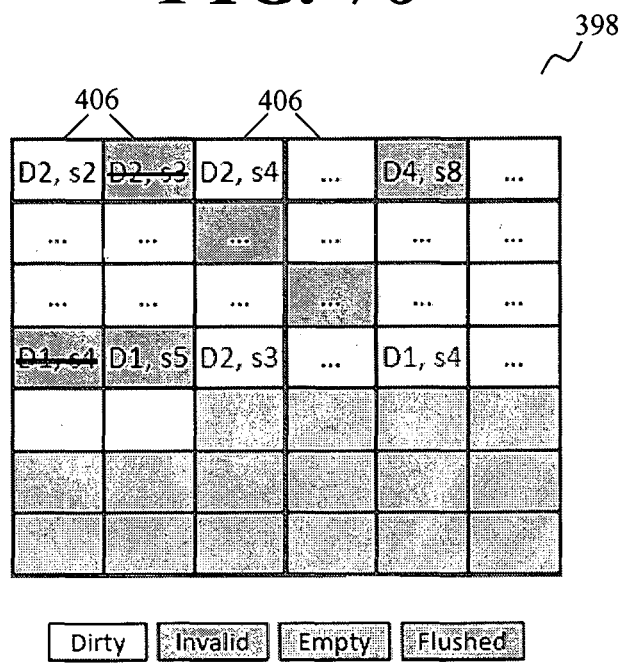
FIG. 77 shows an improved structure for a cache memory in accordance with an embodiment of the invention.

Within the cache memory, different data management principles are used to improve efficiency and latency. Referring to FIG. 77, an improved structure for the cache memory 398 in accordance with the present embodiment is depicted. Data is kept in the cache memory 398 in sectors. When flushing cache data to the Ring band 406, "dirty" sectors belonging to the same Ring block 408 are flushed together. "Dirty" sectors refer to those sectors not flushed to the Ring band 406. All Sectors are "dirty" when they are first written to the cache memory.

Flushed sectors may remain in the cache memory, however when they are flushed, the "dirty" bit is cleared to indicate that they have been flushed. This allows the flushed data to be read from cache, even after it has been flushed. However, data management can free up sectors by removing (reclaiming) invalid/modified sectors or flushed sectors that have not recently been accessed.

In order to optimize the performance of the hybrid data storage device 100, the data management layer 400 may balance and/or adjust various configurable parameters of the cache memory 398. The configurable parameters of the cache memory 398 include cache memory size, the size of data that would cause the data to skip cache memory and be stored directly to Ring bands 406/shingled disks 404, the percentage full trigger that would cause the data in the cache memory 398 to be flushed to Ring bands 406/shingled disks 404, and the threshold of data to retain in the cache memory 398 after a flush. The configurable parameters of the Ring bands 406 include the number of empty Ring blocks 408 left in the Ring band 406 when deciding to reclaim blocks 408, and how many blocks 408 to reclaim at one time.

Data Reconstruction (Enterprise Level)

Figure 78:
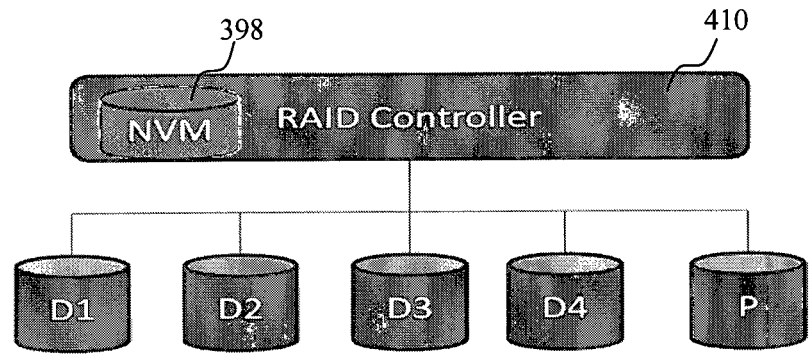
FIGS. 78, 79, 80 show various architectures for hybrid storage aggregation in accordance with an embodiment of the invention.
Figure 79:
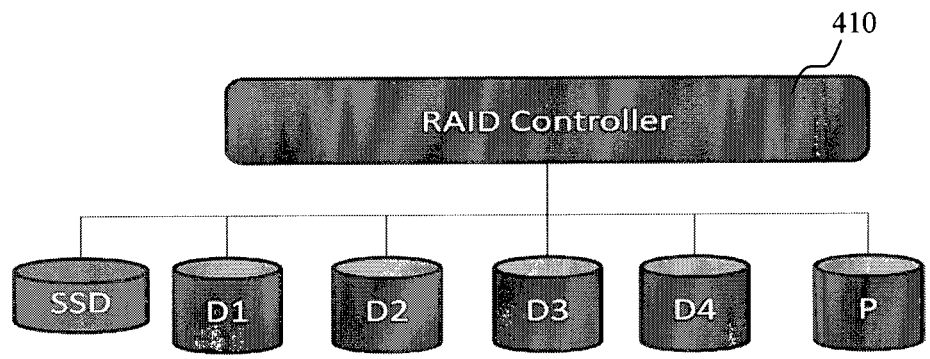
Figure 80:
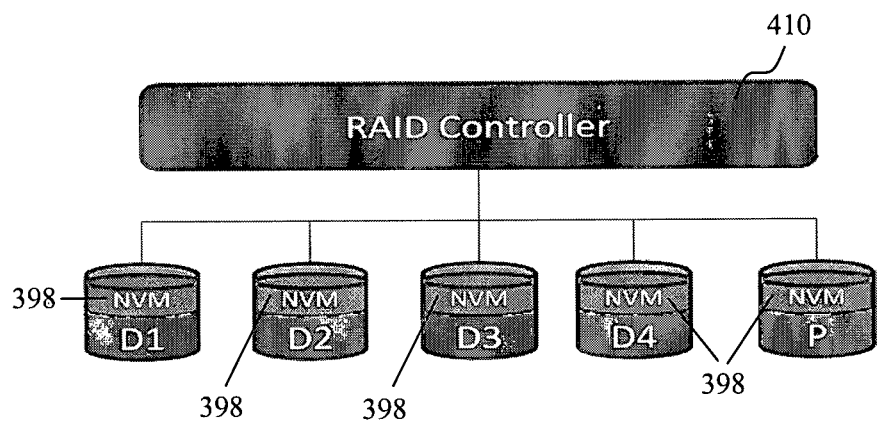

The preferred embodiment incorporates data reconstruction architectures and algorithms and memory management techniques for hybrid storage aggregation. The hybrid storage aggregation consists of fast but relatively smaller amounts of non-volatile memory storage media 398 and slower but larger amounts of rotational disk storage media such as conventional hard disk drives (HDD). The fast non-volatile memory storage media 398 could be in the form of solid state drives connected to an array controller system or in the form of memory chips embedded into an array controller 410 or a rotational storage disk. If the fast NVM 398 is embedded into a rotational storage disk, the whole storage device is called a hybrid disk drive. The HDDs or hybrid disk drives are connected to the array controller to form a redundancy group to provide high throughput I/Os. The redundancy increases system reliability and prevents data loss in the event of failures. FIGS. 78, 79 and 80 illustrate the various architectures for hybrid storage aggregation in accordance with the present embodiment. D1, D2, D3, D4 are disk drives (for storing data) and P is a disk drive for storing parity.

Figure 81:
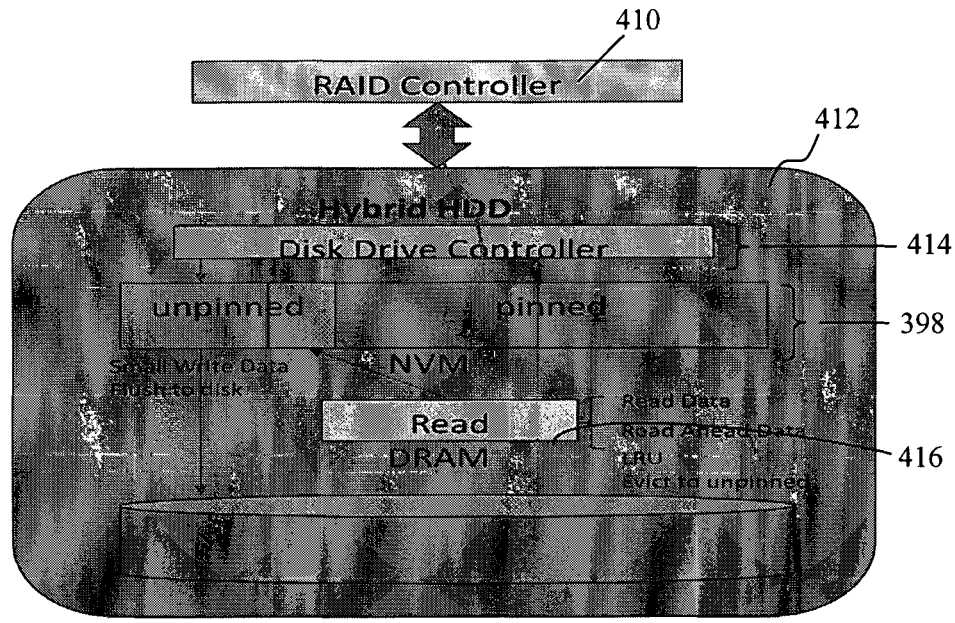
FIG. 81 shows a deployment of hybrid data storage devices as storage arrays for enterprise applications in accordance with an embodiment of the invention.

FIG. 81 represents the deployment of hybrid data storage devices 412 as storage arrays for enterprise applications. The NVM 398 in the hybrid drive can be managed by the array controller (or RAID controller) 410 as cache space for serving incoming requests to improve performance and reduce energy consumption of the storage system during a normal operational mode.

The array controller 410 is external to the hybrid data storage device 412 and coupled to the hybrid data storage device 412 for communication therewith, and also coupled to other storage devices for control of an array of storage devices. The disk drive controller 414 includes not only a data management portion (not shown, inside the disk drive controller 414) but also hardware and software for operation of the disk memory. Data, such as small write data, is input to the unpinned portion of the NVM 398 from the disk drive controller 414. This small write data is flushed to the disk from the unpinned portion of the NVM 398 under control of the data management layer 400 in the disk drive controller 414. For reading data from the disk, the data management layer 400 reads the data from the disk and writes it to a volatile memory 416 such as DRAM. This data inputted to the volatile memory 416 includes read data and read ahead data from the disk. Such read data is inputted to the unpinned portion of the NVM 398 when evicted from DRAM 416. Utilizing the unpinned portion of the NVM 398 for small writes and read data reduces power consumption and improves the read/write performance of the system.

Figure 82:
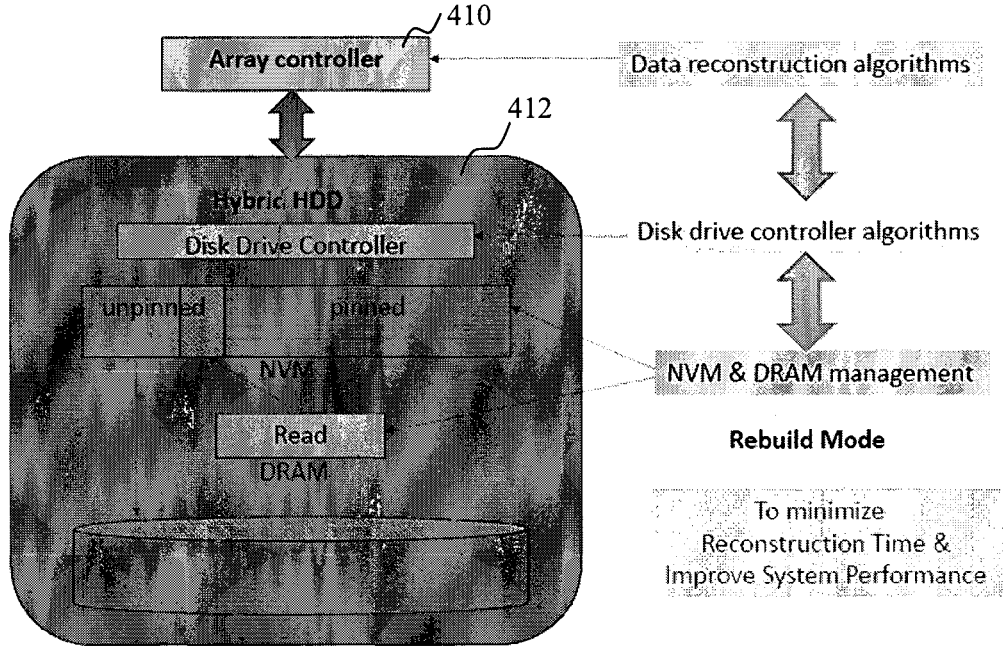
FIG. 82 shows an improved hybrid data storage device operating in an array in accordance with an embodiment of the invention.

In accordance with the present embodiment, an improved hybrid data storage device 412 operating in an array is depicted in FIG. 82. In the event of disk failure, the data storage device 412 cooperates with the array controller 410 to minimize reconstruction time and improve system performance through improved and robust data construction algorithms and NVM 398 and DRAM 416 cache management algorithm and disk drive controller algorithms which perform NVM 398 and DRAM 416 management to control data reconstruction during a data rebuild mode.

In accordance with yet another aspect of the present embodiment, the cache memory inside the hybrid data storage device 412 is used to minimize seeks and bandwidth wastage during data reconstruction by using the NVM 398 and disk memory as cache for storing a combination of application workload data and reconstruction data sets as determined by the reconstruction and cache management algorithms in the array controller 410 (see FIG. 81). The data reconstruction architecture proposed for the above-mentioned storage aggregate/array includes both reconstruction algorithms and memory management algorithms. In the event of any failures among the hybrid drives within the storage array, these algorithms are designed and integrated to minimize disk seeks and bandwidth wastage, shorten the time required for data reconstruction and to increase storage system reliability and performance.

Figure 83:
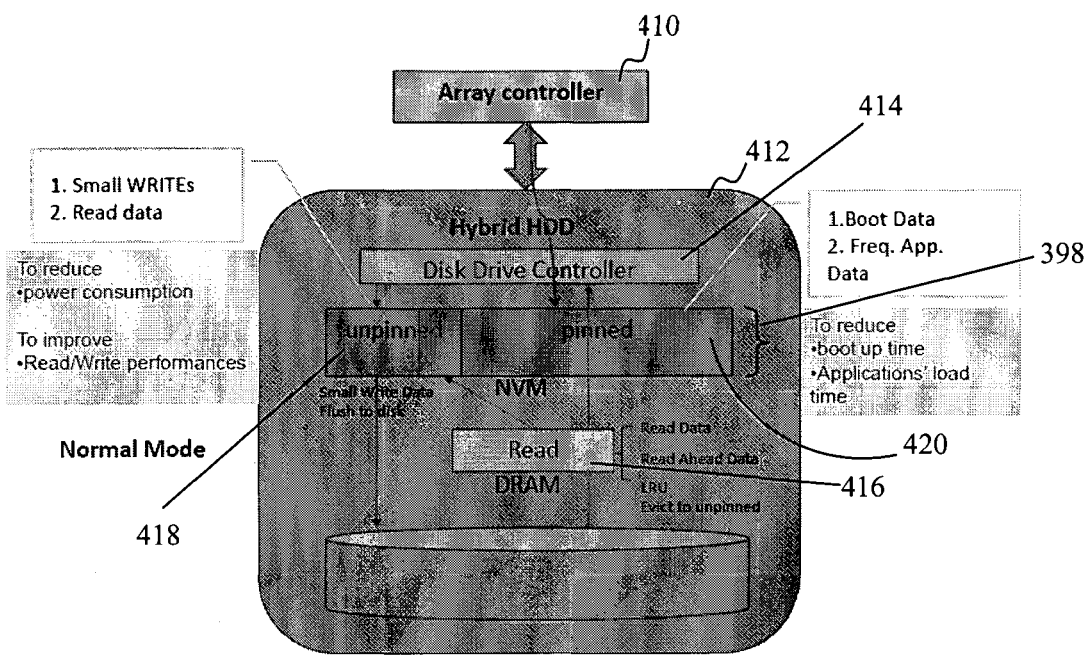
FIG. 83 shows an embodiment where a disk management layer includes all or a portion of an array controller and a portion of a disk drive controller in accordance with an embodiment of the invention.

FIG. 83 depicts an embodiment where the disk management layer (not shown separately—combination of the array controller 410 and the disk drive controller 414) includes all or a portion of the array controller 410 and a portion of the disk drive controller. The non-volatile memory 398 includes an unpinned memory 418, including cache memory, for data being read from or stored to the disk memory and a pinned memory 420. The pinned memory 420 is managed by the NVM management algorithms in the array controller 410. During normal mode operation, of the storage system, the pinned memory 420 could be used for storing critical or high frequency access data to improve application performance.

During the reconstruction mode, in the event of any disk failure, the NVM management algorithms in the array controller 410 will manage the NVM 398 for sizing the partitions, caching and evicting or flushing of data. The sizing involves changing the partitioning of the pinned region 420 and unpinned region 418. The cache 398 will be used for both reconstruction data sets and application requests data. The cache 398 is used to store data fetch from the disk for application requests and for buffering additional data for reconstruction purpose. Additional buffering could be aligned together during the fetching of data for application requests or within the vicinity of the current location upon completion of application requests. The decision for additional buffering aligned with application requests is integrated with the Reconstruction algorithm. In addition, the NVM 398 will also be used to cache the costly Read/Write data from applications. In general, costly read/write refers to data access to the portions of failed disk whose data has not been reconstructed yet.

Figure 84:
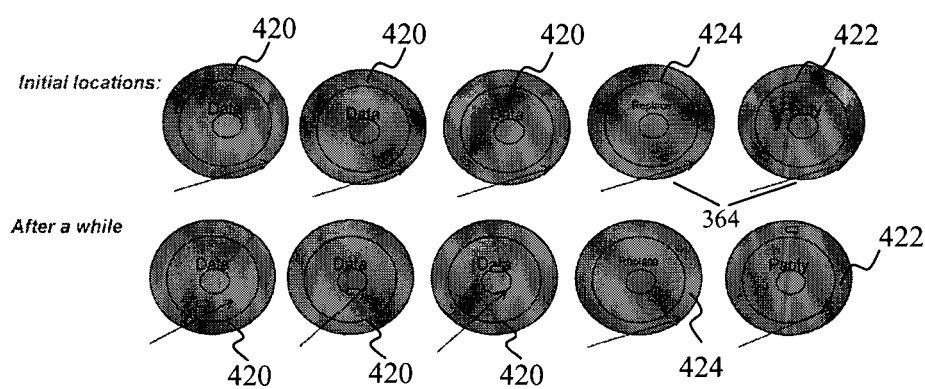
FIG. 84 shows how the user application diverts disk heads to different locations from initial, almost synchronized locations in accordance with an embodiment of the invention.

FIG. 84 illustrates how the user application diverts the disk heads 364 to different locations from initial, almost synchronized locations. If there is no user application, once the reconstruction starts, the disk heads 364 from three data disks 420 and one parity disk 422 will read data for computation of the data for the replacement disk 424. As all the disks 420, 422, 424 normally have the same character, their heads 364 are typically aligned. If there are requests coming from user applications, the higher prioritized user requests, due to their access to different areas, will cause all the disk heads 364 to move to different locations. After completing serving the user application requests, the heads 364 will seek back to continue with data reconstruction. Thus, there are excessive seeks between the user application process and the reconstruction process. In addition, data reconstruction normally can only start once all the data is ready. If there is one disk serving the requests from user applications, due to the fact that the disk is being occupied when serving the requests, the rest of the disks 420, 422, 424 have to wait for the "slowest" disk to read the reconstruction data to start reconstructions. This causes disk bandwidth wastage.

Figure 85:
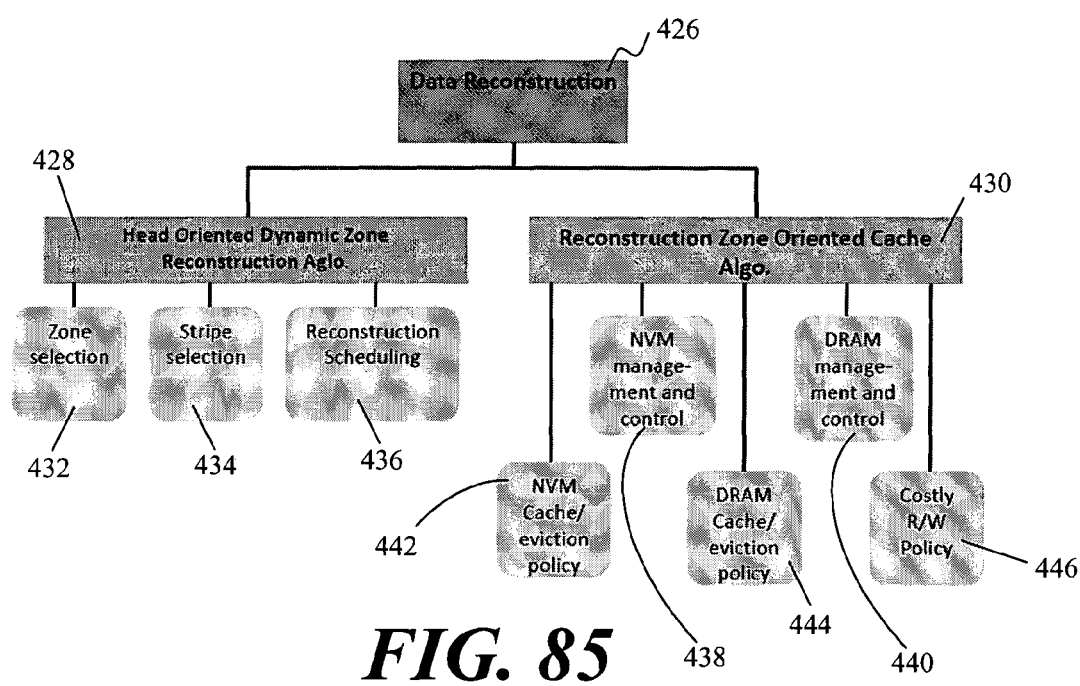
FIG. 85 shows a block diagram of some portions of a data reconstruction which provides improved performance by addressing disk wastage issues and other performance issues in accordance with an embodiment of the invention.

FIG. 85 depicts a block diagram of some portions of the data reconstruction 426 which provides improved performance by addressing the disk wastage issues and other performance issues. The data reconstruction 426 includes a head oriented dynamic zone reconstruction algorithm 428 and a reconstruction zone oriented cache algorithm 430. The zone selection module allows the reconstruction to be performed zone by zone. Preferably a zone is selected for reconstruction based on the amount of data in the NVM and DRAM that can be used for reconstructing the loss data. Thus, the unreconstructed zone with the most data in the NVM and DRAM is selected. The stripe selection module 434 allows the reconstruction to be performed stripe by stripe within a zone. Reconstruction of a stripe with the most data in the cache is prioritized. Reconstruction is then scheduled by the reconstruction scheduling module 436. Preferably a stripe is reconstructed immediately if all data for that stripe is available in the cache memory. The reconstruction zone oriented cache algorithm 430 also preferably includes several modules. A NVM management and control module 438 sets the cache memory size used by the controller and manages the content in the NVM. Similarly, a DRAM management and control module 440 sets the volatile memory size used by the controller during reconstruction and manages the content in the DRAM while performing read ahead control for the reconstruction.

A NVM cache/eviction policy module 442 controls the caching of data whenever the head is reading. In addition, this module 442 controls the caching of a full strip/multiple stripes through read ahead functioning, prioritizes the caching of data from a current reconstruction zone, and evicts data from cache immediately after performing the reconstruction.

A DRAM cache/eviction policy module 444 assures the right amount of data is cached through read ahead and evicts data from the DRAM to the NVM if the stripe has not reconstructed yet. Finally, a costly R/W policy module 446 assures that costly read/write functions, such as reading to an unreconstructed area, have the read/write full stripe function and the reconstruct function performed immediately. With this operational approach, array hybrid data storage devices can efficiently operate in terms of minimized reconstruction time and improved system performance and reliability.

Thus it can be seen that a data storage device 100 has been disclosed which provides many advantages. While several exemplary embodiments have been presented in the foregoing detailed description of the invention, it should be appreciated that a vast number of variations exist, including variations as to the materials, structure and operation of the data storage device.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of play steps described in an exemplary embodiment without departing from the scope of the invention as set forth herein.

The invention claimed is:

1. A data storage device comprising a motor having a stator, the stator comprising:
   a substrate having a first surface and a second surface opposite to the first surface; and
   a n phase winding arrangement having n phase windings;
   wherein each of the n phase windings comprises a first set of m flat fractional-pitch coils arranged on the first surface of the substrate such that the m flat fractional-pitch coils are spaced apart uniformly along a closed loop and connected in series;
   wherein each one of the m flat fractional-pitch coils, together with an angular section of the substrate between the one of the m flat fractional-pitch coils and an adjacent one of the m flat fractional-pitch coils of one of the n phase windings defines a stator pole-pair;
   wherein m is an integer larger than 1; and
   wherein each of the n phase windings further comprises a second set of m flat fractional-pitch coils arranged on the second surface of the substrate such that m flat fractional-pitch coils of the first set of m flat fractional-pitch coils are at least substantially in alignment with the m flat fractional-pitch coils of the second set of m flat fractional-pitch coils.

2. The data storage device according to claim 1, wherein the n phase winding arrangement is configured such that one of the m flat fractional-pitch coils from a first one of the n phase windings is arranged adjacent to one of the m flat fractional-pitch coils from a second one of the n phase windings within each stator pole-pair in a repeated arrangement along the closed loop.

3. The data storage device of claim 1 wherein each of the m flat fractional-pitch coils of the first set of one of the n phase windings on the first surface is connected to a corresponding one of the m flat fractional-pitch coils of the one of the n phase windings on the second surface of the substrate via one of m through holes formed in the substrate.

4. The data storage device of claim 1, wherein each of the m flat fractional-pitch coils of the first set is wound in a concentric arrangement.

5. The data storage device of claim 1, wherein the stator pole-pair comprises 360 electrical degrees in one cycle of flux distribution.

6. The data storage device of claim 5, wherein each of the m flat fractional-pitch coils of the first set in each of the n phase windings comprises a coil pitch of about (360/n) electrical degrees.

7. The data storage device of claim 6, wherein each of the m flat fractional-pitch coils of the first set in each phase winding of a 3 phase winding comprises a coil pitch of about 120 electrical degrees.

8. The data storage device of claim 1, wherein of the m flat fractional-pitch coils of the first set on the first surface of the substrate comprises an axis of rotation substantially perpendicular to the first surface of the substrate.

9. The data storage device of claim 1, wherein the substrate is a printed circuit board and the m flat fractional-pitch coils of the first and second sets comprises a conductive material printed on the printed circuit board.

10. The data storage device of claim 1, wherein n is an integer.

11. The data storage device of claim 1, further comprising a base plate, wherein the base plate comprises a substantially circular recess bounded by a wall.

12. The data storage device of claim 11, further comprising a cover disposed over the base plate.

13. The data storage device of claim 12, wherein the cover comprises at least one selectively indented region configured to increase the stiffness of the cover.

14. The data storage device of claim 13, wherein the at least one selectively indented region comprises at least one of (i) a plurality of radial regions and (ii) a plurality of radial arc-shaped regions.

15. The data storage device of claim 12, wherein the cover further comprises a planar surface with a plurality of stiffening ribs.

16. The data storage device of claim 12, further comprising an indented pad disposed on a surface of the cover facing away from a disk.

17. The data storage device of claim 12, further comprising a shock absorption system configured to prevent the cover from touching a surface of a disk when the cover is subjected to external forces.

18. The data storage device of claim 17, wherein the shock absorption system comprises a plurality of shock absorbers.

19. The data storage device of claim 18, further comprising an actuator.

* * * * *